US007272613B2

(12) United States Patent
Sim et al.

(10) Patent No.: US 7,272,613 B2
(45) Date of Patent: Sep. 18, 2007

(54) METHOD AND SYSTEM FOR MANAGING DISTRIBUTED CONTENT AND RELATED METADATA

(75) Inventors: Siew Young Sim, Cupertino, CA (US); Desmond Cho-Hung Chan, Mountain View, CA (US); Tsan-Fung Huang, San Marino, CA (US); Wencheng Chai, San Jose, CA (US); Trygve Isaacson, San Lorenzo, CA (US); James C. Flood, Jr., Portland, OR (US); George Harlow Mills, Palo Alto, CA (US); Matthew Orzen, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 155 days.

(21) Appl. No.: 09/984,024

(22) Filed: Oct. 26, 2001

(65) Prior Publication Data

US 2002/0133491 A1 Sep. 19, 2002

Related U.S. Application Data

(63) Continuation-in-part of application No. 09/681,644, filed on May 15, 2001, now Pat. No. 6,970,939.

(60) Provisional application No. 60/278,469, filed on Mar. 23, 2001, provisional application No. 60/278,409, filed on Mar. 23, 2001, provisional application No. 60/278,408, filed on Mar. 23, 2001, provisional application No. 60/278,285, filed on Mar. 23, 2001, provisional application No. 60/266,286, filed on Oct. 26, 2000.

(51) Int. Cl.
*G06F 17/00* (2006.01)

(52) U.S. Cl. .................. 707/102; 707/10; 707/101; 707/103 X; 707/104.1; 707/205; 711/122; 714/6

(58) Field of Classification Search .................. 707/10, 707/2, 8, 205, 206, 102, 204, 203, 101, 103 X, 707/104.1; 711/133–136, 159–160, 122; 714/6; 709/217, 220, 223
See application file for complete search history.

(56) References Cited

U.S. PATENT DOCUMENTS 4,466,060 A 8/1984 Riddle
(Continued)

FOREIGN PATENT DOCUMENTS

EP 0 967 559 12/1999
(Continued)

OTHER PUBLICATIONS

Dilley et al. "Enhancement and Validation of Squid's Cache Replacement Policy." HP Labs Technical Reports. HPL-1999-69. Available on the Internet at http://www.hpl.hp.com/techreports/1999/HPL-1999-69.pdf pp. 1-18. May 1999.*
(Continued)

*Primary Examiner*—Thuy Pardo
(74) *Attorney, Agent, or Firm*—Blakely, Sokoloff, Taylor & Zafman LLP

(57) ABSTRACT

The invention provides a method and system for creating an innovative file system that separates its directory presentation from its data store. The method and system include processing, division, distribution, managing, synchronizing, and reassembling of file system objects that does not delay the presentation of the content to the user, but also uses a reduced amount of storage space. The invention includes the ability to manage and control the integrity of the files distributed across the network, and the ability to serve and reconstruct files in real time using a Virtual File Control System.

13 Claims, 49 Drawing Sheets

U.S. PATENT DOCUMENTS

| | | | |
|---|---|---|---|
| 4,914,571 A | 4/1990 | Baratz et al. | |
| 5,079,767 A | 1/1992 | Perlman | |
| 5,367,698 A | 11/1994 | Webber et al. | |
| 5,630,184 A | 5/1997 | Roper et al. | |
| 5,751,968 A | 5/1998 | Cohen | |
| 5,812,773 A | 9/1998 | Norin | |
| 5,872,773 A | 2/1999 | Katzela et al. | |
| 5,903,566 A | 5/1999 | Flammer, III | |
| 5,905,847 A | 5/1999 | Kobayashi et al. | |
| 5,924,094 A | 7/1999 | Sutter | |
| 5,924,116 A * | 7/1999 | Aggarwal et al. | 711/122 |
| 5,926,101 A | 7/1999 | Dasgupta | |
| 5,991,804 A * | 11/1999 | Bolosky et al. | 709/221 |
| 6,003,030 A * | 12/1999 | Kenner et al. | 707/10 |
| 6,014,701 A | 1/2000 | Chadda | |
| 6,038,061 A | 3/2000 | Sugaya | |
| 6,038,601 A | 3/2000 | Lambert et al. | |
| 6,081,840 A * | 6/2000 | Zhao | 709/224 |
| 6,088,333 A | 7/2000 | Yang et al. | |
| 6,101,534 A * | 8/2000 | Rothschild | 709/217 |
| 6,105,029 A | 8/2000 | Maddalozzo, Jr. et al. | |
| 6,108,703 A | 8/2000 | Leighton et al. | |
| 6,145,089 A | 11/2000 | Le et al. | |
| 6,212,240 B1 | 4/2001 | Scheibel, Jr. et al. | |
| 6,222,530 B1 | 4/2001 | Sequeira et al. | |
| 6,269,080 B1 | 7/2001 | Kumar | |
| 6,275,852 B1 * | 8/2001 | Filepp et al. | 709/220 |
| 6,356,903 B1 | 3/2002 | Baxter et al. | |
| 6,363,416 B1 | 3/2002 | Naeimi et al. | |
| 6,370,146 B1 | 4/2002 | Higgins et al. | |
| 6,374,336 B1 * | 4/2002 | Peters et al. | 711/167 |
| 6,415,373 B1 * | 7/2002 | Peters et al. | 711/167 |
| 6,427,212 B1 * | 7/2002 | Frey, Jr. | 714/6 |
| 6,456,599 B1 | 9/2002 | Elliott | |
| 6,460,039 B1 | 10/2002 | Pinter et al. | |
| 6,460,087 B1 | 10/2002 | Saito et al. | |
| 6,498,795 B1 | 12/2002 | Zhang et al. | |
| 6,502,125 B1 | 12/2002 | Kenner et al. | |
| 6,515,967 B1 | 2/2003 | Wei et al. | |
| 6,523,064 B1 | 2/2003 | Akatsu et al. | |
| 6,523,069 B1 | 2/2003 | Luczycki et al. | |
| 6,535,869 B1 * | 3/2003 | Housel, III | 707/2 |
| 6,587,866 B1 | 7/2003 | Modi et al. | |
| 6,647,408 B1 | 11/2003 | Ricart et al. | |
| 6,691,165 B1 | 2/2004 | Bruck et al. | |
| 6,691,312 B1 | 2/2004 | Sen et al. | |
| 6,708,217 B1 | 3/2004 | Colson et al. | |
| 6,711,607 B1 | 3/2004 | Goyal | |
| 6,718,361 B1 | 4/2004 | Basani et al. | |
| 6,718,486 B1 | 4/2004 | Roselli et al. | |
| 6,728,732 B1 | 4/2004 | Eatherton et al. | |
| 6,748,447 B1 | 6/2004 | Basani et al. | |
| 6,760,765 B1 | 7/2004 | Asai et al. | |
| 6,763,377 B1 * | 7/2004 | Belknap et al. | 709/223 |
| 6,765,868 B1 | 7/2004 | Dunn et al. | |
| 6,772,209 B1 | 8/2004 | Chernock et al. | |
| 6,772,217 B1 | 8/2004 | Baumann et al. | |
| 6,772,337 B1 | 8/2004 | Yener | |
| 6,785,704 B1 | 8/2004 | McCanne | |
| 6,842,896 B1 | 1/2005 | Redding et al. | |
| 6,845,396 B1 | 1/2005 | Kanojia et al. | |
| 6,922,724 B1 | 7/2005 | Freeman et al. | |
| 6,931,397 B1 | 8/2005 | Sundaresan | |
| 6,970,939 B2 | 11/2005 | Sim | |
| 6,993,587 B1 | 1/2006 | Basani et al. | |
| 7,093,000 B1 | 8/2006 | Yamagishi et al. | |
| 2001/0034737 A1 * | 10/2001 | Cane et al. | 707/204 |
| 2002/0010783 A1 | 1/2002 | Primak et al. | |
| 2002/0040479 A1 | 4/2002 | Ehrman et al. | |
| 2002/0059325 A1 | 5/2002 | Beizer et al. | |
| 2002/0073086 A1 | 6/2002 | Thompson et al. | |
| 2002/0112069 A1 | 8/2002 | Sim | |
| 2002/0138640 A1 | 9/2002 | Raz et al. | |
| 2003/0099202 A1 | 5/2003 | Lear et al. | |
| 2005/0027735 A1 * | 2/2005 | Cabrera et al. | 707/102 |

FOREIGN PATENT DOCUMENTS

| | | |
|---|---|---|
| WO | PCT/US01/42816 | 12/2002 |
| WO | PCT/US01/32638 | 1/2003 |

OTHER PUBLICATIONS

Gruber, S. et al. "Design Considerations for an RTSP-Based Prefix-Caching Proxy for Multimedia Streams", AT&T Labs Research, Sep. 7, 1999, 21 pgs.

Mui, Allen et al., "Performance Analysis of a Dynamic Parallel Downloading Scheme from Mirror Sites Throughout the Internet", 6892 Term Paper, Dec. 1999, pp. 1-13.

Noghami, B. et al. "A Novel Approach to Reduce Latency on the Internet: Component-Based Download", Dept. of Electrical and Computer Communications Engineering, University of Manitoba, Jun. 2000, 6pgs.

Rodriguez, P., et al., "Parallel-Access for Mirror Sites in the Internet", Infocom 2000, 19th Annual Joint Conference of the IEEE Computer and Communications Societies, IEEE Tel Aviv, Israel, Mar. 26-30, 2000, pp. 864-873.

* cited by examiner

Meta File System Structure 1210

/MetaPath/SCDN ID/Volumes/Directories & Files 1220

Each volume, directory, and file has an object metadata file in the Meta File System Structure eg:
SCDN ID = 0
Meta Path = "meta"
Volumes = "HR", "Marketing", "Engineering"
Directories= "Policy", "Strategy", "Project", "Design"

Volume metadata = hr.vdat, marketing.vdat engineering.vdat
Directory metadata = policy.ddat, strategy.ddat project.ddat, design.ddat
File metadata = PTO.doc, product.ppt /meta/0/HR/hr.vdat
    Policy/policy.ddat
        PTO.doc
    Marketing/marketing.vdat
        Strategy/strategy.ddat
        Product.ppt
    Engineering/engineering.vdat
        Project/project.ddat
            Design/design.ddat

Figure 12A

Block file path name 1250

/{blockdataRoot(VolumeIndex)}/{network ID}/blocks/{node_limiting_path(media ID)}/

Eg:
Assuming that there are two volumes:
BlockDataRoot(1)=BlockRoot1, and BlockDataRoot(2)=BlockRoot2.

SCDN network ID = 0

FileZ with unique file ID = 00000000001234567890,
FileZ has 2 segments, segment 1 has 5 blocks, segment 2 has 8 blocks When all blocks are in local storage:

/BlockRoot1/0/blocks/000/000/000/012/345/678/90/1/0/1234567890.1.0001.block
                                                                                1234567890.1.0003.block
                                                                                1234567890.1.0005.block
                                                                                1234567890.2.0002.block
                                                                                1234567890.2.0004.block
                                                                                1234567890.2.0006.block
                                                                                1234567890.2.0008.block /BlockRoot2/0/blocks/000/000/000/012/345/678/90/1/0/1234567890.1.0002.block
                                                                                1234567890.1.0004.block
                                                                                1234567890.2.0001.block
                                                                                1234567890.2.0003.block
                                                                                1234567890.2.0005.block
                                                                                1234567890.2.0007.block

Figure 12C

Volume Metadata file - (volume name).vdat

| type | description |
|---|---|
| Object ID | Network ID |
| Object ID | Origin Node ID |
| Object ID | Volume ID |
| Object ID | Content Owner ID |
| String Buffer [255] | Content Owner Name |
| String Buffer [255] | Origin CM Address |
| String Buffer [255] | Origin CU Address |
| String Buffer [255] | Origin DS Address |
| Int 64 | Reserved Space |
| String Buffer [255] | Authentication Server Address |
| Int 32 | Authentication Server Port |
| Instant | Space Reservation Update Time |
| Instant | Record Update Time |
| Instant | Creation Time |
| Instant | Last Mod Time |
| Int 32 | Number of directories |
| Int 32 | Number of files |
| Int 64 | Distribution map |
| Array of access control objects | Access control list |
| ... | ... |

Figure 13A

Directory Metadata file - {directory name}.ddat  1310

| type | description |
|---|---|
| Object ID | Network ID |
| Object ID | Origin Node ID |
| Object ID | Volume ID |
| Object ID | Parent Dir ID |
| Object ID | Unique Dir ID |
| Instant | Record Update Time |
| Instant | Creation Time |
| Instant | Last Mod Time |
| Int 32 | Number of files |
| Int 64 | Distribution map |
| Array of access control objects | Access control list |
| ... | ... |

Figure 13B

File Metadata – {file name}

| type | description |
|---|---|
| Object ID | Network ID |
| Object ID | Dir ID |
| Object ID | File ID |
| String Buffer [255] | File Name |
| String Buffer [255] | Object Code |
| Int 32 | Duration in seconds for time based content |
| Int 64 | File Size |
| Int 32 | Block Size |
| Int 32 | Popularity |
| Int 32 | Number of segments in file |
| Array (# segments) | Number of blocks for each segment |
| Instant | Time Stamp |
| Instant | Expiration Date |
| Instant | Record Update Time |
| Instant | Last Use Time |
| Instant | Creation Date |
| Int 64 | Distribution map |
| Array | Access control list |
| Array | Access log |
| Int 32 | Version |
| Int 32 | File type |
| Array | Block Index of segment #1 |
| Array | Block Index of segment #2 |
| ... | ... |
| (end of data) | |

Figure 13C

Example of Block Index Array

| 1 | 2 | 0 | 0 | 0 | | | | | | |
|---|---|---|---|---|---|---|---|---|---|---|
| 2 | 1 | -1 | 2 | 0 | 0 | | | | | |
| 1 | -1 | 0 | 0 | 0 | 0 | 0 | 0 | 0 | 0 | 0 |

1330

1332
1334
1336

1 = Storage device #1
2 = Storage device #2
-1 = In the process of downloading from other server
0 = not in local storage

Figure 13D

METHOD AND SYSTEM FOR MANAGING DISTRIBUTED CONTENT AND RELATED METADATA

CROSS-REFERENCE TO RELATED APPLICATIONS

This application claims priority to each of U.S. Provisional Applications Nos. 60/278,408, 60/278,285, 60/278,409, and 60/278,469, filed Mar. 23, 2001, and is a continuation-in-part of U.S. Ser. No. 09/681,644, filed May 15, 2001 now U.S. Pat. No. 6,970,939, claiming priority to U.S. Prov. No. 60/266,286, filed Oct. 26, 2000, all incorporated herein by reference in their entirety. This application also contains subject matter related to that disclosed in commonly-owned U.S. Application Number (to be assigned), filed on even date herewith, having attorney docket number 2070.001000H, and entitled "Method and System for Real-Time Parallel Delivery of Segments of a Large Payload File," the full text of which is incorporated herein by reference.

BACKGROUND OF THE INVENTION

1. Field of the Invention

The present invention relates to the storage and distribution of content over a network.

2. Related Art

Advances in telecommunications network communication and switching are moving ahead with great speed. However, distributing files between network locations can take significant amounts of time using conventional techniques. Transmission flow can be inconsistent. For example, when delivering large content, such as a media file of a movie, to a user, unacceptable delays in transmission can occur.

One conventional technique to avoid delay in presenting content to a user is to replicate copies of the content at various locations in the network. Such replication may reduce delay for a user near an available copy, but requires an inordinate amount of storage space. Management overhead is also increased. A management application is needed so that administrators and/or users can manage the replicated copies of content. Storage administrators must further be in constant alert because if any site runs out of storage, a new content replication will fail.

Other techniques include application level proxy caching, such as, web caching and streaming caching. Such caching does not require the deployment of unmanageable amount storage but only solves the problem for limited cases when content has already been cached in at the requesting locations. If a user request for a content that is not cached, the content has to be retrieved from the core, and the delay may be unacceptable. Another major limitation of a caching approach is that it is limited to one specific application.

What is needed is a method and system for storage and distribution of content over a network that can eliminate long haul transfer latency and does not require 100% replication to all locations. A method and system for storage and distribution of content is needed which provides intelligent storage management based on usage and location transparent access, and which is application agnostic, that is, is can be used with different types of applications.

SUMMARY OF THE INVENTION

The invention overcomes the identified limitations and provides a method and system for creating an innovative file system that separates its directory presentation from its data store. The invention strikes an appropriate balance between the requirement of consistent speedy delivery and reducing storage requirements. The method and system includes division, distribution, and reassembling of files that does not delay the presentation of the content to the user, but also uses a reduced amount of storage space compared to conventional techniques. The method and system also includes the creation of an integrated read-write-able file system, and the distribution of file system objects that include volumes, directories, and files. The invention includes the ability to manage and control the integrity of the file system objects distributed across the networking using the metadata and meta file system architecture, and the ability to serve and reconstruct files in real time using a Virtual File Control System (VFCS) or VFCS cluster. The metadata and meta file system architecture provides means for distribution servers (DS) and VFCS to keep track of the distributed information on the network while VFCS conducts the organized reassembly of the information for delivery to the user.

An embodiment of the invention provides an improved mechanism for creating an integrated read-write-able file system for distributing large files throughout a computer network and delivering such files to end-user systems or an application servers. When the invention is implemented it provides multiple users from many different locations a way to obtain access to file system objects without overburdening network resources. If, for example, a user wishes to download a large file, such as a video file, an embodiment of the invention provides a way to deliver that video file to the requesting user without straining the network. The system accomplishes this by breaking the file into multiple portions (segments or block files) and storing those portions in locations (e.g. nodes) distributed throughout the network. The present invention describes a technique to create a read-write-able integrated file system. It also describes a technique for breaking up the file and reconstructing it for distribution, as well as a technique to distribute file system objects.

An aspect of the invention is a method to create an integrated file system presentation based on a meta file system structure and the object metadata itself that supports the separation of the file system presentation and its data while allowing the data to be located throughout a network of nodes, and then reassembled in a timely fashion that is transparent to its users.

Another aspect of the invention is directed to dividing files into manageable, non-contiguous, file segments, re-arranging the file segments, and distributing these non-contiguous file segments for optimum network node performance. The non-contiguous file segments are reassembled for distribution to a client requesting the large payload file. The reassembly process is transparent to the user and provides the file data to the user with minimal latency.

Another aspect of the invention is a method to distribute, replicate, and synchronize file system objects among a network of nodes.

Another aspect of the invention is directed to serving non-contiguous file segments through the global file system presentation while presenting the original, unchunked content to users as a directory.

Another aspect of the invention is regarding the application of distribution and service policies to enable the guaranteed quality of service.

Another aspect of the invention is directed to how several VFCSs can be grouped as a virtual file system gateway cluster that increases I/O bandwidth while also providing load balancing and fault tolerance.

Advantages of the invention include the ability to store, track, distribute, and reassemble large payload files without delaying the presentation of content to the user, but also while requiring only a minimal amount of storage space.

The invention provides a method and apparatus for efficiently storing large files. A content network for delivering files to a user includes a plurality of storage elements disposed within a number of geographically distributed network nodes and configured to store portions of a file. A software management structure stores information regarding the content and location of each of the storage elements related to the file. A software content pruning structure is coupled to the software management structure and configured to selectively prune the content blocks stored in the storage elements to insure that the file is efficiently stored in the network.

In one or more embodiments, the portions and amount of a file maintained at each node depends on the available storage, popularity of the content, distribution criteria by the content owner, etc. Thus, least-likely to be used blocks of a file may be pruned (i.e., deleted from local storage) to make room for other highly desirable content. However, although the least likely to be used blocks of a file are pruned, the entire content of a file may be maintained at a node in the scalable content delivery network, so long as the content owner wants the content to remain in the network. In this way, large files can be stored efficiently.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention. In the accompanying drawings:

FIGS. 12A-C are illustrative embodiments of the meta file system structure, block file structure of an underlying file system, and metadata examples in accordance with the present invention;

FIGS. 13A-C are illustrative embodiments of the volume, directory, and file metadata in accordance with the present invention;

FIG. 13D is an illustrative embodiment of the block index array metadata in accordance with the present invention;

DETAILED DESCRIPTION OF THE INVENTION

Figure 1:
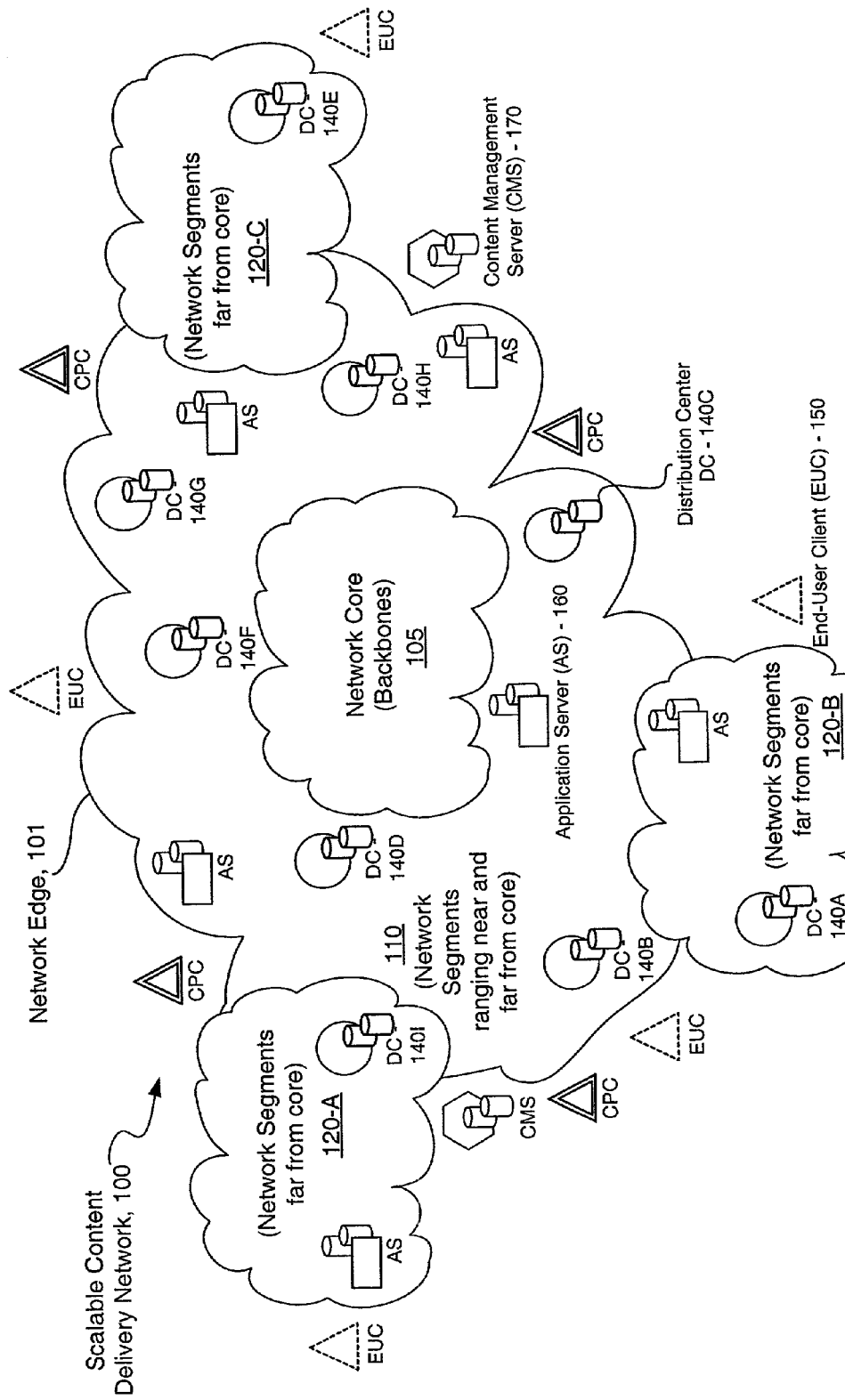
FIG. 1 is an illustration of a scalable content delivery network for delivering file system objects according to an embodiment of the present invention.

The following description is for the best modes presently contemplated for practicing the invention. This description is not to be taken in a limiting sense, but is made merely for the purpose of describing the general principles of the invention. The scope of the invention should be ascertained with reference to the claims.

The present invention is related to a method and system for storing and distributing content. In particular, the invention provides a highly efficient architecture and technique for processing, storing and serving content to a user for education, entertainment, business, or any other purpose. A method and system according to an embodiment of the present invention creates an advanced read-write-able integrated network file system in which directory presentation and data store are separated. The method and system includes division, distribution, and re-assembling of files that does not delay the presentation of the content to the user, but also does not require an inordinate amount of storage space. The method and system also includes creation of an integrated file system, and distribution of file system objects including volumes, directories, and files.

The invention is described with reference to specific architectures and protocols. Those skilled in the art will recognize that the description is for illustration and to provide the best mode of practicing the invention. One embodiment of the invention provides an improved mechanism for dividing and distributing files (referred to as payload or content) throughout a computer network. Another embodiment of the invention provides a method to create an integrated file system view of multiple content nodes. Another embodiment of the invention provides a method to distribute, replicate, and synchronize the update of file system objects such as volumes, directories, and files. In the following description, numerous specific details are set forth to provide a more thorough description of embodiments of the invention. The description is not meant to be limiting. For example, reference is made to Internet Protocol and UNIX, but any packet protocol may be used and any operating system may be used.

When the invention is implemented in accordance with an embodiment of the invention it provides end-user systems with a way to access file system objects without overburdening the network utilized by the end-user system to transmit data. In one embodiment of the invention, the system accomplishes this by breaking the file into multiple portions (segments or tracks) and storing those portions and other file system objects in locations (e.g., nodes) distributed throughout the network. The portions and other file system objects stored throughout the network are distributed utilizing a flow optimization technique that provides for the intelligent management of the all file system objects and portions of data. Thus, file system objects and portions of the file are stored in locations that minimize the amount of time it takes to deliver the portion to the end-user system. These locations minimize the latency associated with delivering the data to the end-user system and are referred to herein as the edge of the network.

Each node at the edge of the network embodying aspects of the invention is configured to appear as if it has the file stored locally when portions of the file are really stored on other nodes located throughout the network. This greatly increases the virtual storage capacity of each network node without consuming system resources. The nodes distribute and replicate data blocks and other file system objects in a manner that maximizes data transfer efficiency while minimizing bandwidth consumption. When the end-user system issues a request for content (e.g., a file) the request is routed to the nearest node and the node imports non-resident data of the requested content from other nodes in a manner that requires the least time and cost. The end result is that each network node has access to numerous or all file system objects (volumes, directories, and files) without having to store and maintain the full content of each of those objects locally.

One or more embodiments of the present invention provide efficient methods and systems for dividing a file for storage and reconstructing the file for delivery. The process of dividing a large payload file content is called chunking and is described in detail below. Another embodiment of the present invention provides a method to create an integrated file system from multiple nodes. Another embodiment of the present invention provides a method to distribute, replicate, and synchronize file system objects among a network of nodes. Another embodiment of the present invention provides a method and system for clustering a group of virtual file systems. This clustering of a group of virtual file systems increases reliability and availability and at the same time increases I/O bandwidth by load balancing. These embodiments are described in more detail below.

A. Network Architecture

1. Scalable Content Delivery Network

FIG. 1 provides a view of a scalable content delivery network (SCDN) 100 for delivering large payloads according to an embodiment of the present invention. SCDN 100 may be a network such as the Internet that conceptually includes a network core 105 (i.e., the backbone), intermediate network segments 110 ranging "near" and "far" from the core, and network segments "far" from core 120-A through 120-C (collectively 520). "Near" and "far" relate to distance and are intended to indicate relative path latencies (short or long, respectively) to the core, such latencies generally depend on the number of intermediate hubs (e.g., switches, routers, and the like) that are traversed to reach the high-speed backbones that form the core of the network and through which much of the network traffic is routed. Note that each intermediate hub may perform some limited processing, which adds latency, before forwarding the traffic to the next hub.

FIG. 1 shows a plurality of Content Provider Clients (CPCs) 130, a plurality of End-User Clients (EUCs) 150, and one or more Content Management Servers (CMSs) 170, all located beyond network edge 101. This is arrangement is illustrative and not intended to be limiting. For example, a CPC 130, EUC 150, and/or CMS 170 can be located anywhere in a network including beyond a network edge, at a network edge, or at any location within a network such as within a network segment or core.

In general, the content provider client 130 may be connected (or assigned) to a content management server 170, which in turn is connected to its assigned distribution center 140, or content provider client 130 may be connected (or assigned) to any distribution center 140. In this environment, any connection supported by the SCDN 100 can be used. Examples of such connections include, but are not limited to, a physical link (over any medium wired or wireless), data link, logical link, permanent virtual circuit, switched virtual circuit, connection-oriented protocol, connectionless protocol, or any other direct or indirect network connection and/or protocol and combinations thereof.

A content provider client may be an application for managing contents in the network, or it may be a general file system client that connects to a Virtual File Control System (not shown) in a distribution center 140. A content owner creates, renames, moves, deletes, and manages volumes and directories through a respective CPC 130. A content owner also uploads, reads, updates, and manages files in the SCDN 100 through his or her CPC 130. EUC 150 provides an end-user of the content access to files in SCDN 100. For example, EUC 150 may be any kind of browser (including but not limited to a web browser or any file system browser) running on an end-user's local device. Any type of end user device that can support an end-user client 150 can be used including, but not limited to, a computer (e.g., a personal computer, workstation, or server), set-top box, television set, telephone, or a hand-held computing device (e.g., organizers, palm-top devices).

Network edge 101 may be far from network core 105. However, the distance (i.e., path latency) between the core and the edge may not be uniform, and may vary considerably for a given CPC or EUC. One embodiment of the present invention places a plurality of Distribution Centers (DC) 140A-140I for maintaining payloads at the edge of the network thereby reducing or eliminating latency for respective end user clients 150. Payload content from a content owner is pushed from one distribution center to other distribution centers at the edge of the network. An end-user seeking access to particular payload content is serviced (via a network file system client or an application server) from the nearest distribution center containing the desired content. Latency due to path considerations is minimized since content is distributed to the end-user (e.g., to a respective EUC 150) via a plurality of application aervers (AS) 160 and distribution centers 140 located at network edge 101. Thus, distribution involves obtaining any file system objects from a content provider and geographically placing these objects or portions of each objects at the distribution centers which are generally located close to the edge of the network.

Figure 2:
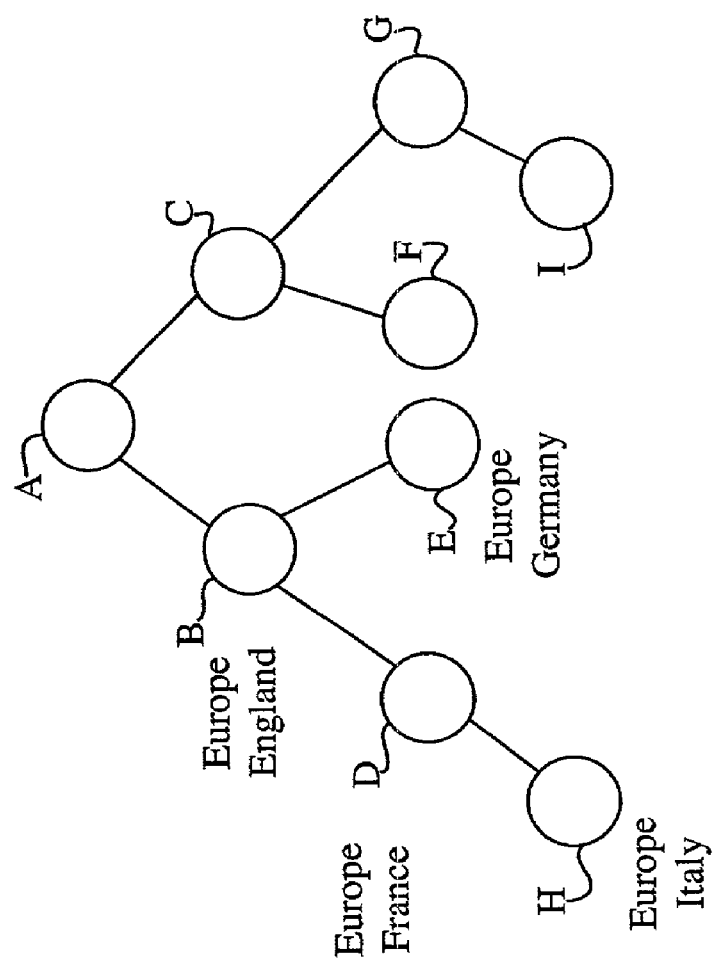
FIG. 2 is an illustration of a virtual tree arrangement of the nodes for control information communication in accordance with an embodiment of the present invention.

The distribution centers 140A-140I in SCDN 100 of FIG. 1 are virtually arranged in the form of a tree 200 as illustrated in FIG. 2, for example. This virtual tree arrangement is primarily used for communication of control information and signals amongst the nodes of scalable content delivery network 100. Data downloads can be performed from any node in the network having the desired data, preferably the nearest node (network-distance-wise). Nodes A through I of FIG. 2 represent DCs 140A through 140I, respectively. The nodes are arranged in a logical order. For example, assuming node B represents Europe-England, then logical child nodes in Europe might be Europe-France (e.g., node D) and Europe-Germany (e.g., node E), and a child node of Europe-France might be Europe-Italy (e.g., node H). In this example where the left side of the tree represents Europe, the right side may represent Asia.

Node A is the root node and may represent a central control station, for example. In one or more embodiments, each node A-I in tree 200 has a unique attribute set representing the name of the node. The attribute set for a node is stored at a respective DC 140A-140I and can be represented in any convenient data structure. For example, the attribute set can be represented as a variable bitmap (a bitmap is the binary representation of an object, e.g., a number). Each node also contains a representation of the attribute set of each of the node's children, grandchildren, great grandchildren, etc. (i.e., all nodes emanating from that node as a root node—lineal descendants). This representation is called the "Rolled Up Set of Attributes" and any convenient data structure can be used for it. Thus the rolled up attribute of a node is the representation of the rolled up attribute of its children. For example, a "Rolled Up Bitmap", which is a combination of the rolled up attribute bitmaps of all the node's children, may be used. A "Rolled Up Bitmap" may be defined as the "binary OR" (also called a "Bitwise OR") of the rolled up attributes of the node's children.

Figure 3:
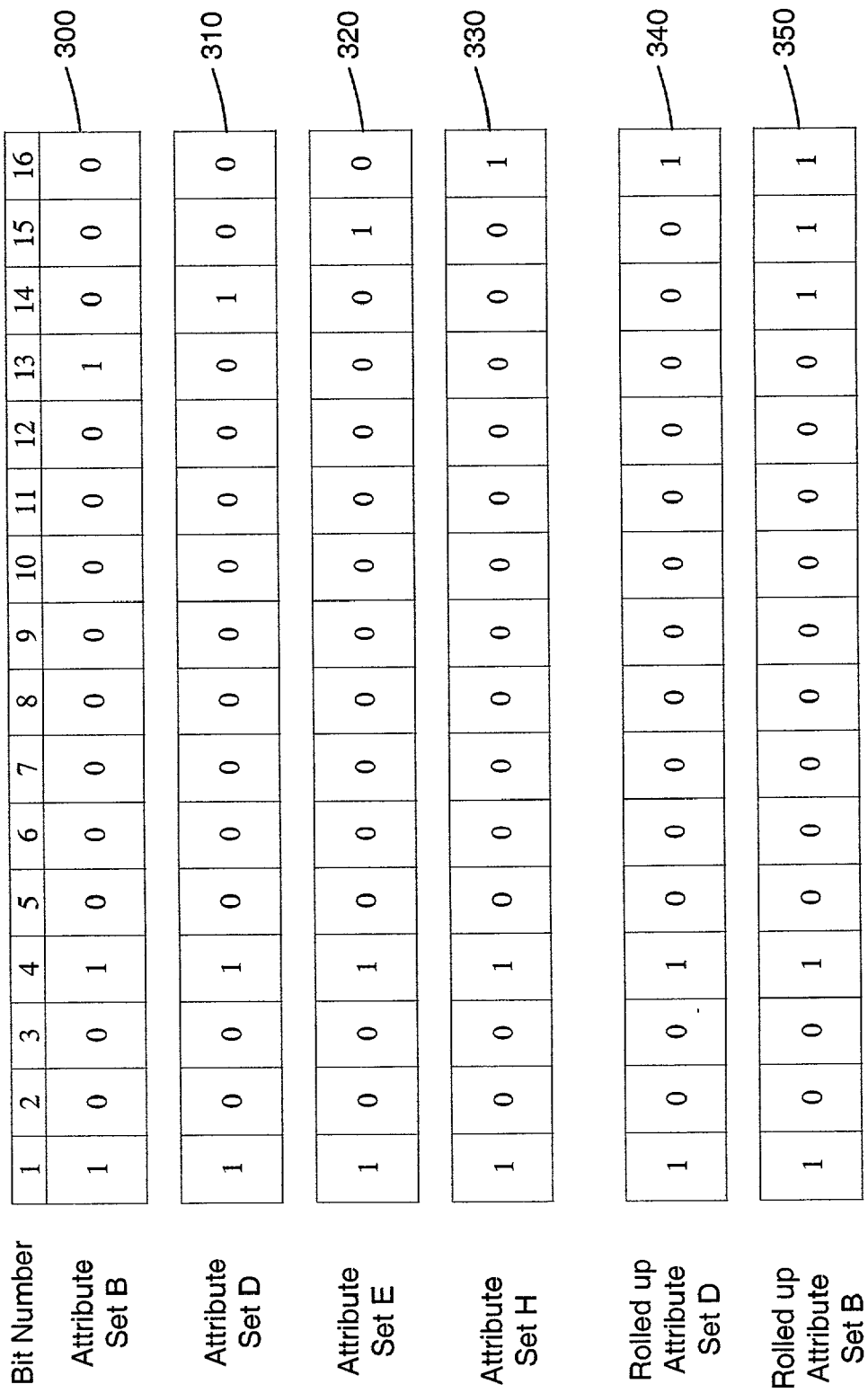
FIG. 3 is an illustration of the attribute bitmap and rolled up bitmap, in accordance with an embodiment of the present invention.

FIG. 3 is an illustration of example attribute bitmaps 300, 310, 320, 330 and rolled up bitmaps 340, 350 in accordance with an embodiment of the present invention. Each bitmap 300-350 uses 16 bits for illustration purposes, but since the bitmaps are variable, they may vary as needed to identify each node and provide other information.

Bitmap 300 represents the attribute set for node B of FIG. 2 and has, as its identification, bits 1, 4 and 13 set to 1 and all other bits set to 0. Bit 1 may be set because node B is a child node of A, for example, bit 4 may be set to represent Europe, and bit 13 set to represent England. Bitmap 310 represents the attribute set for node D of FIG. 2, a child node of B, and has bits 1, 4, and 14 set to 1 and all other bits set to 0. Bit 14 may represent France, for example. Bitmap 320 represents the attribute set for node E of FIG. 2, also a child node of B, and has bits 1, 4, and 15 set to 1 and all other bits set to 0. Bit 15 may represent Germany, for example. Bitmap 330 represents the attribute set for node H of FIG. 2, a child node of D, and has bits 1, 4, and 16 set to 1 and all other bits set to 0. Bit 16 may represent Italy, for example. Rolled up bitmaps are also stored for each node that has children. Rolled up bitmap 340 represents the rolled up set of attributes for node D. In this case, rolled up bitmap 340 for node D is the same as the attribute bitmap of node H since H does not have any children. Rolled up bitmap 350 represents the rolled up set of attributes for node B. In this case, rolled up bitmap 350 for node B is the binary OR of attribute bitmaps 310, 320, and 330. The result of the binary OR is that all the bits set in bitmaps 310, 320, and 330 are also set in rolled up bitmap 350 (i.e., bits 1, 4, 14, 15, and 16).

Content management server 170 may be connected to any node A-I on tree 200. Thus, even in examples where content management server 170 and a distribution center 140A-140I are not at the same site, content management server 170 can give a content owner a vehicle to introduce file system objects to distribution centers 140A-140I and to manage the file system objects in network 100. Content management client 130 may be connected directly to a distribution center 140A-140I to perform similar functions a content management server 170 provides. In one embodiment, content management server 170 is a computer that processes the content owner's file system objects for distribution in network 100. In another embodiment, content management server 170 are a subset of tools (e.g., machine independent objects) that allows manage, distribution, access, and control of file system objects in network 100. The tools may be embedded in the content owner's computer for processing and distribution of a large payload file in network 100. In yet another embodiment, content provider client 130 is a standard file system client that connects directly to a virtual file control system of a distribution center 140A-140I while the processing tools may be embedded within the virtual file control system. After a content provider loads a file system object into content management server 170, CMS 170 may process the object and forward it to a distribution center 140A-140I.

2. Distribution Center

Figure 4A:
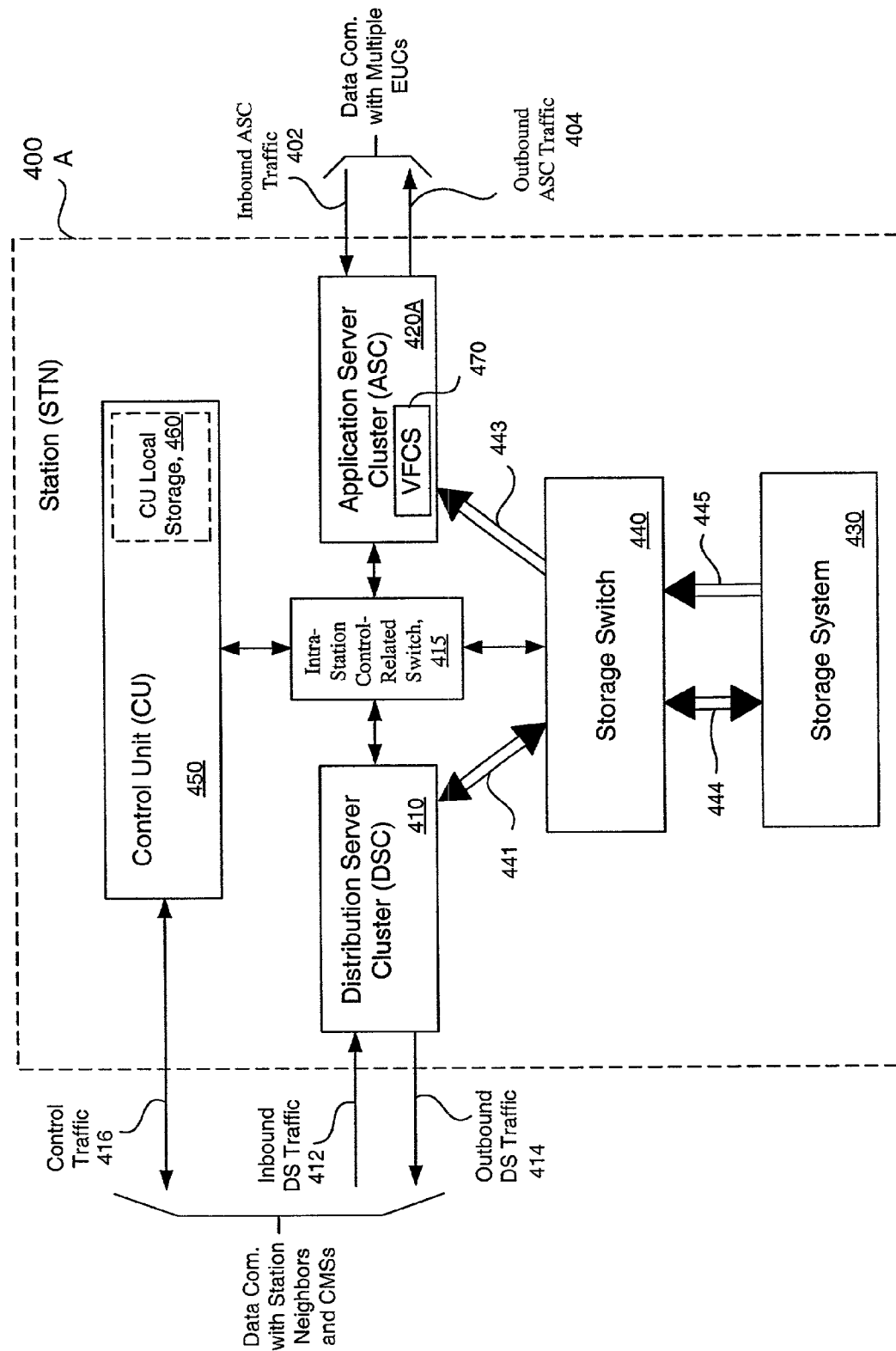
FIGS. 4A-4C are the simplified layouts of a distribution center in accordance with embodiments of the present invention.
Figure 4B:
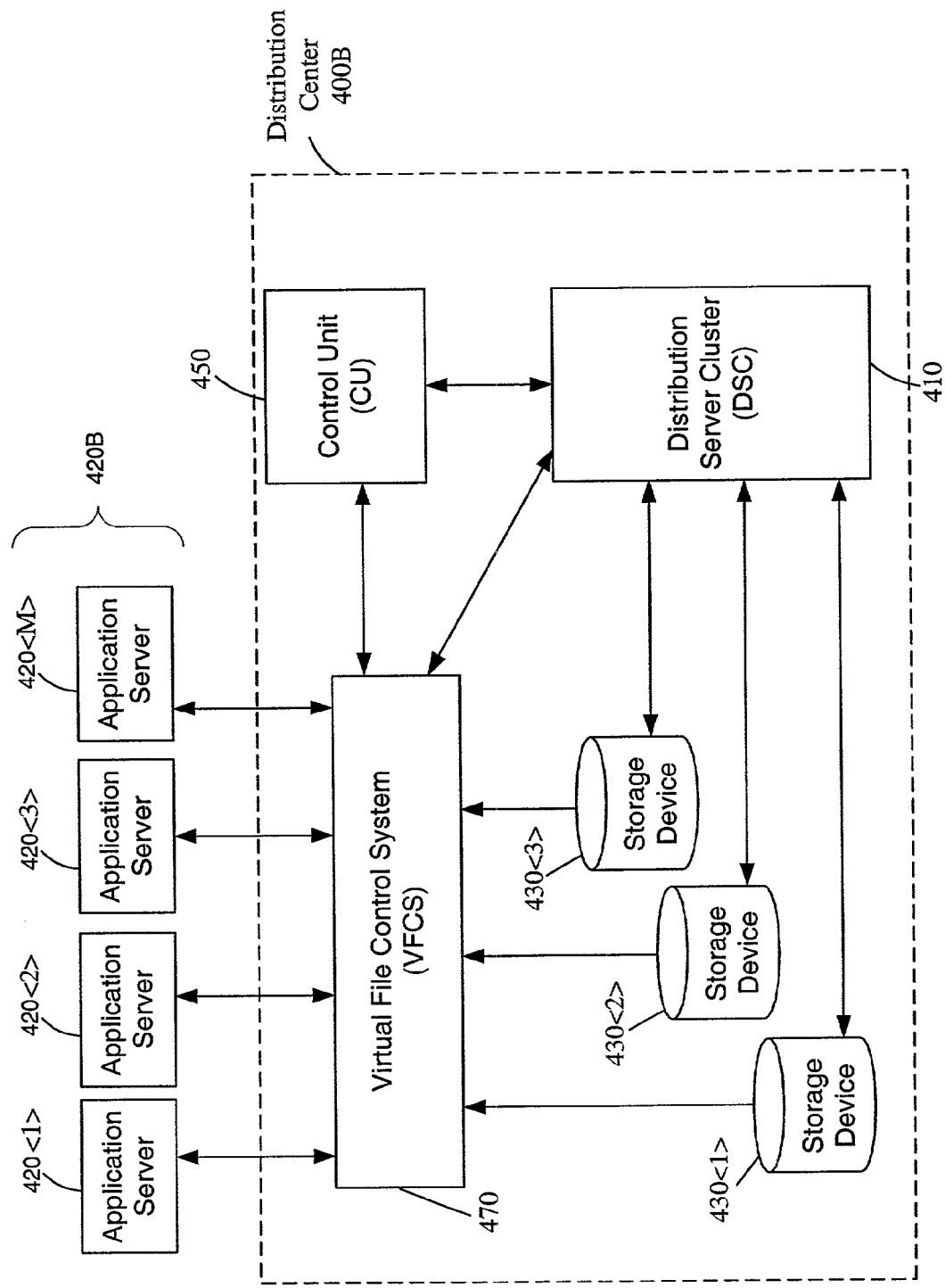
Figure 4C:
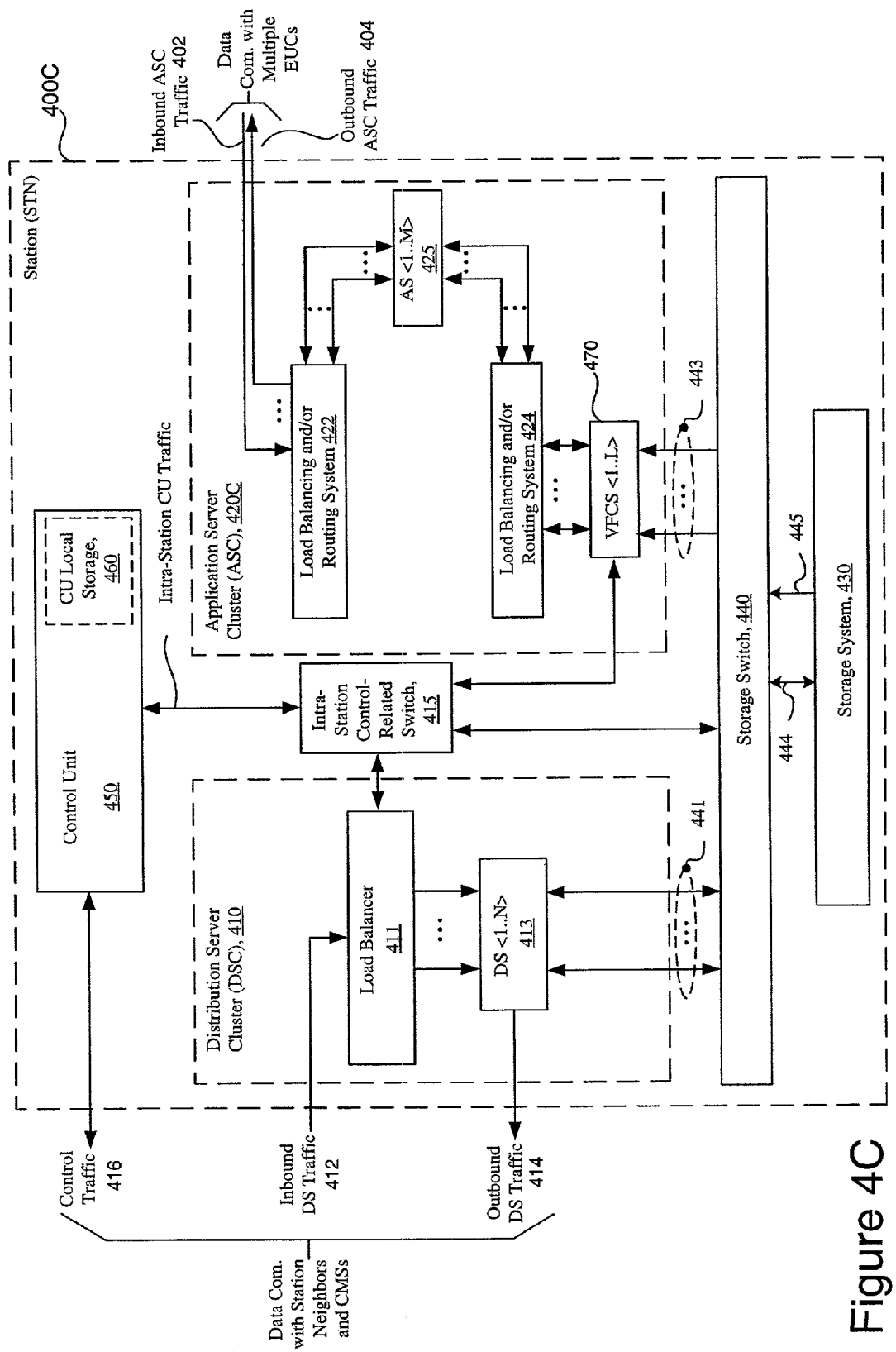

Distribution centers (DC) 400A-400C are described with respect to embodiments shown in FIGS. 4A-4C. A distribution center is also called a station or data center. The operation of distribution centers and their components according to the present invention is then described in even further detail.

FIG. 4A is a diagram of a distribution center 400A in accordance with an embodiment of the present invention. Distribution center 400A includes a distribution server cluster (DSC) 410, an application server cluster (ASC) 420A, a control unit (CU) 450, a shared storage system 430, a storage switch 440, and an intra-station control-related switch 415. Distribution server cluster 410 communicates with storage system 430 through storage switch 440 using communication links 441 and 444. Application server cluster 420A communicates with storage system 430 through storage switch 440 using communication links 443 and 445. Application server cluster 420A further includes a virtual file control system 470 according to the present invention. Control unit 450, distribution server cluster 410, and application server cluster 420A all communicate through intra-station control related switch 415, which communicates with storage switch 440. Control unit 450 has its local storage system 460.

Distribution center 400A communicates with multiple EUCs 150 through application server cluster 420A. Inbound ASC traffic 402 arrives at application server cluster 420A from one or more EUCs 150 in network 100. Outbound ASC traffic 404 is sent from application server cluster 420A to one or more EUCs 150 in network 100. Distribution center 400A also communicates with other distribution centers 140 and CMSs 170 in network 100 through distribution server cluster 410. Inbound DS traffic 412 arrives at distribution server cluster 410 from one or more distribution centers 140 and/or CMSs 170 in network 100. Outbound DS traffic 414 is sent from distribution server cluster 410 to one or more distribution centers 140 and/or CMSs 170 in network 100. Control unit 450 sends and receives control traffic 416 to and from one or more distribution centers 140 and/or CMSs 170 in network 100.

FIG. 4B is a diagram of distribution center 400B in accordance with another embodiment of the present invention. Distribution center 400B includes control unit 450, one or more virtual file control systems (VFCS) 470, one or more distribution servers in a distribution server cluster 410, and a plurality of storage devices 430<1>-430<3>. Application server cluster 420B incldues one or more application servers 420<1>420<M> and each VFCS 470. Control unit 450 is the network manager for distribution center 400B and is coupled to each VFCS 470 and DSC 410. Application servers 420<1 . . . N> can be any type of application server including, but not limited to, streaming servers, FIP servers, and media players. Application servers 420<1 . . . N> are not part of distribution center 400B but are shown connected to virtual file control system 470 to illustrate how end-user clients 150 access files stored in SCDN 100. Storage devices 430<1 . . . 3> are coupled between DSC 410 and each VFCS 470.

The components of distribution server cluster 410 do not have to be located at the same node as VFCS 470 and control unit 450. For example, each VFCS 470 may be located with the application servers 420, and control unit 450 may be located elsewhere such as with VFCS 470. Thus, it is not necessary for all components of distribution center 400B to be collocated at an SCDN node.

FIG. 4C shows a distribution center 400C in accordance with another embodiment of the present invention. FIG. 4C illustrates how distribution servers are clustered together with a load balancer as the interface to the rest of network 100. Distribution center 400C is similar to distribution center 400A but has a distribution server cluster (DSC) 410 which includes a load balancer 411 coupled to a plurality of distribution servers 413 DS<1 . . . N>. Distribution servers 413 are clustered together in station 400C to balance their workload. DSC 410 provides, among other things, system fault tolerance and scalability. Although there are multiple distribution servers 413 in one station, they appear as one interface to the outside stations. Load balancer 411 is their interface to the outside, which dispatches requests to each DS<1 . . . N> with awareness of their current workload.

Distribution center 400C further includes an application server cluster 420C. Application server cluster 420C includes a load balancing and/or routing system 422, application servers 425 AS<1 . . . M>, a load balancing and/or routing system 424, and one or more virtual file control systems (VFCS) 470. Inbound ASC traffic 402 arrives at load balancing and/or routing system 422 which distributes the traffic across application servers 425 AS<1 . . . M>. Traffic from application servers 425 is sent to load balancing and/or routing system 424 which distributes the traffic across virtual file control systems 470 VFCS<1 . . . L>. Outbound ASC traffic 404 is routed from switch 415 through virtual file control systems 470 VFCS<1 . . . L> to application servers 425, and then to load balancing and/or routing system 422. Embodiments of application server clusters are further described with respect to FIGS. 5A-5C. An embodiment of a virtual file control system cluster with a load balancer and multiple virtual file control is further described with respect to FIG. 6.

A content owner creates, moves, deletes, renames, updates, and manages file system objects directly through one or multiple distribution centers 140, 400 or indirectly through one or more content management servers 170. A content owner can also upload a file or directories of files to one or more content management servers 170 using content publishing and management tools running on a content owner's client system 130. After receiving the file system objects, CMS 170 or a VFCS 470 process the file system objects and create object metadata, the details are described below with reference to FIGS. 7A-C and other figures. To process a file object, CMS 170 or VFCS 470 determine track files (also known as linear files) within the original file, if required. A linear file is a file that maintains the order associated with the substance (i.e., substantive content) of the file. In one example of the invention, a linear file is a file in which the first 10% of the content that the application needs is located approximately within the first 10% of the entire file, starting at the beginning of the file. In a non-linear file, the first 10% of the content may be scattered throughout multiple locations in the file. If, for example, the linear file contained a movie, the beginning of that file would include the beginning portions of the movie. Similarly, the middle and end portions of the movie would be located at the middle and end of the linear file. Linear files are desired because it is easier to reassemble such files using linear superposition, for example. Some files are non-linear, that is, they contain multiple tracks or segments such that the first part of the content, for example, is not stored in the beginning of the file.

After having processed a file system object, the CMS 170 or VFCS 470 transfers the file system object to a distribution server 140, 400 to which it is connected or assigned. If the object is a file, the distribution server 140, 400 breaks the entire file (all the track files) down to block files, as desired for storage. The block files may subsequently be stored in local storage locations 430<1 . . . n>, for example. Part of the metadata is generated during the processing of the file system object. For example, in the case of a file, a "chunking" process is used to locate track files and break the file down to block files that generate most of the metadata. The metadata of a file is used to reconstruct the file from a group of block files.

A file distribution protocol (e.g., FDP) command is subsequently used to distribute (i.e., replicate) the metadata and file system objects, or selected portions thereof, to other distribution server nodes within the scalable content delivery network 100. For initial replication of a file, the entire block files (the chunks that partitioned from an original file) need not be stored in all nodes however a master copy may be maintained completely in some nodes (typically the originating node). The FDP includes commands to facilitate file transfers and manipulations within SCDN 100. The size of the blocks affects the performance of both content distribution and content delivery and is discussed further below.

a. Virtual File Control System:

Each virtual file control system (VFCS) 470 creates an integrated file system directory presentation of a network nodes from the meta file system structure and object metadata. The meta file system structure and object metadata are created from the processing and storing of file system objects; for a file object, that process is the "chunking" process. The data blocks of each file presented through a VFCS 470 are not necessarily stored in local storage devices of a single node. VFCS 470 is able to piece the original file back together in real time while serving an end user request and importing the non-resident blocks from other nodes to the local storage devices. As described below, all the blocks of the file need not be stored at one distribution center; however, the entire file is available within SCDN 100. When an end user connects to an application server, VFCS 470 creates a virtual appearance that the entire file system directory and the entire files are available at that node. For example, assuming only fifteen percent of a two-gigabyte file is stored in storage 430<1 . . . 3>, VFCS 470 makes an application server think that the entire library and the entire two gigabytes file is available at the location. Thus, application server, such as a streaming server, may start playing the file. As the file is being played, VFCS 470 communicates with a DS to locate and retrieve the remaining portions of the file from other nodes in the network.

b. Application Server Cluster:

An application server cluster (ASC) according to the present invention includes a group of application servers and a group of virtual file control systems. An ASC provides, among other things, services to an end-user (e.g., streaming a full-length movie to an end-user's client system). As described above, the VFCS provides a management interface for content owner, while providing system fault tolerance and scalability.

Figure 5A:
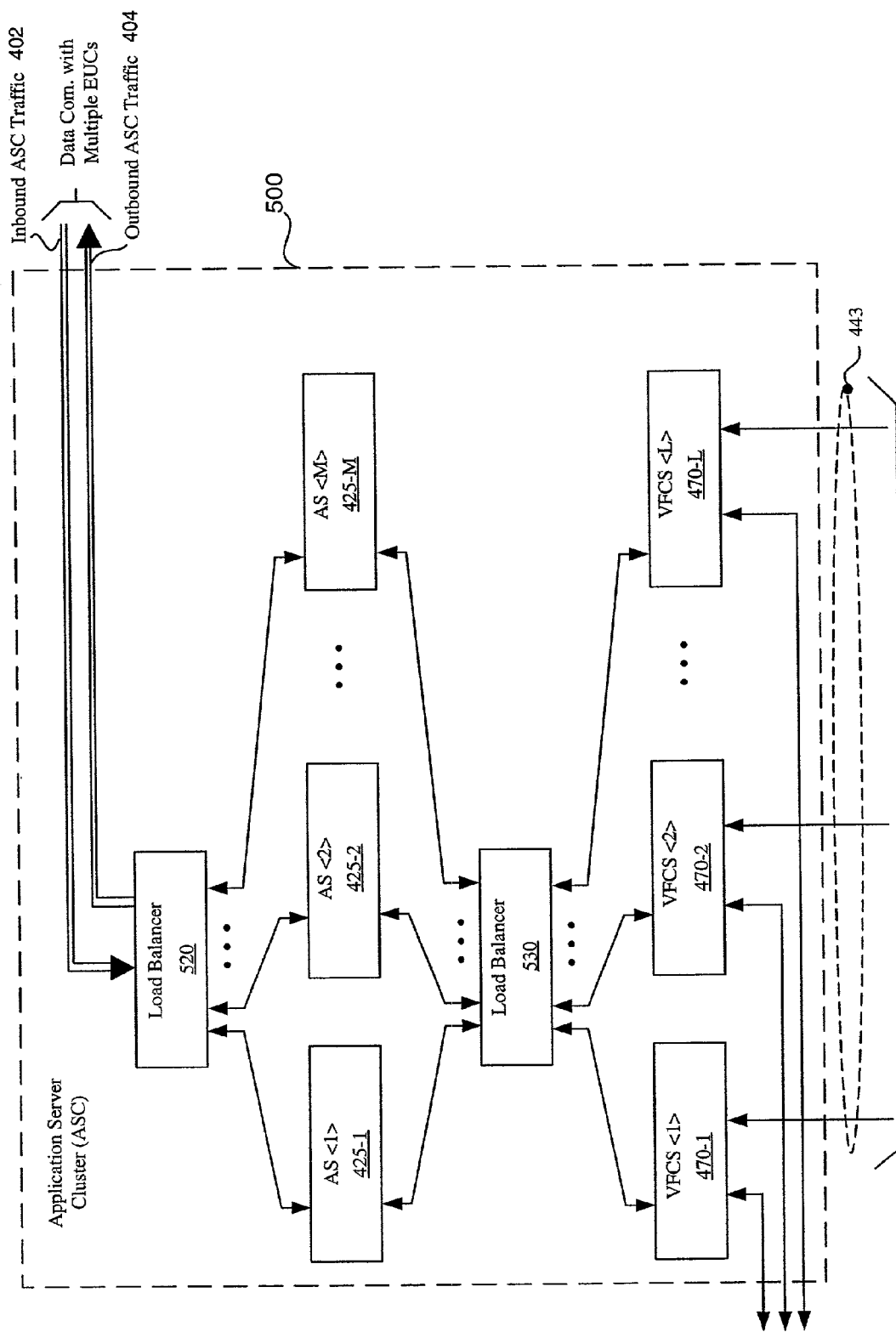
FIGS. 5A-5C provide three illustrative embodiments of the application server cluster in accordance with the present invention.
Figure 5B:
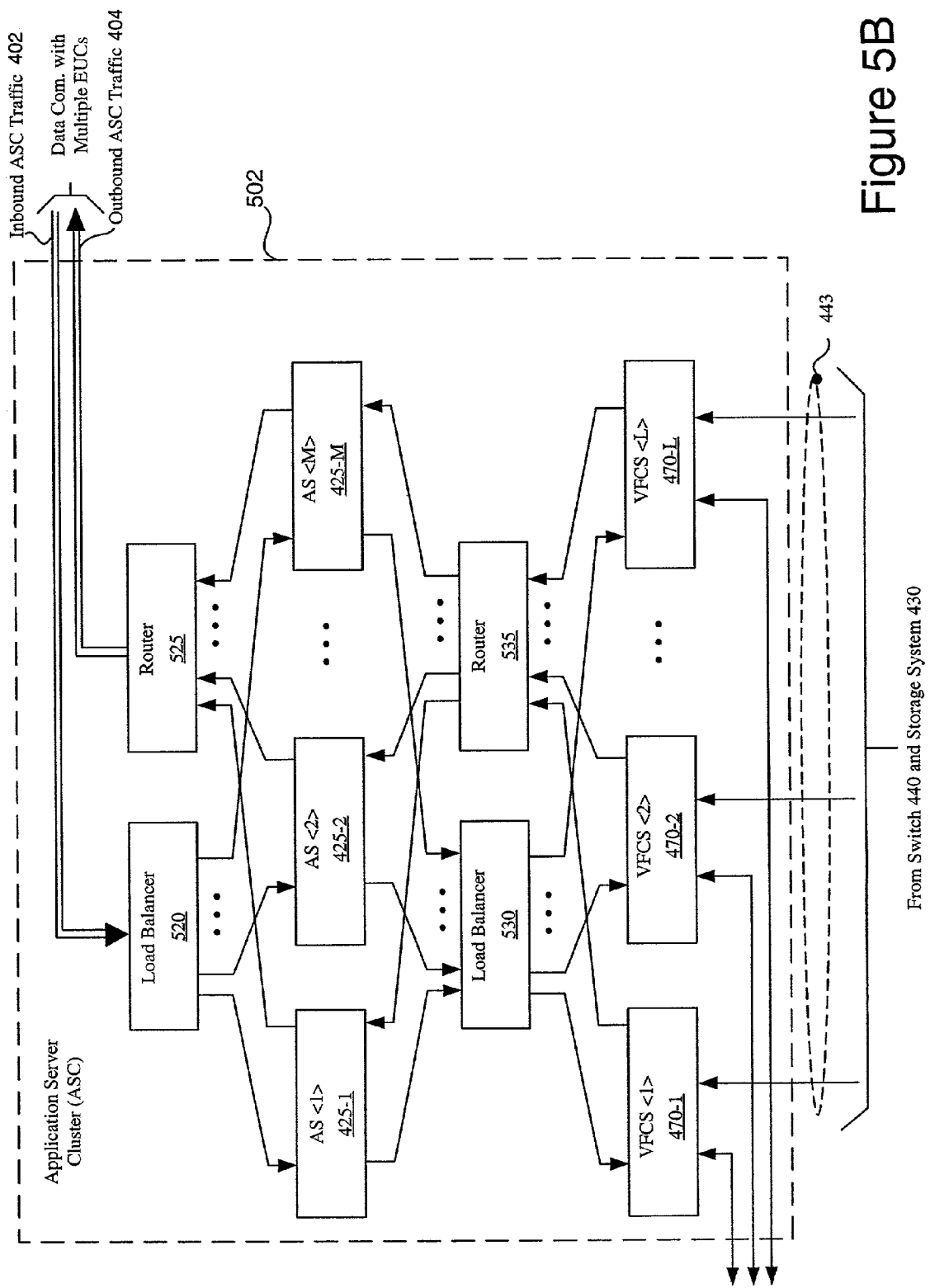
Figure 5C:
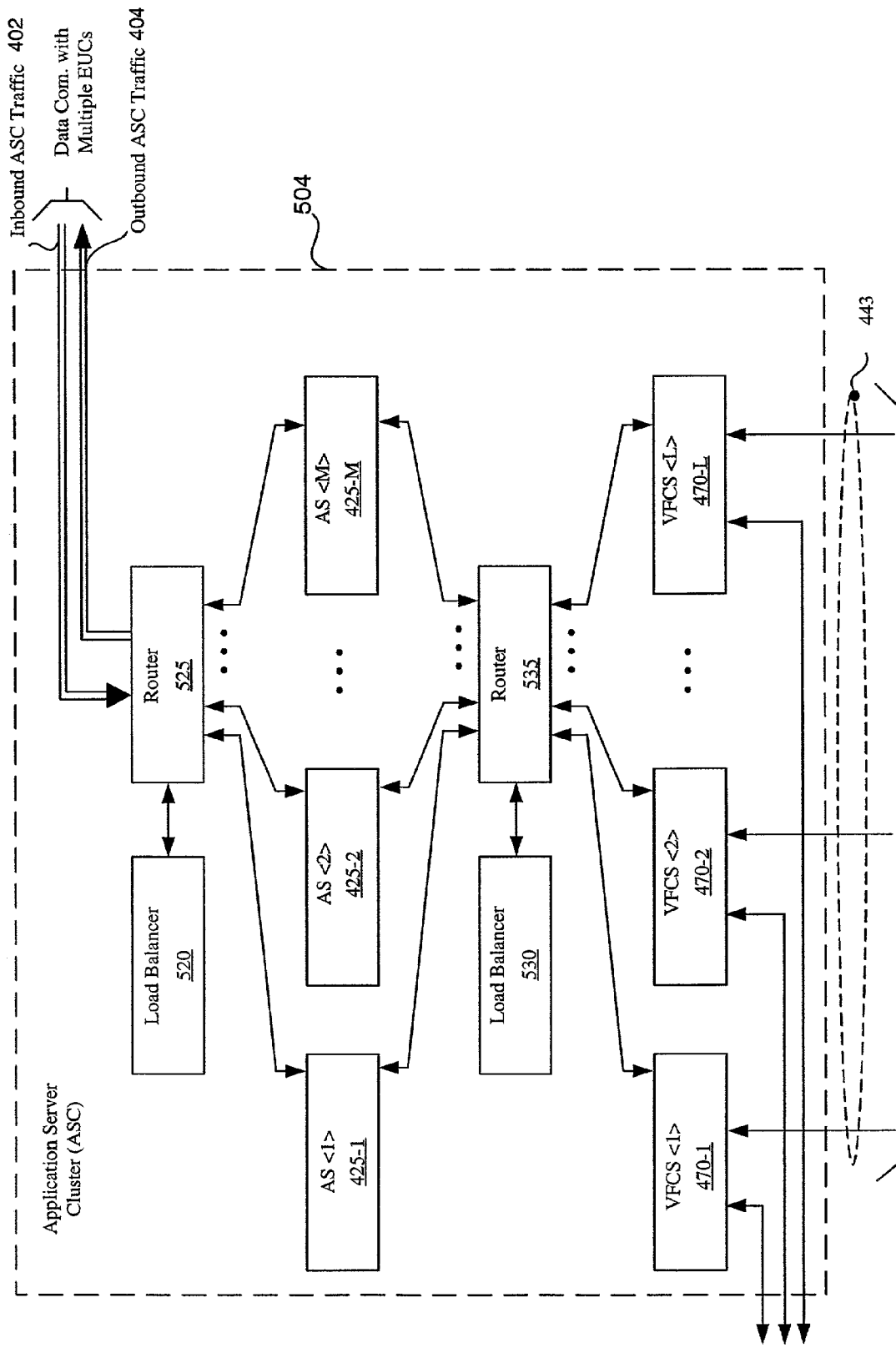

FIGS. 5A-5C show embodiments of three respective application server clusters 500, 502, 504 according to the present invention. Each application server cluster 500, 502, 504 includes load balancers 520 and 530, a plurality of application servers 425<1> through 425<M> (collectively 425), and a plurality of virtual file control systems 470-1 through 470-L (collectively 470). In one example, each virtual file control system 470-1 through 470-L is implemented on a respective server (called a virtual file control system server). The application server clusters 500, 502, 504 provide fault-tolerant and scalable system performance. For example, if one of the application servers 425<1> through 425<M> fail or if one of the VFCS servers system 470-1 through 470-L fail, one of the other existing application servers 425 or VFCS servers 470, respectively, will process the requests. Similarly, if more system performance is required, the application servers, VFCS servers, or storage capacity of storage system 430 can be increased as required.

FIG. 5A is an illustrative embodiment of an Application Server Cluster 500. Each Application Server 425 accesses data (e.g., large payload files) via one of the station's VFCS Servers 470, which in turn access data in the Storage System 430 via Switch 440. Although they are shown logically as two separate units in FIG. 5A, Load Balancer 520 and Load Balancer 530 may be the same physical unit. Also, an Application Server 425 and VFCS server 470 may be contained in the same physical unit thereby eliminating one of load balancers 520 or 530.

An end-user accesses, creates, or manages a file system object using a standard interface (such as a web browser or a file system client) that is running on the end-user's client machine. As a result, if the user accesses a file system object through an application server, a service request for the file is sent to ASC 500 and arrives at Load Balancer 520. The inbound data packets for the service request are forwarded by Load Balancer 520 to one of the Application Servers 425, e.g., Application Server 425-1 (an arbitrary illustrative one of 425-1 through 425-M). Application Server 425-1 issues a request for the required data to Load Balancer 530. Load Balancer 530 selects one of the Station's VFCS Servers 470, e.g., VFCS 470-3 (an arbitrary illustrative one of 470-1 through 470-L), to handle the request and forwards the data packets from Application Server 425-1 to VFCS 470-3. Assuming all of the requested data is present in Storage System 430, VFCS 470-3 processes the request by storing or accessing the data in Storage System 430 via Switch 440 and sends data and response back to Application Server 425-1 via Load Balancer 530. An end user request may go directly to the load balancer 530 and directly and then to a selected VFCS servers 470.

When Application Server 425-1 or an end user client's file system browser CPC (130 of FIG. 1) establishes a session with VFCS 470-3, Load Balancer 530 continues to forward data back and forth between Application Server 425-1 and VFCS 470-3 or CPC 130 and VFCS 470-3. If Load Balancer 530 supports a "sticky" feature and the "sticky" feature is turned "on", data from Application Server 425-1 or CPC 130 may continue to be directed to VFCS 470-3 beyond the current session, if VFCS 470-3 remains available (i.e., if Load Balancer 530 does not allocate VFCS 470-3 to another Application Server). When VFCS 470-3 becomes unavailable, Load Balancer 530 directs data packets from Application Server 425-1 or CPC 130 to another VFCS Server, e.g., 470-1 (another arbitrary illustrative one of 470-1 through 470-M). VFCS 470-1 processes the request from Application Server 425-1 or CPC 130 and sends response data packets to Application Server 425-1 or CPC 130 via Load Balancer 530. Data packets from Application Server 425-1 are sent back to the client via Load Balancer 520. Just like Load Balancer 530, Load Balancer 520 maintains a persistent session between the end-user's client system and Application Server 425-1. Load Balancer 520 may also provide the "sticky" feature. In another example, Load Balancer 520 can establish and re-establish sessions which are not persistent.

When a new request from a different end-user client system arrives at Load Balancer 520 of ASC 500, Load Balancer 520 forwards the new request to an available Application Server, e.g., Application Server 425-3 (another arbitrary illustrative one of 425-1 through 425-M). Application Server 425-3 processes the request and in turn makes a data request to one of the Station's VFCS Servers via Load Balancer 530, e.g., VFCS 470-2 (another arbitrary illustrative one of 470-1 through 470-L). Load Balancer 530 then forwards the data packets from Application Server 425-3 to VFCS 470-2. VFCS 470-2 processes the request from Application Server 425-3 and sends responses back to Application Server 425-3 via Load Balancer 530. Application Server 425-3 sends responses to the new end-user client system via Load Balancer 520.

FIG. 5B is another embodiment of an Application Server Cluster 502. ASC 502 includes one or more Application Servers 425-1 through 425-M (collectively 425), Load Balancer 520 with low bandwidth capability, Router 525 with high network throughput, Load Balancer 530 (also with low bandwidth capability), Router 535 and one or more VFCS Servers 470-1 through 470-L (collectively, 470). Each Application Server accesses data (e.g., large payload files) via one of the Station's VFCS Servers 470, which in turn accesses data in Storage System 430 via Switch 440. Although they are shown logically as two separate units in FIG. 5B, Load Balancer 520 and Load Balancer 530 may be the same physical unit, and Router 525 and Router 535 may be the same physical unit. Also, Application Server(s) 425 and VFCS server(s) 470 may be contained in the same physical unit thereby eliminating one of load balancers 520 and 530 and one of routers 525 and 535. Thus, a configuration according to an embodiment of the present invention eliminates load balancer 530, router 535, and combines application server(s) 425 with VFCS server(s) 470.

The present embodiment leverages the fact that the outbound traffic from both the VFCS Servers 470 and the Application Servers 425 of the application server cluster may be significantly higher than the inbound traffic. As shown in FIG. 5B, the outbound traffic is sent to Router 525 and Router 535, while the inbound traffic is sent to the load balancers 520, 530 but not routers 525, 535. By separating the inbound and outbound traffic, this embodiment contributes to network performance improvement.

An end-user requests a file system object using a standard interface (such as a web browser) that is running on the end-user's client machine. As a result, a service request for the file system object is sent to ASC 502 and arrives at Load Balancer 520 or 530. The inbound data packets of the service request are forwarded by Load Balancer 520 to one of Application Servers 425, e.g., Application Server 425-1 (an arbitrary illustrative one of 425-1 through 1810-M). Application Server 425-1 issues a request for the required data to Load Balancer 530. Load Balancer 530 selects one of VFCS Servers 1470, e.g., VFCS 470-1 (an arbitrary illustrative one of 470-1 through 470-L), to handle the request and forwards the data packets from Application Server 425-1 to VFCS 470-1. VFCS 470-1 processes the request by writing to or accessing the data in Storage System 430 via Switch 440 and sends the data and a response back to Application Server 425-1 via Router 535 or directly back to the client or via a load balancer as shown in an arrangement in FIG. 6.

When Application Server 425-1 establishes a session with VFCS 470-1, Load Balancer 530 continues to send data from Application Server 425-1 to VFCS 470-1. If Load Balancer 530 supports the "sticky" feature and that feature is turned "on", data from Application Server 425-1 may continue to be directed to VFCS 4700-1 beyond the current session, so long as VFCS 470-1 remains available (i.e., if Load Balancer 530 does not allocate VFCS 470-1 to another Application Server). The data from VFCS 470-1 to Application Server 425-1 flows through Router 535. Router 535 forwards data packets it receives from VFCS 470-1 to Application Server 425-1. Application Server 425-1 sends data packets to the end-user client system via Router 525.

When a new request from a different end-user client arrives at Load Balancer 520 of ASC 502, Load Balancer 520 forwards the new request to an available Application Server, e.g., Application Server 425-3 (another arbitrary illustrative one of 425-1 through 425-M). Application Server 425-3 processes the request and in turn issues a data request to one of the VFCS Servers via Load Balancer 530, e.g., VFCS 470-3 (another arbitrary illustrative one of 470-1 through 470-L). VFCS 470-3 processes the request from Application Server 425-3 and sends data back to Application Server 425-3 via Router 535.

Application Server 425-3 sends response data back to the end-user client system via Router 525.

FIG. 5C is a third illustrative embodiment of an Application Server Cluster 504. This embodiment is similar to the embodiment of FIG. 5B but differs in two aspects: (1) all EUC-related data traffic 402, 404 in and out of the ASC passes through Router 525 and (2) all data traffic between application servers 425 and the VFCS Servers 470 passes through Router 535. Inbound client data packets flow through Router 525 to Load Balancer 520. Load Balancer 520 then dispatches the inbound traffic to the Application Servers via Router 525. All outbound traffic flows through Router 525 to the end-user client system. Inbound traffic to the VFCS Servers 470 flows from Router 535 to Load Balancer 530. Load Balancer 530 dispatches the inbound traffic to the VFCS Servers 470 via Router 535. VFCS Server outbound traffic flows through Router 535 to the corresponding Application Servers 425. Again, Load Balancer 520 and Load Balancer 530 may be the same physical unit, and Router 525 and Router 535 may be the same physical unit. Also, Application Server 425 and VFCS server 470 may be contained in the same physical unit thereby eliminating one of load balancers 520 and 530 and one of routers 525 and 535. Thus, a configuration according to an embodiment of the present invention eliminates load balancer 530, router 535, and combines application server(s) 425 with VFCS server(s) 470.

Figure 6:
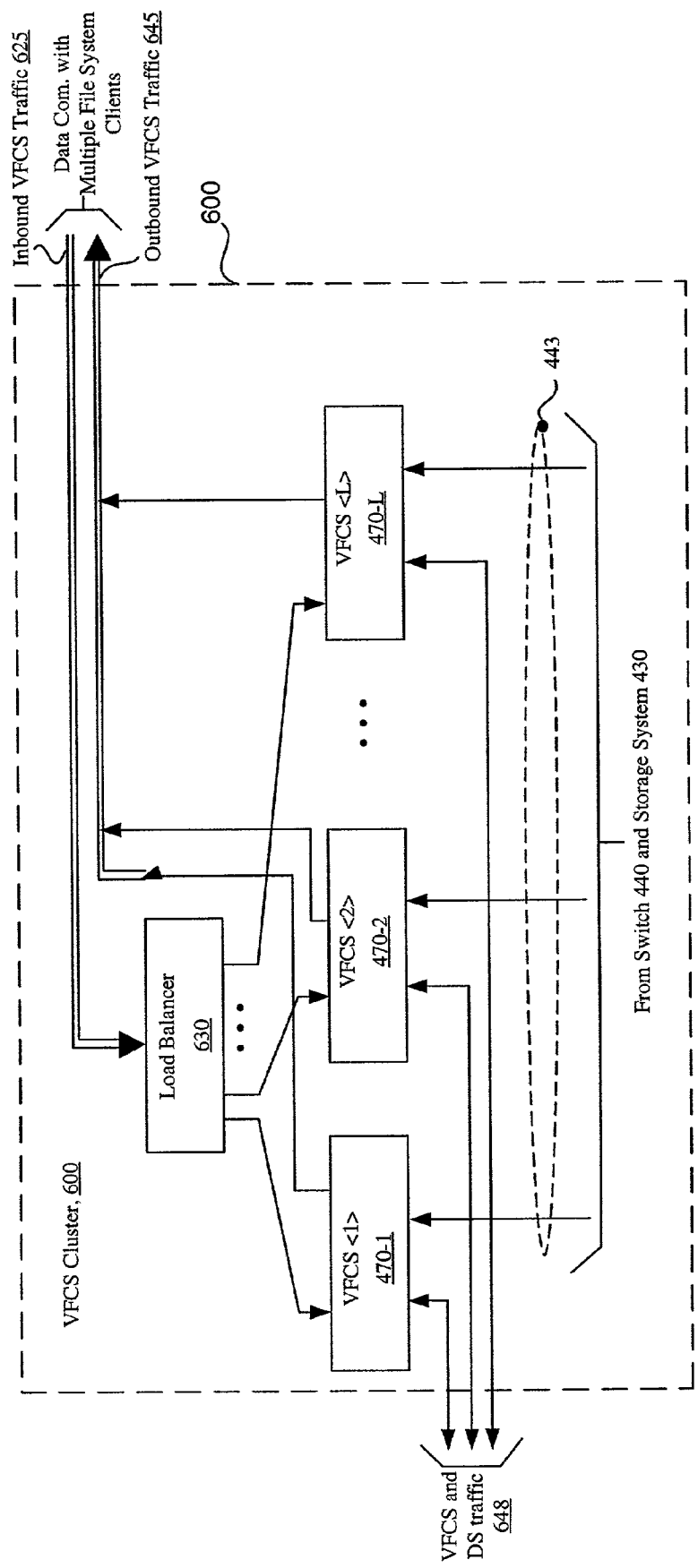
FIG. 6 presents a layout of a Virtual File Control System cluster in accordance with an embodiment of the present invention.

The embodiment of FIG. 5A employs a load balancer with sufficient capacity to handle both inbound and outbound traffic cluster. The embodiments of FIGS. 5B and 5C have advantages for clusters with heavy outbound traffic and lower inbound traffic. Both utilize two small capacity load balancers. In the embodiment of FIG. 5B, the inbound and outbound traffic is split between the load balancers and routers, while in the embodiment of FIG. 5C, the inbound and outbound traffic goes through the routers, which use the load balancers as a resource. For application server clusters with heavy two-way traffic, smaller capacity load balancers and routers are desired such as in the embodiments of FIGS. 5B and 5C. The embodiments of FIGS. 5B and 5C may be configured using load balancers that can operate in transparent mode.

c. Virtual File Control System Cluster:

FIG. 6 is an illustrative embodiment of an virtual file control system cluster 600. VFCS cluster 600 includes one or more VFCS units 470<1 . . . L> which are combined to create one virtual VFCS through load balancing cluster manager 630 (also called a load balancer). The requests for data 625 are routed through the load balancer 630 to a most available VFCS unit 470<1 . . . L>, while the returning data is shipped directly to the caller. In this VFCS cluster 600, each VFCS unit 470<1 . . . L> communicates directly with a local distribution server as shown by traffic 648.

B. Content Publishing and Management

Content publishing and management includes creation, update content, update attributes, re-location, deletion, and other management of file system objects. A file system object includes a volume, directory, and/or a file.

1. Creation, Updating, Renaming, Re-location, Deletion of File System Objects

Figure 7A:
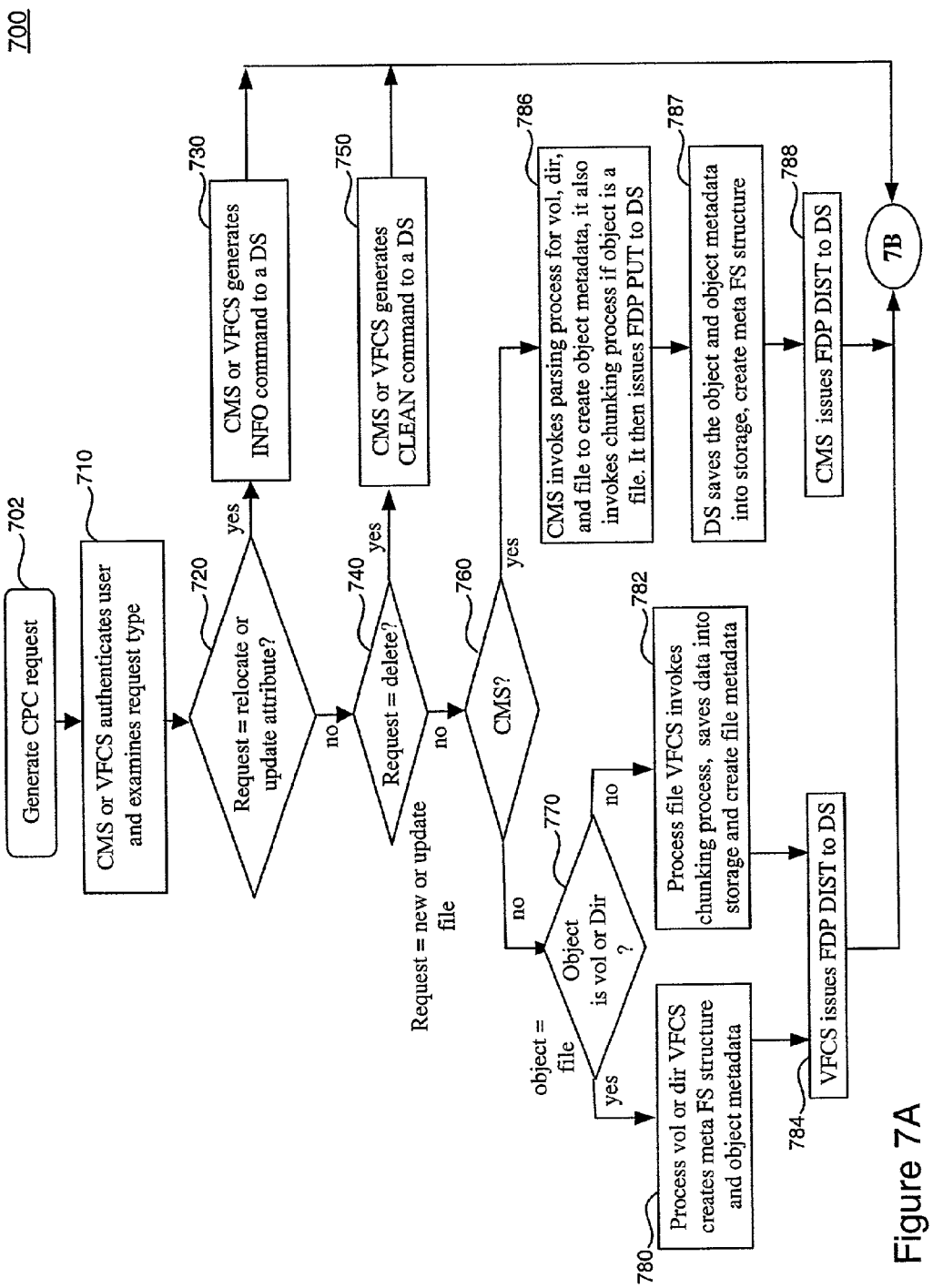
FIGS. 7A-B shows the process of introducing a new file system object into a SCDN, or updating or deleting an existing file system object from a SCDN in accordance with an embodiment of the present invention.
Figure 7B:
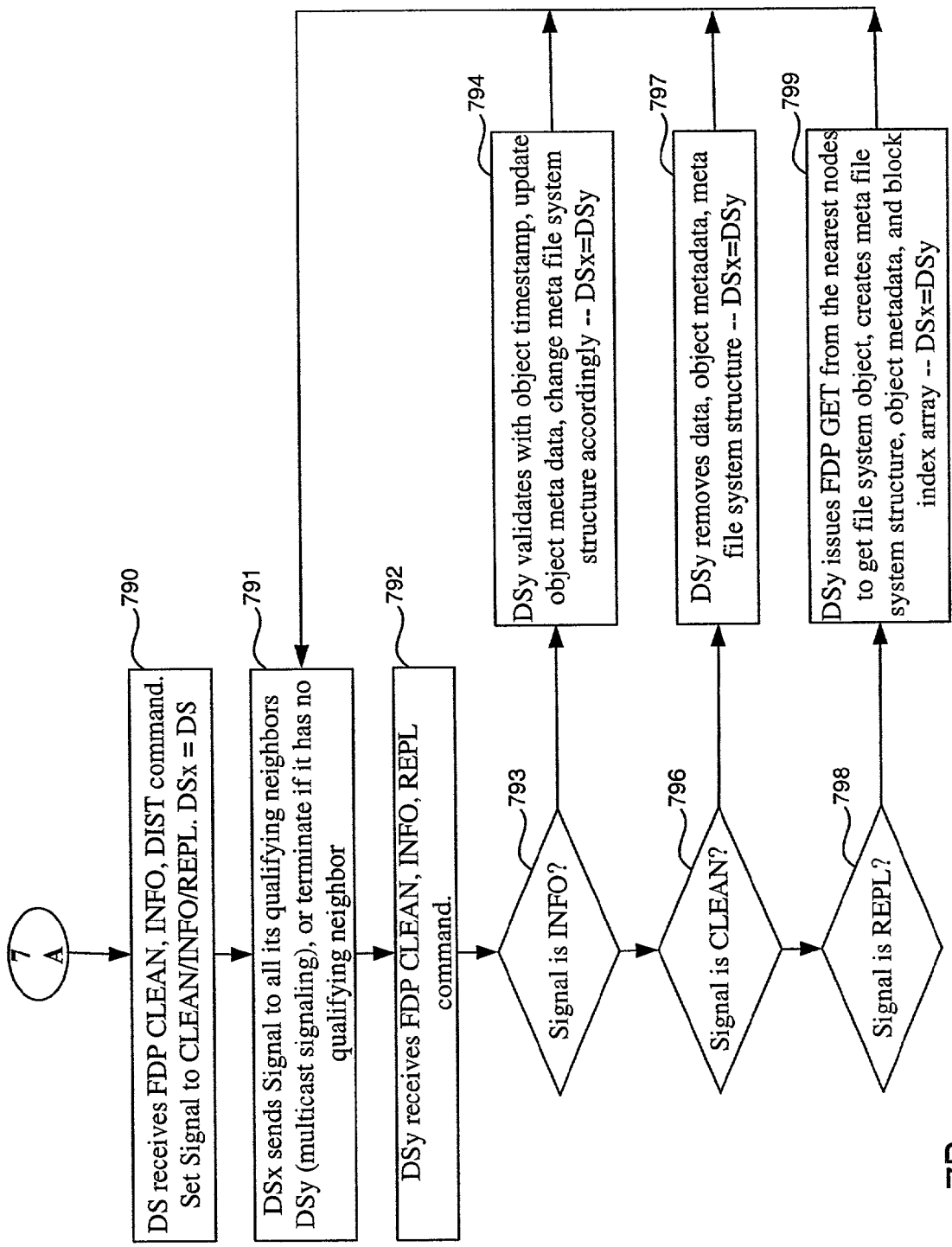

FIGS. 7A-B are flow diagrams that show the publishing, distribution, and management of file system objects according to embodiments of the present invention. In particular, a routine 700 is shown including steps (702-799). The publishing, distribution, and management of file system objects includes introducing a new file system object into SCDN 100 through either CMS 170 or VFCS 470, or changing the content and information of an existing file system object in SCDN 100, or deleting an existing file system object. For convenience, routine 700 is described with respect to any distribution center 400A-400C; this description is illustrative and not intended to necessarily limit routine 700.

As shown in FIG. 7A, in step 702, a content publishing and management request is generated by CPC 130. CPC 130 can be an application that is supported by CMS 170, or it can be a file system client supported by VFCS 470 or VFCS cluster 600. Once a CPC client request is generated in step 702, the CMS 170 or VFCS 470 authenticates the user, and examines the request type (step 710). If the request types indicate a re-location or updating of attribute value (attributes such as name, dates, access control list, etc.) of the file system object, CMS 170 or VFCS 470 generates a File Distribution Protocol (FDP) INFO command with the relevant object metadata and sends the generated INFO command to distribution server cluster 410 in a distribution center (step 730). If the request type is to delete the file system object, CMS 170 or VFCS 470 generates a FDP CLEAN command with the relevant object metadata and sends the generated send CLEAN command to command to distribution server cluster 410 in a distribution center (steps 740 and 750).

In step 760, if the request is to create a new file system object or update file content, VFCS 470 and CMS 170 handle the request differently. If the request is handled by a VFCS 470 then control proceeds to step 770. If the request is handled by a CMS 170 then control proceeds to step 786.

In step 770, if the file system object is a volume or a directory, control proceeds to step 780. If the file system object is a file, then control proceeds to step 782. In step 780, VFCS 470 invokes a parsing process to create volume or directory metadata, it creates an object in its meta file system structure, it also creates the relevant object metadata. In step 782 (where the file system object is a file), a "chunking process" is applied to decompose the file and generate a block index array as part of the metadata. If the file system object is new, VFCS 470 assigns a new object unique ID to the file, otherwise, it uses the existing ID for the file. Afte step 780 or 782, control proceeds to step 784.

In step 784, after creating or updating the file system objects and their metadata in the local storage, VFCS 470 issues an FDP DIST command to distribution server cluster 410 to initiate the replication of the changes according to a set of distribution rules.

In steps 786-788, the request is handled by CMS 170. In step 786, if the file system object is a volume, directory or file, CMS 170 applies a parsing process to generate the necessary object metadata (volume, directory and/or file metadata) and issues an FDP PUT command to upload the object to a distribution server cluster 410. Also in step 786, if the file system object is a file object, a "chunking" process is applied to decompose the file and create file metadata. In one embodiment, this chunking process is carried out in CMS 170 and partly in distribution server cluster 410. Upon receiving an FDP PUT command, distribution server cluster 410 saves the object metadata and the file system object into the local storage (step 787). Distribution server cluster 410 further creates a meta file system structure if the file system object is a volume or a directory and creates a block index array for a file object as additional part of the file metadata (step 787). CMS 170 follows by issuing a FDP DIST command to distribution server cluster 410 to initiate the distribution of the file system object according to a set of distribution rules (step 788). After step 784 or step 788, control proceeds to step 790 of FIG. 7B.

As shown in FIG. 7B, when distribution server cluster 410 (areceives the FDP commands, INFO, CLEAN, or DIST, it starts a multicast signaling process among all the distribution server clusters in network 100 (steps 790-791). To aid in the description of FIG. 7B, the distribution server cluster carrying out steps 790 and 791 is also labelled as "DSx." A neighboring or other distribution server cluster is labelled in FIG. 7B as "DSy."

In one embodiment, signal multicasting happens only among a qualified set of distribution server clusters based on distribution rules and/or criteria, which are described in more detail below. The multicast signaling for INFO command and CLEAN command are not changed; the multicast signal for a DIST command is a replicate REPL command. In step 791, distribution server cluster DSx (referred to as a signaling distribution server cluster) sends the signal to all its neighbors that match the distribution criteria/rules except the signaling DSx. Distribution server cluster DSx can terminate the signal if no neighboring distribution center cluster matches the distribution criteria/rules.

Consider an example. If distribution server cluster DSx (or simply A) signals a neighbor distribution server cluster DSy (or simply B), and if B is not available temporarily, the signal for B is saved at A, while A went ahead to signal all B's neighbor distribution server clusters. When B becomes available again, A resumes the signal to B. More details about FDP signaling are described in a later section.

In steps 792-798, DSy receives the signal and handles the signal accordingly. If the signal is INFO command (step 793), Dsy validates the appropriate timestamps (creation timestamp of the object, and the update timestamp) and changes the object metadata and/or meta file system structure accordingly (step 794). Meta file system structure is updated if an object is relocated to other directory. If the signal is CLEAN command (step 796), DSy removes the data, object metadata, and meta file system structure that are associated with that object (step 797). If the object is a volume or a directory, all the embedded subdirectories and files are removed. If the signal is a REPL command (step 798), DSy issues FDP GET command to the nearest neighboring node(s) to download the object metadata and some data blocks if the object is a file (step 799). DSy creates a directory node in meta file system structure if the REPL is for new volume or directory (step 799). DSy then saves the object metadata at the appropriate directory inside the meta file system structure (step 799). If the REPL target is a file object and the number of data blocks to download may be configured or based on a cost function. DSy also creates an block index array as part of the file metadata (step 799). In each of steps 794, 797, and 799, the particular distribution server cluster DSy continues the multicasting by becoming a signaling distribution server cluster (e.g., DSx is set to DSy). Control then returns to step 791. In this way, distribution server clusters participating in the multicast continue multicasting the signal until all terminating nodes are reached at step 791 and metadata is integrated.

Figure 7C:
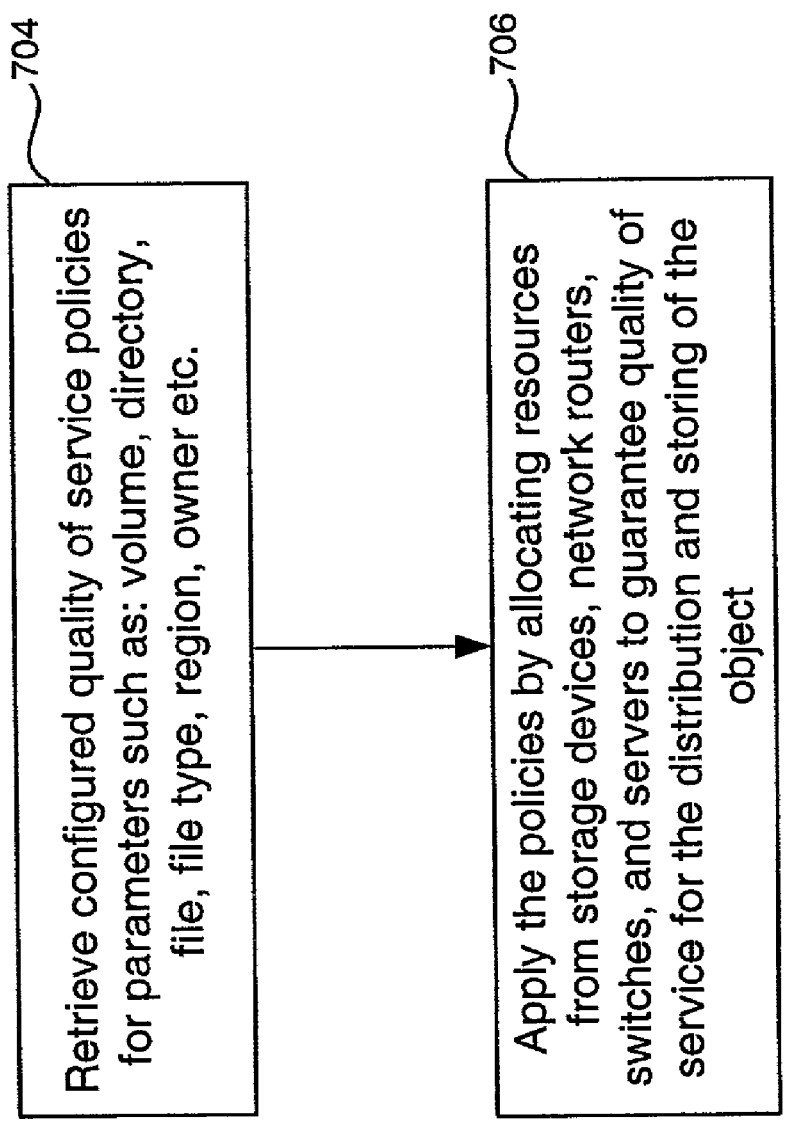
FIG. 7C shows the application of policies for quality of service based on file system object and object type in accordance with an embodiment of the present invention.

FIG. 7C illustrates processes in CMS 170, VFCS 470, and distribution server cluster 410 (e.g, DSx or Dsy), where quality of service policies may be retrieved (step 704) and applied (step 706) while distributing and saving file system objects according to configured parameters. For example, a policy may be configured to guarantee a certain class of quality of service to store and distribute an MPEG file. Yet, another policy may be configured to guarantee quality of service to a certain user group. CMS 170, VFCS 470, and distribution server cluster 410 may resource network or storage resources from switches, routers, or servers in network 100. Steps 704 and 706 can be performed as part of any one or more of steps 784, 730, 750, 788, and 791.

2. Decomposing Large Files—Chunking Process a. Decomposition of Linear and Non-Linear Files The present invention can be used with any type of file. A file can include digital data in any file format. Such digital data can represent any type of data including but not limited to audio, video, graphics, text, control information, index information and combinations thereof. When a file is introduced to SCDN 100 through CMS 170 or VFCS 470, the file is divided into blocks in a number of steps, and the process may depend on whether or not it is a linear file or a non-linear file. Using a movie file for example in one aspect of the invention, the file is linear if the first 10% of the movie is located approximately within the first 10% of the file, the next 10% within the next 10% of the file, and so on. In contrast, a movie file in which the first 10% of the movie is located somewhere other than approximately within the first 10% of the file is considered to be a non-linear file.

Figure 8:
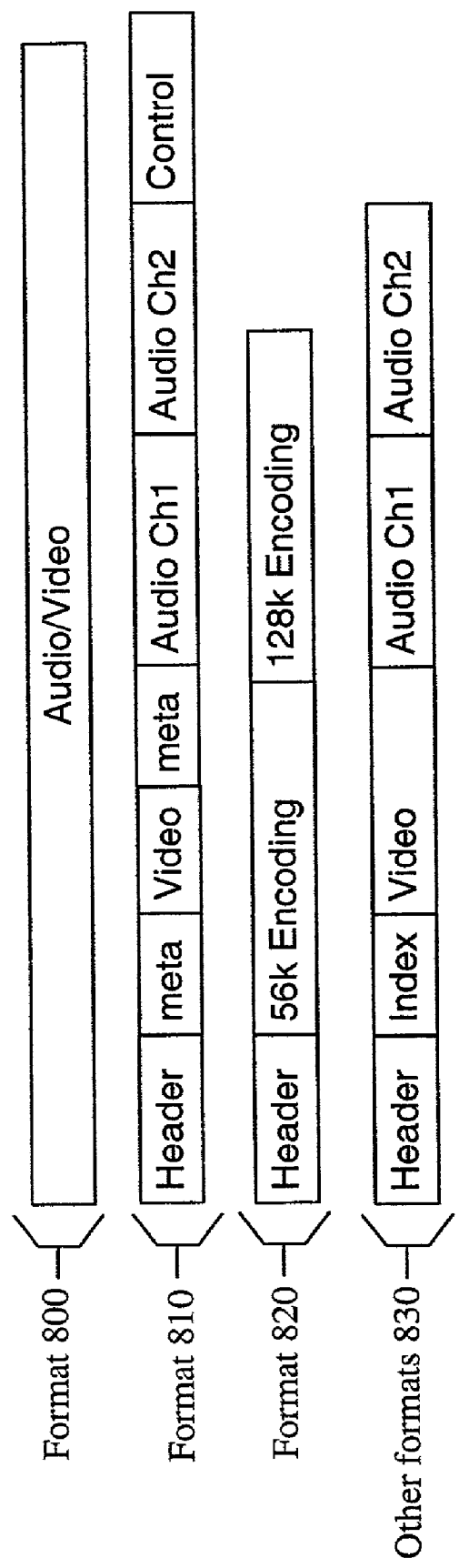
FIG. 8 is an illustration of linear and non-linear file structures as used in the present invention.

Example linear and non-linear file structures are illustrated in FIG. 8. Format 800 may represent the mpeg format, for example, which is linear because it contains audio/video data multiplexed together throughout the file in a single track, starting from the beginning. Note that each subdivision in the various formats represent a track. Formats 810-830 contain multiple tracks. As shown, format 810 is non-linear because it contains header information in the first track of the file, followed by meta information in the next track, then video information in the third track, then meta information in the fourth track, a first audio channel in the fifth track, a second audio channel in the sixth track, and then some control information at the end. Thus, the beginning of a movie formatted for format 810 would not reside in the beginning of the file. Formats 820 and 830 are representations of other possible non-linear media data formats. For example, format 820 may have data formatted such that the file contains header information in the beginning, then some 56K encoding for formats such as MPEG, followed by 128K encoding information. Other formats 830 may contain header information, followed by index information, followed by video, and finally audio information. All these and other non-linear files need to first be partitioned and re-arranged into linear fashion for compatibility with the replication algorithm discussed below.

Figure 9:
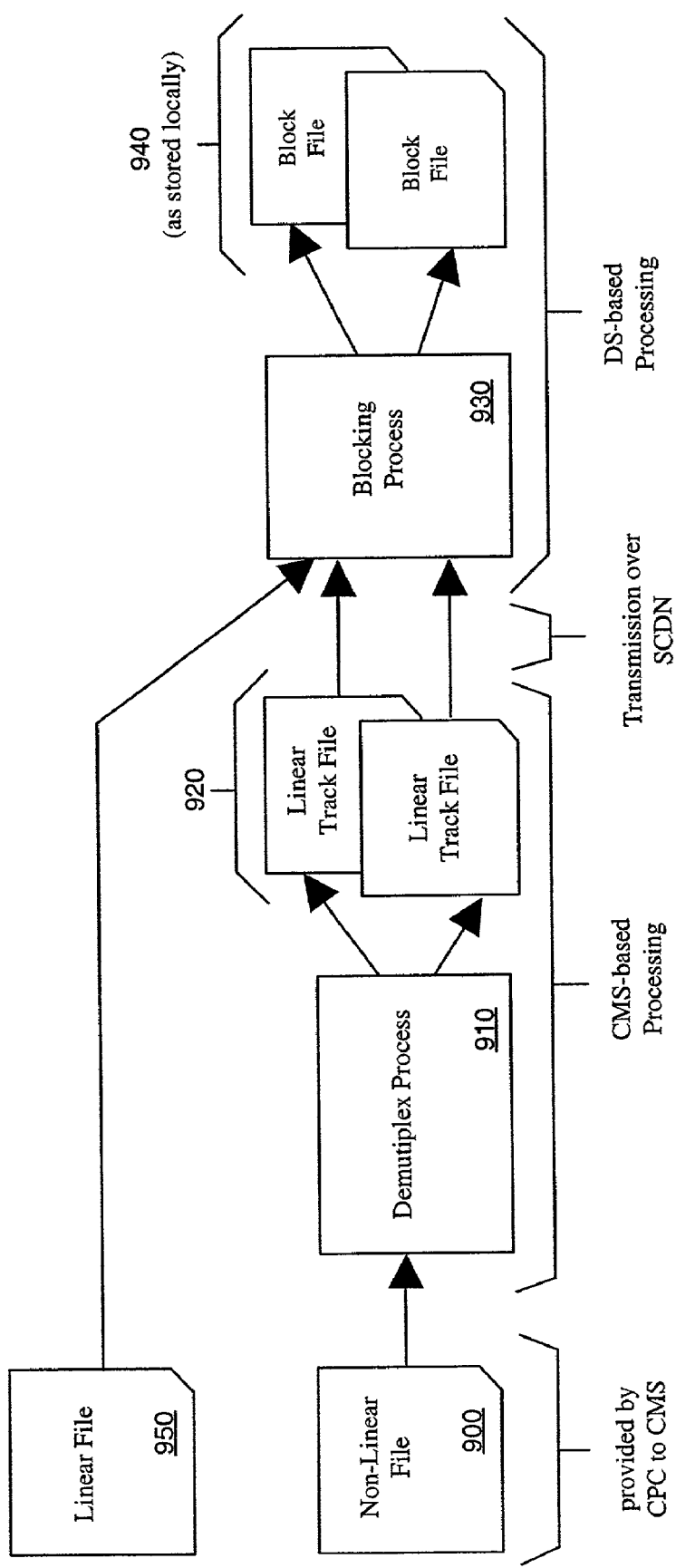
FIG. 9 shows the process of decomposing a file into block files for storage in accordance with an embodiment of the present invention.

FIG. 9 shows the process of decomposing a file into block files for storage. This process is called "chunking" and can be done in a regular or irregular fashion as described below with reference to FIGS. 10A-B.

Figure 10A:
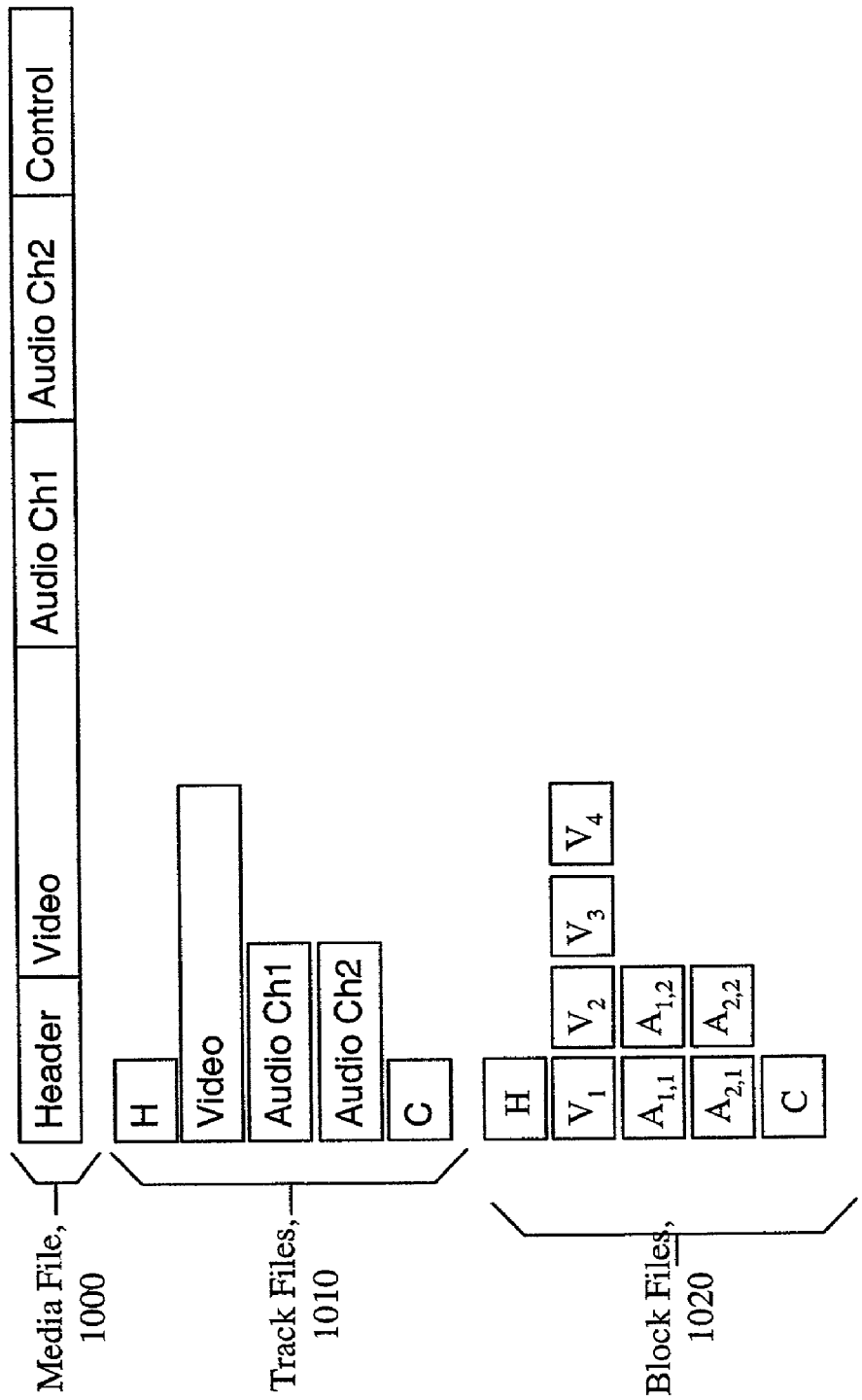
FIGS. 10A-B are two illustrations of decomposed file in accordance with an embodiment of the present invention.

With irregular chunking, media contents are broken down into chunks in two phases. In the first phase, a non-linear media content is broken down into multiple linear physical track files. Multiple track files are assembled into a media file through multiplexing. In the second phase, a linear track file is broken into block files. As shown in FIG. 10A, with irregular chunking, more than one block file is not fully populated because the large payload file is divided into track files and then the track files are further divided into block files. Thus, where a track file does not fully divide into multiples of the chosen block size, files with multiple tracks may have one or more blocks not fully populated.

Figure 10B:
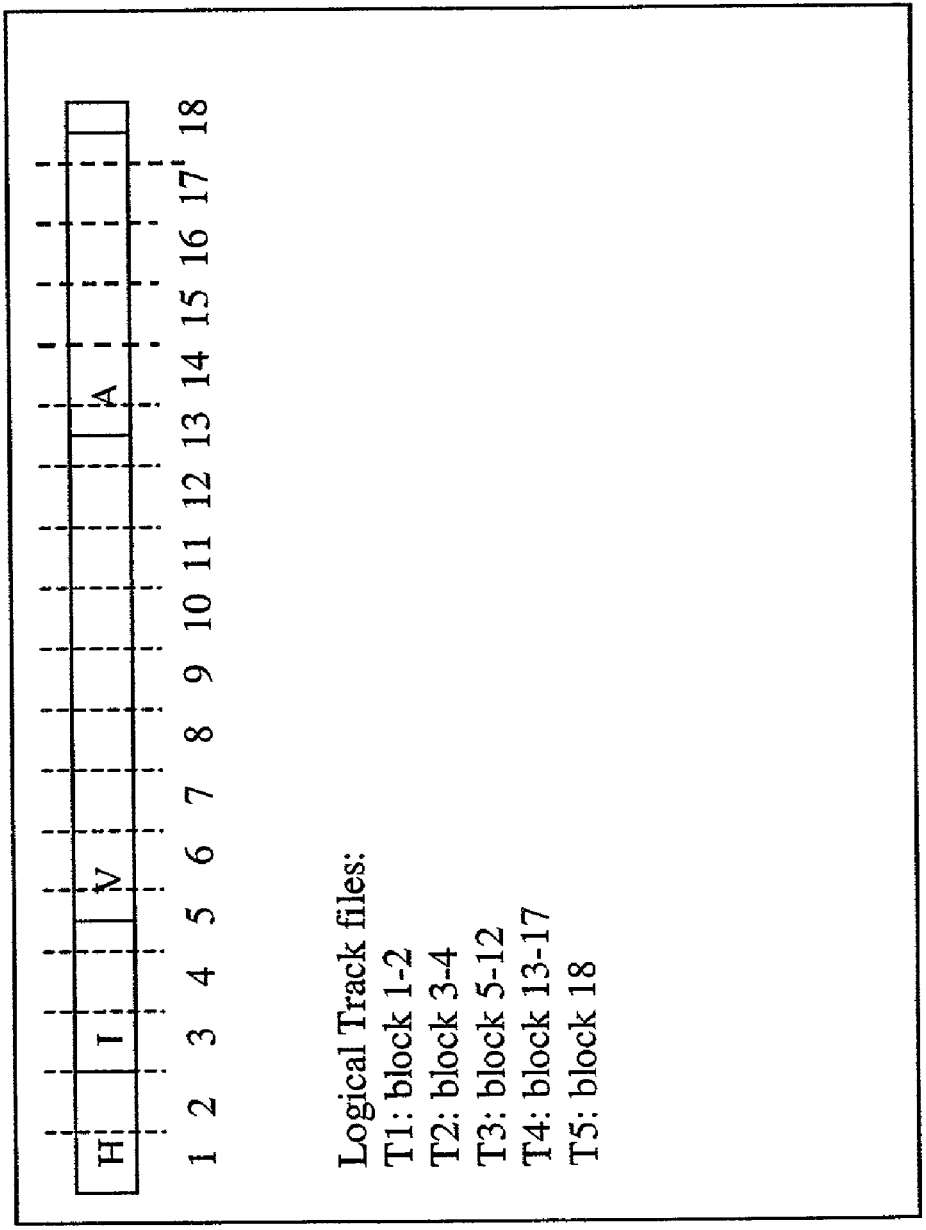

With regular chunking, the demultiplexing process 910 is used to determine the physical track lines without actually breaking the file into tracks. Contents are then broken down into equal chunk size except the last block. The blocking process then examines every block: whichever block contains at least one track line becomes the beginning of a logical track file, and all the blocks following this block make up the logical track file. As shown in FIG. 10B, the last block file may be partially populated with the regular chunking method since the large payload file is not first divided into tracks files, but the track lines are determined and used for other reasons, such as locating the beginning of a track for playback purposes. The entire file is then divided into block files with the last block having the potential of not being fully populated.

For example, using the data shown in FIG. 10A for illustration, large payload file 1000 contains header in the first track, video in the second track, first audio channel in the third track, second audio channel in the fourth track, and finally control information in the fifth track. Content management server 170 (or CPC 130) breaks down the Large payload file 1000 into five linear track files 1010 such that one file contains the header, a second file contains video data, a third file contains the first audio channel, and so on.

Referring back to FIG. 9, the Linear Track Files 920 or the Linear Large Payload File 950 (which is also a linear track file) are (is) transmitted by the CMS over the network to a DS that it is connected to. Alternatively, the entire chunking process may be embedded in a VFCS, VFCS saves the data and metadata into the storage without going through a DS. The files may be transmitted in accordance with a File Distribution Protocol (FDP) from CMS to DS, discussed below. The files from the CMS are input to a DS-based Blocking Process 930, which produces Block Files 940. The Block Files 940 are subsequently stored in the local storage of the DS. After processing, the content may be downloaded by other distribution servers in the network. Generally, there need not be a direct relationship between the size of the files transferred over the network and the block files stored in the local storage system of the DS.

Blocking process 930 breaks down the track files into smaller, manageable units, as shown in block 1020 of FIG. 10A. The blocking process produces the multiple block files H, $V_{1-4}$, $A_{1,1-1,2}$, $A_{2,1-2,2}$, and C (collectively referred to as 1020 in FIG. 10A). Block files may contain data overlaps or offsets (e.g., shift). For example, block file $V_1$ may contain some part of the Header track, and so on. In the block files, the beginning of each track is contained in the first block file created for that track, for example, the beginning of Audio Ch1 is contained in $A_{1,1}$ and the beginning of Audio Ch2 is contained in $A_{2,1}$, etc. Other embodiments may simply breakdown the file (i.e., non-linear) directly into block files without first going through the demultiplexing process (e.g., block 910) thus each block file may contain overlapping tracks. The blocking process generated metadata that is used to re-assemble the file at a later time. Breaking down the file into blocks makes it possible to distribute the block files into different storage devices and to add more storage devices when needed without impacting system performance. This scalability among other things allows the present invention to be an effective approach for globalization of storage. For example, more storage devices may be added to a distribution center 400A-C without a need to move files around or reconfigure other nodes. Also, different blocks may be located at different nodes of the SCDN. The smaller block files makes it possible to support multiple application servers (e.g., streaming servers) at the same time, with increased storage access bandwidth. Also, multiple block files of a file can be downloaded in parallel in non-contiguous fashion from different nodes in the network. Fast forward and fast reverse through a streaming server by a user is also possible without the entire file being first downloaded onto the node supporting the streaming server.

b. Performance Considerations Regarding Block Size and File Distribution

There are certain advantages to breaking files into block files. The advantages of breaking files into block files include: (a) allowing parallel downloading of a single file by multiple local distribution servers to increase download performance; (b) allowing downloading of a file from multiple locations; (c) allowing distribution of storage access load through storing the blocks of the same file into multiple disks (in so doing, the I/O bandwidth of a single file is increased); (d) allowing "fast forward" and "rewind" effects without downloading all the data between the points where "fast forward" or "rewind" starts and the target point. Fast forwarding can be accomplished by moving the download heads forward—to blocks closer to the end of the file. By doing so, "holes" are created in the middle part of the file, where downloading is incomplete. "Rewinding" through such a "hole" entails the download "heads" moving beyond the "hole" and downloading the missing blocks; and (e) improving scalability and obviates the need for large scale migration when storage limitations are reached. If hundreds of blocks are located within a single storage volume and the volume is full, additional blocks of a single file can be saved in a newly added storage volume and be fully functional, without requiring the wholesale migration of the entire file to the new volume.

The size of the blocks affects the performance of both content distribution and content delivery. In one feature of embodiments of the present invention, several factors are considered in determining a block size:

1) Ethernet MTU (Maximum Transmission Unit) size,
2) the size of the physical units of storage,
3) the time required to transfer a block (which is related to the network bandwidth), and
4) the shortest acceptable period to be skipped in response to a fast forward or rewind command during content delivery (this is called the minimum flash interval).

The inventors recognized that several goals come into play in determining the block size. One goal is to maximize space usage within an MTU, which would make content distribution more efficient. Another goal is to minimize congestion at the distribution nodes. Another important goal for determining block size is to prevent storage fragmentation, since fragmentation degrades file system performance, again consistent with achieving the other goals.

Block sizes that are too big or too small can affect performance. Consider the fast forward command, for example. If the block size were too big, server response to fast forward requests during a download would be sluggish, as the server has to finish downloading the particular block file before it can process such requests. Conversely, if the block size were too small, fast forwarding to the end of the block would be very quick. If the block size is within the minimum flash interval, another distribution server can respond to fast forward requests by retrieving the block containing the target content.

Based on the above criteria, educated assumptions made about the physical network and the network operational parameters that supports SCDN 100, and educated assumptions relating to the size of the flash interval and minimizing network congestion, the block size in one aspect of the invention may be 256 Kbytes, for example. It will be evident to those of ordinary skill in the art given this description that the block size could change when one or more of the network parameters or other assumptions change and that the optimal block size may be implementation and application specific. In general, other block sizes (larger and smaller than 256 Kbytes) can also be used.

Additionally, the block size in the storage of a delivery network does not have to be a constant. Each DS in the network may have its own setting depending on the specific nature of the storage devices and its network condition. Also, each file may have a different block size based on a number of possible parameters including, for example, the type of file (e.g. whether it is a text file, audio file or video file). These block sizes may be changed, for example, during operation from time to time as necessary, or by measuring the network parameters and changing the block size dynamically.

The number of blocks distributed to a qualified node during the initial file distribution phase is determined by a number of factors, including the distance from the originating DS (i.e., where the file was uploaded) to the node, the front and back end bandwidth of the node (the current network conditions), predicted network conditions, the history usage information of the node, a "popularity" index set by the content provider, as well as the storage available at that node to the content provider. A content owner is allowed to set the forecasted popularity of a movie during its initial distribution. The popularity serves as a guide that helps distribution servers determine how many blocks of a file to download initially. Over time, based on the accrued usage information, a Storage Manager incorporated in control unit 450 adjusts the actual localized popularity of a file to determine its prune-ability. Popularity of a file may be directly proportional to the number of block files it retains or the minimize retain size may be configured.

Content owners may reserve a certain amount of storage at each node. At each node, distribution servers record the inbound transfer rate for each content owner. A Storage Manager sets a safety storage threshold for each content owner based on the network condition and the inbound transfer rate. The Storage Manager regularly purges some of the blocks of the files that are least likely to be used in the future. A pruning rate parameter can be set to prevent storage utilization to exceed a safety threshold. When pruning rate reaches the pre-defined threshold, presumably due to excess content, the content management application at the content provider's base station is notified. Once this occurs, the content owner cannot distribute any content to the overloaded station without augmenting the reserved storage. There are many options for storing the block files in the network. Several of the options include a cost function, where the cost of retrieval is attempted to be minimized by, for example, by replicating additional block files of high demand content and fewer block files of low demand content, storing blocks files at locations close to the demand rather than far away, storing block files where they can be accessed by high speed links rather than by low speed link, and other similar techniques. A dynamic cost function option is one that dynamically assesses the network and locates or re-locates blocks in accordance with a re-calculated cost function. Additional options can be based on user defined or policy based criteria where operators at each node define the number of blocks per file, or by content owners who define the number of blocks to distribute to each node. A combination of these options is also anticipated.

There are many different ways a file can be distributed to SCDN 100 including but not limited to the following:
1) hierarchical—where a node closer to the source node retains more content than a node further away from the source node in the control path;
2) user defined or policy based—where operators at each node define the number of blocks per file it will keep at the node, or content owners define the number of blocks to distribute to each node for each of their file;
3) dynamic—depending on user demand and resources while resources include network bandwidth availability and storage availability; and
4) a combination of the above methods.

3. Distributing File System Objects a. Distributing File System Objects By Content Owners In this specific implementation, to distribute a file system object, a content owner sets specific distribution criteria for that file. The distribution criteria may be configured or may be introduced through the FDP DIST command, as described above with reference to FIGS. 7A-B. If a file system object is introduced to the SCDN through a CMS, the content owner may set distribution parameters, and CMS server issues FDP DIST for DS to distribute object metadata and the file system object to other nodes in the SCDN. If a file system object is introduced to the SCDN through a VFCS, the VFCS uses pre-configured distribution rules to issue FDP DIST to a DS to distribute the object metadata and the file system object to the SCDN. If the file system object is a file, a subset of the file may be distributed to the SCDN, e.g., to push the content to the edge of the network. The distribution is in accordance with specific distribution criteria set by the content owners and may use the file distribution protocol (FDP) is described below. The distribution criteria may specify regions (e.g., Europe), specific nodes, and other information as desired by the content owners to control distribution of the content. For example, the distribution criteria may include information found in a node's attribute set or rolled up attribute set. Note the terms "DS" and "DSC" are used interchangeably herein and refer to a distribution server cluser (such as DSC 410) having one or more distribution servers. Further, a distribution server can be any type of processing or computing device that can perform the distribution functionality described herein.

b. File Distribution Protocol (FDP)

The FDP Protocol defines the file management primitives necessary to transfer, store, and manipulate file system objects and object metadata stored in the network. Such primitives include commands that upload, distribute, deliver, modify, and delete files. The FDP commands result in one or more packets being transferred between appropriate servers in the network. It will be evident to those of ordinary skill in the art that the command names and protocol implementation described herein are used for convenience and that other commands or protocols may be added, subtracted, or substituted so long as they result in efficient and reliable transfer of files within the network.

In one embodiment of the present invention, the FDP protocol includes the following FDP command: Put, Distribute, Replicate, Get, Prepare, Search, Remove, Clean, Info, Learn, Fetch, Fetch, Fetch Info, and Stop. Each FDP command and types of packets associated with the command are described further below.

"Put": A content owner uses content management applications running on a Content Provider Client system to upload or change a file system object (volumes, directories, and files) and object metadata (data related to the management of the file system objects being stored, transferred, and manipulated in the network) onto a Content Management Server (CMS). If the file system object is a file, the CMS breaks the file into linear track files and then issues a "put" command to a DS that will eventually distribute the content in the network. In one embodiment, the CMS is connected to a DS at an SCDN node. The CMS sends a "put" command to the DS for each of the track files to update or create a volume, a directory, or a file. In effect, the "put" command is a "push" action, pushing a track or a volume or a directory from a CMS to a DS. A "put" command may include four packets, for example: "put", "put_response", "put data", and "put_ack". The "put" packet tells the receiving DS to get ready to receive a track file. The "put response" packet is a packet issued by the DS to indicate to the CMS whether or not the DS needs to receive the track file, and if it needs it, where to begin the transmission. This packet may be useful in the situation when a communication session is broken after part of a track file has been transferred and the CMS needs to re-transfer the remainder part of the file. Once the DS communicates to the CMS where to begin transferring a track file, the CMS may issue a "put_data" packet along with the actual track file, volume, or directory. The DS may respond with a "put_ack" packet when the entire track file or other file system object is received to indicate successful transmission. After receiving the data, if the data is a track file, the DS divides the linear track files into block files, stores the block files in local storage, and updates the file metadata to reflect the track, block, and location information—the block index array.

"Distribute": After the entire file system object and its object metadata have been pushed to the DS or written into storage by a VFCS, the CMS or a VFCS may issue "distribute" packets directing the DS to distribute the file to other nodes in the network. For example, the CMS may issue one "distribute" packet per track file, volume, or directory with each packet containing the content owner's distribution criteria. The distribution criteria, for example, may specify which nodes in the network should have the file system object. The "distribute" command may include two packets, for example: "distribute" and "distribute_ack". The DS may acknowledge receipt of the "distribute" command by issuing a "distribute_ack" packet to the CMS or VFCS.

"Replicate": In response to the "distribute" command, the DS may issue "replicate" packets to its neighbors. Each neighbor that satisfies the distribution criteria specified by the content owner may issue a command (such as the "get" packet described below) to one or more DS in the distribution path to pull a portion of the file, or the volume, or the directory into its local storage. The "replicate" packet starts from the DS where file system objects are uploaded or where the VFCS that updates the file system objects resides. The "replicate" packet acts as a notification to a DS that it may need to pull (i.e., replicate) certain block files, or volume, or directory information, from any of the issuing DS into its local storage. The receiving DS may acknowledge the notification by issuing a "replicate_ack" packet and thereafter, it assumes the responsibility of pulling the block files from the issuing DS when it is ready. A DS further notifies its neighbor nodes to determine if they should pull the file system object by issuing "replicate" packets to them. A DS may issue a replicate request to its descendent nodes if the rolled up attribute matches the content distribution criteria.

"Get": A DS that needs to pull file system object from another DS may issue a "get" command, for example. The "get" command may include four types of packets: "get", "get response", "get chunk", and "get_ack". For example, the "get" packet may be used to initiate a pull, and the "get response" packet may be used to report the status of the station and transfer object metadata as needed. The "get_chunk" packet may be used to transfer file data, or volume or directory information, and the "get_ack" packet may be used to acknowledge the end of the "get" sequence and report status. When downloading a file, a DS may decide on the size of the file to pull based on: (1) its storage availability; (2) location of the station in the network map; (3) the content's popularity; (4) the truncate-able or non-truncate-able characteristic of the file; and, (5) the bandwidth allowance. A DS may issue "get" command sequences in response to a "replicate" request and a "search reply" request.

"Prepare": A "prepare" command may include two packets, for example: "prepare" and "prepare_ack". When users or application servers access a file object through a VFCS, the VFCS may issue a "prepare" packet to a DS to pull the non-resident portions of a file for the user or the Application Server. The DS may use the "prepare_ack" packet to acknowledge that it has received the "prepare" packet and that it will perform "prepare" as soon as possible.

"Search": When the DS can process the "prepare" request, it may issue a "search" command to locate the missing portions of a file. A "search" command may include three packets, for example: "search", "search_ack", and "search_reply". A DS servicing a "prepare" command issues a "search" packet to initiate a multicast search among its neighbors for the non-resident portions of the file. Each neighbor may issue a "search_ack" packet indicating that it has received the "search" request. The "search_ack" packet is not an acknowledgement that the DS has portions of the requested file. A node that has a portion of the required file may issue a "search_reply" packet. The "search_reply" packet may include the block index array that indicates the portion of the searched file residing in the replied node, the network condition of the node, and the load of the node DS cluster. A DS in the initiating DS cluster receives "search_reply" packets and may select appropriate remote DS nodes based on the information in the "search_reply" packets to download the missing portions of the file. A DS in the initiating DS cluster may issue "get" command, for example, to one or more nodes (i.e., selected SCDN nodes) to download the missing content.

"Remove": The "remove" command may include two packets such as "remove" and "remove_ack". The nodes Control Unit may issue a "remove" command to the DS to remove certain blocks. The pruning process, which is described later, uses the "remove" command. A "remove" packet is a notification to a DS that certain blocks have to be removed. The DS may subsequently issue a "remove_ack" packet to acknowledge that it will eventually remove the indicated blocks when ready.

"Clean": The "clean" command may include two packets, "clean" and "clean_ack". The CMS or a VFCS may issue a "clean" or similar packet to notify a DS located at the same node that it needs to remove a certain file system object. The DS issues a "clean_ack" or similar packet to acknowledge that the file system object will eventually be removed when ready. Following the path used during the "replicate" command (available in the distribution criteria for the file), the DS issues a "clean" or equivalent command to its neighboring nodes requesting deletion of the file system object, and its related meta file system architecture and object metadata from all the nodes in the SCDN.

"Info": The "info" command may include two packets such as "info" and "info_ack". The CMS or a VFCS may issue an "info" packet to distribute file system object metadata (data related to management of the volumes, directories, and files using the SCDN) to a DS. The packet may be used to add, delete, re-locate, and modify attributes of certain volumes, directories, or files. When a DS receives "info" packet, it modifies the meta file system structure, and the related object metadata and it then further distribute the "info" packet out to its neighbors. A DS issues "info_ack" packet to the requester (CMS, VFCS, or DS), and then issues "info" command to all its neighbors except the requester. An "info" packet that contains volume information is propagated throughout the entire SCDN. An "info" packet that contains file metadata is propagated based on the distribution criteria for that file. When a CMS or a VFCS send an "info" packet of an object metadata along with the distribution criteria of the file system object to a DS, the receiving DS modifies its meta file system structure if necessary, modifies its local metadata file containing the object metadata, issues "info_ack" packet to the requestor (CMS or DS), and then issues "info" packet to those neighbors satisfying the distribution criteria (i.e., those that received distribution of the file during the "replicate" command). This process continues until the meta file system structure and metadata file containing the object metadata in all the nodes satisfying the distribution criteria are updated.

"Learn": The "learn" command may be issued by a Control Unit's learning agent and may be used when a DS is added to the SCDN and its local storage needs to be initialized, or when the node's attribute changes, or with network configuration changes, or during recovery from a failure. The DS receiving the "learn" command propagates the "learn" command to all its neighbors except the requester. The "learn" packet carries the attributes of the originating node. Each DS receiving a "learn" packet determines if its station has file system object that satisfy the learning station's attributes, if so, it issues "replicate" to a DS in the learning station to pull the relevant file system objects.

"Fetch": The "fetch" command may be used by the Control Unit's learning agent while learning in active mode. The "fetch" command may include two types of packets: "fetch" and "fetch_ack". In active learning mode, the learning agent obtains a list of file system objects (volumes, directories, and files) to be learned, and the assigned node of the file system objects. During this time, the meta file system structure and object metadata for these file system objects are not ready in the local station and thus the DS does not have the information to conduct a search and download the file system objects. The learning agent issues a "fetch" packet to a local DS along with the content's origination station. The DS in turn issues a "fetch_info" packet to a DS of the assigned node of the file system objects. After the DS obtains the object metadata for the desired file system objects, it stores the information into the local meta file system architecture and object metadata file and returns "fetch_ack" to the learning agent. The learning agent may subsequently proceed to issue "prepare" commands to download the file.

"Fetch_info": "Fetch_info" includes two packets, "fetch_info" and "fetch_info_block". Each "fetch" command has encoded within it the identification of a particular file system object and a particular DS guaranteed to have the file system object. In response to a "fetch" command, a DS issues "fetch_info" to the DS node identified in the "fetch". The remote DS may reply with "fetch_info_block", which contains the object metadata necessary to enable the local DS to save or update its meta file system structure and object metadata files.

"Stop": The "stop" command may include two packets such as "stop" and "stop_ack". The "stop" command is used to shutdown a DS. When a DS receives a "stop" packet, it immediately replies with "stop ack" and depending on the termination requirement, the DS may shutdown immediately or shutdown after it completes all the jobs it is executing.

c. File System Object Distribution Procedure

The distribution procedure is used when a new file system object is created, or an existing file system object is modified or deleted. Modification of a file system object includes renaming, changes of any attributes, relocation, and changing of content (file object).

The file system object distribution proceeds as follows. (1) The DS responds to the content owner's request (i.e. a request from CMS or VFCS to create or change a file system object) via VFCS or CMS to distribute a file system object information and request by sending a notification (i.e., a replicate request) to its neighbors to announce the changes and the distribution criteria of the file system object. (2) "Qualified" neighbors (i.e., those that meet the criteria) download the object metadata, information, and request. For file distribution, several portions of the file during this initial distribution process is downloaded. These neighbors also modify the meta file system structure according to the replication request, and updates the object metadata in their local storage. (3) The notification/request is then passed on from neighbor to neighbor, but not back to the neighbor from which the distribution request is received. (4) Each neighbor performs steps 2 and 3 until it encounters a leaf node or a "terminating" node. Thus, the distribution of the file system object information in the network is done in stages via multicast signaling as described.

Every node that receives a distribution request or notification passes the request to all its neighbors except to the "requesting" node (i.e., the node from which it received the request). A terminating node is one where neither the node's attribute bitmap nor its rolled up bitmap match the distribution criteria and where the distribution request cannot be sent to the node's parent. For any node whose attribute bitmap matches the content owner's distribution criteria for the file, the relevant file system object information or if the object is a file, a portion of the file is downloaded from the nearest neighbors in the distribution path that has the information to be downloaded. The notification is based on transport level multicast, and the information download is done through the same multicasting path with pull method. Once downloaded, a DS stores the file system object information locally. The DS creates related meta file system hierarchy, saves the metadata, and if for file distribution, DS saves the portions of the file as blocks spread over different storage volumes in storage devices 430. In spreading the file over several storage volumes, the Input/Output (I/O) load is distributed across the volumes and thus increasing the overall performance of a Distribution Center 400A-C during content distribution and content delivery. For purposes of the invention, the storage volumes can be any collection of storage devices, e.g., disk arrays attached to a server, RAID (Redundant Array of Independent Disks) systems, or Network Attached Storage (NAS), or Storage Area Network (SAN).

Figure 11A:
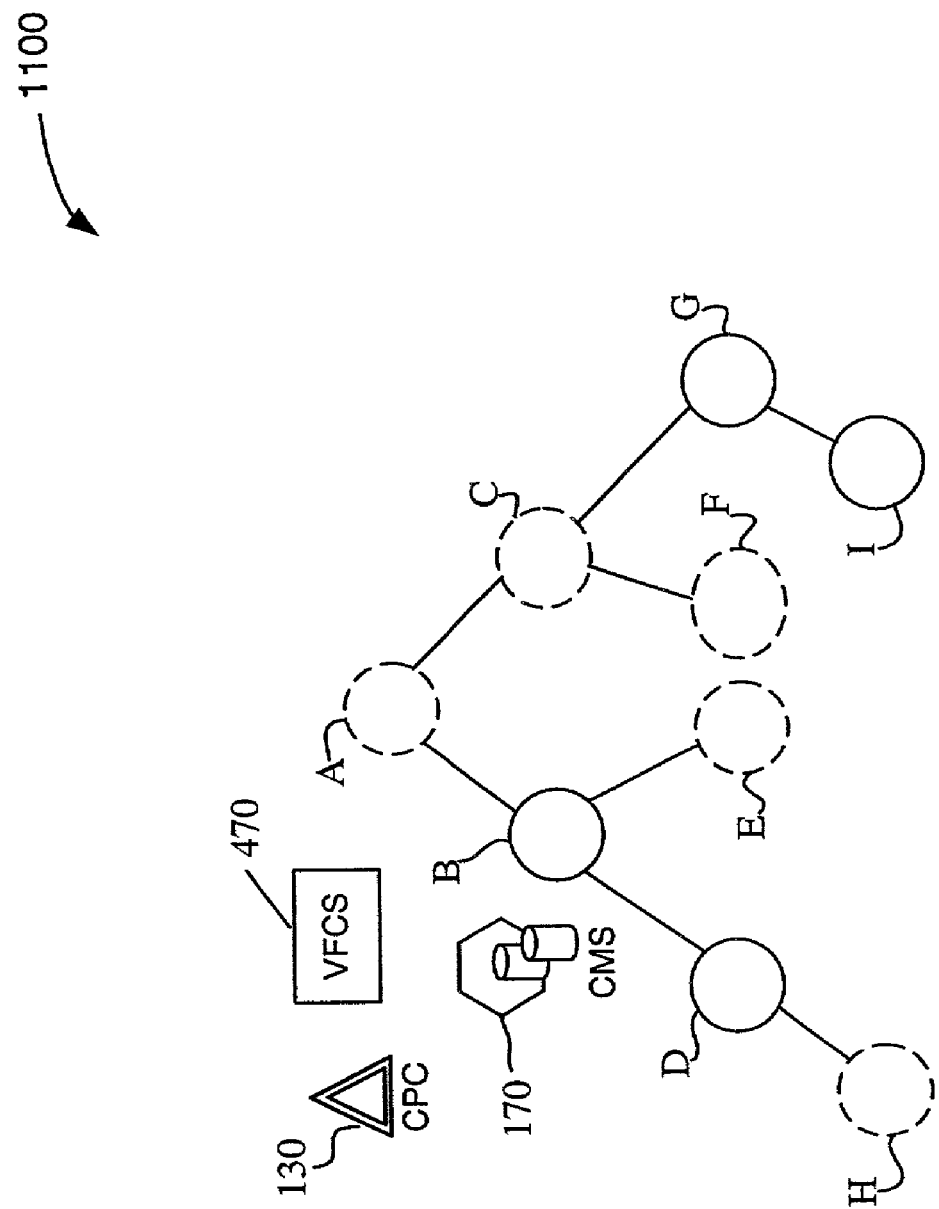
FIGS. 11A-B are illustrative embodiments of the distribution of a file system object and metadata within the network of the present invention.
Figure 11B:
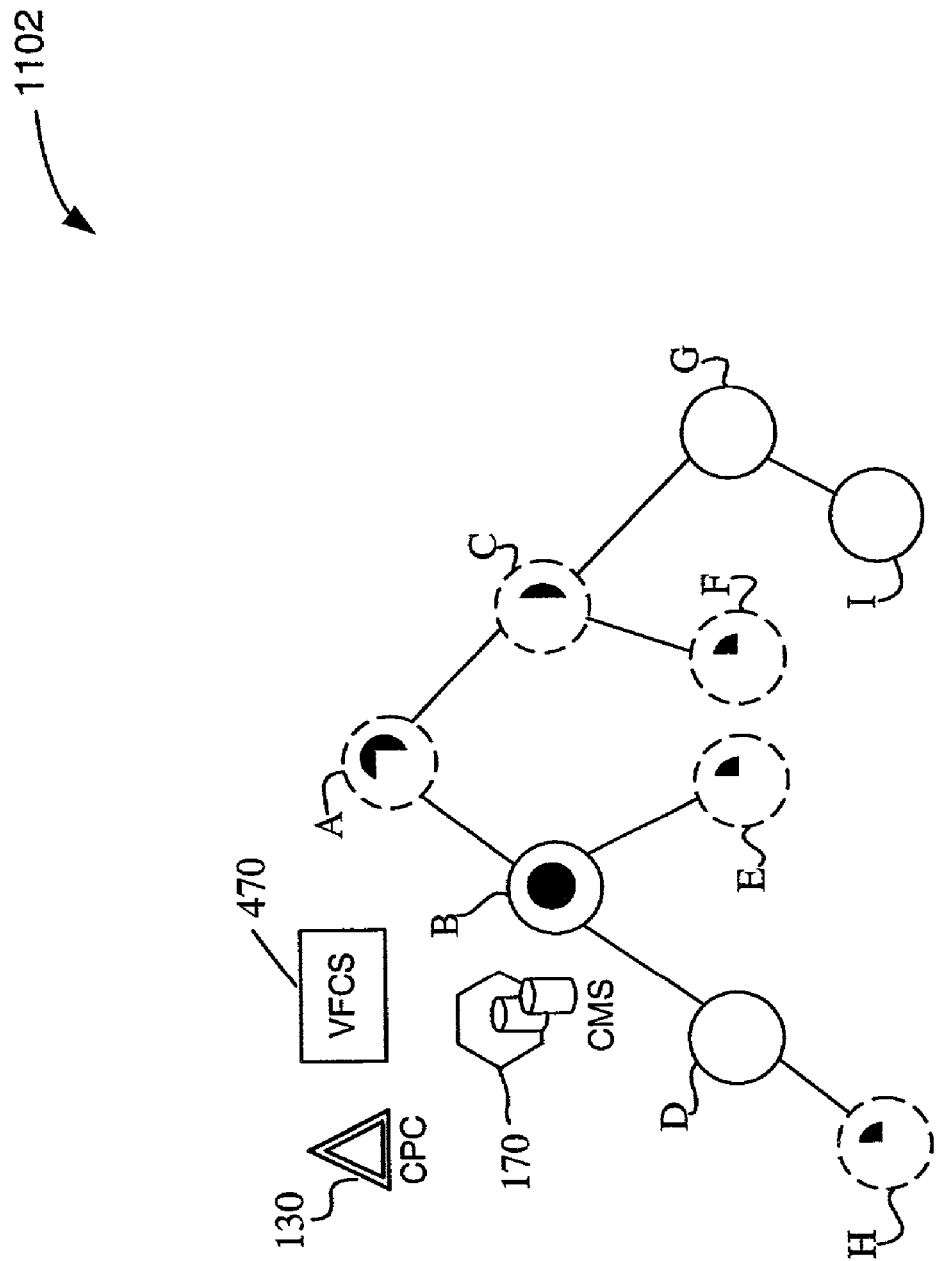

FIGS. 11A-B illustrate an embodiment of the invention directed to the distribution of a file system object, an update, or metadata within an SCDN. FIG. 11A shows a virtual tree structure 1100 having nodes A-I. FIG. 11B shows an example virtual tree structure 1102 of nodes A-I where data and metadata corresponding to a file or portions of a file have been distributed acocrding to the distribution procedure of the present invention. A content owner either creates a new file system object or update a file system object via the VFCS 470 of node B, or uploads a file system object into the content management server (CMS) 170, which is connected to node B of SCDN 100, using any content publishing and management software running on the content owner's client system (CPC) 130. The content owner configures the distribution criteria with VFCS 470 or uploads the distribution criteria onto CMS 170. VFCS 470 or Content management server 170, as previously described, parses file system object and divides a file (if object is file) to create metadata. In the case of CMS 170, the file system object is first parsed and chunked if object is file, to determine the track files, and then CMS issues a command similar to the FDP "put" command to upload metadata and content or updates to the distribution server located in node B. In other embodiments, the CMS 170 may be connected to any node of SCDN 100. At node B, the DS updates meta file system structure accordingly, it also saves the relevant metadata file. In the case when the object is a file, the DS divides the file object into block files for local storage. In the case if the file system object is introduced through VFCS, VFCS parses the object to create metadata. The VFCS updates the meta file system structure and saves the relevant metadata. If the object is a file, the VFCS divides the file into blocks and saves those blocks in its shared storage with the DS in node B. For a file object, the full copy of the file is shown at Node B as a filled in dot (FIG. 11B).

While the file system object information is uploading to the distribution server, the CMS issues an FDP command of the type "distribute" to the distribution server at node B. In the case of VFCS, when the file system object is written to the storage, VFCS issues an FDP command of the type "distribute" to the distribution server at node B. In response to the distribute command, the DS issues a command to its neighboring nodes A, D, and E to replicate the information or content (e.g., using the "replicate" command of the FDP). This replicate command is simply a notification to the neighbors of the file system object changes. Node D examines the replicate packet and decides its not supposed to have the meta information or content thus it passes the replicate command to its neighbor, node H. Nodes A, E, and H examine the replicate packet and decide they all match the distribution criteria (i.e., they are "qualified" nodes). When ready, nodes A, E, and H issue commands to retrieve the relevant metadata, and for file object, a portion of the file from the nearest node (e.g., node B) in the SCDN. Nodes E and H are leaf nodes thus they do not propagate the replicate command. However, node A is the root node with child nodes B and C. Node A may not send the replicate command back to node B, because it is the originating node. However, node A may send the replicate request to node C. Node C checks the distribution criteria and decides it's a qualified node therefore it retrieves the relevant meta information, and for a file, a portion of the file from the nearest nodes (e.g., the nearest of nodes A, B, E, and H) containing the needed data. Node C subsequently sends the replicate command to nodes F and G. Node F is qualified thus it retrieves the meta information, and for a file, a portion of the file from the nearest nodes having the data (e.g. nodes B or C). Nodes G and I are not qualified thus they receive nothing. Node G is a terminating node because the rolled-up attribute of its branch does not satisfy the distribution criteria.

This initial replication process continues until all the qualified nodes in SCDN are at least partially populated. When the qualified nodes retrieve meta information and some portion of a file, they modify the meta file system structure according, save the metadata, and for a file object, save the data block and modify the block index array accordingly. In one or more embodiments of distribution a file, see FIG. 11B, the same portion (e.g., blocks) of the file is contained in at least one node of the SCDN. Preferably, a plurality of nodes maintains the same portion thereby creating redundancy and preventing loss of any portion of the file when one or more nodes or storage volumes become unavailable. For example, when a storage volume (or device) becomes unavailable (i.e., lost), a DS at that station need not take any special action to recover contents of the damaged volume since the portions of files stored and hence lost in that volume are automatically downloaded from other network nodes upon demand to service a user request, this is know as self-healing capability of the SCDN. The distribution servers also relay control information of a failed station to neighbors of the failed station to prevent improper termination of control commands. In the case when a new directory or volume is created or modified, the same replication command is propagated to the entire SCDN in the same way a replication command for a file is propagated. When the nodes receive a replication command for a directory or volume changes, the DS in the nodes issues a command such as FDP get to download the related file system object metadata from the nearest nodes. As soon as DS receives the file system object information, it creates or changes the local meta file system structure and updates the related metadata.

FDP info command is used for notification when attributes of a file system object changes. An attribute of a file system object includes the object name, dates, owner information, object location in the file system hierarchy, etc. FDP clean command is used to notify all the nodes in the SCDN of the deletion of a file system object. These notifications are propagated the same way as FDP replicate command as described in the previous paragraph.

During normal operation, a Distribution Server sends FDP commands, such as replicate, info, search, and clean commands that are forwarded to all or part of the network, through other Distribution Servers in the immediate neighbor stations in its control path. For example, when a Distribution Server receives an FDP command such as replicate or info, it sends the command to its neighbor DSs based on the FDP distribution criteria. In the situation where one of the neighbor stations is failed, the DS keeps the job in its job queue, and repeatedly retries until the job is successfully completed. At the same time, the DS temporarily assumes the role of the DS in the failed station by forwarding the FDP command to the neighbor DSs of the failed station.

This file distribution protocol (FDP) according to the invention uses the content owner's distribution criteria to direct the distribution of file system object, for a file the distribution may be in whole or in part, to all nodes in the network meeting the owner's distribution criteria. A distribution request can start from any node in the tree, and traverses up and down the tree until it reaches a leaf node or arrives at a terminating node. For any node having the appropriate attributes, the file is partially downloaded from the nearest neighbors that meet specific performance criteria if those neighbors contain the portion of the file to be downloaded. The nearest neighbor when downloading content is not necessarily the nearest in the virtual tree but nearest in terms of distance. This prevents massive transfers from the node at which the file is initially uploaded. Moreover, the staging nature of the distribution prevents excessive demands on the network around the initial node (e.g., node B). By delivering smaller blocks and only a partial file this delivery method reduces network load. Additionally, because the distribution requests stop progressing through the SCDN when they arrive at a "terminating" node, the present invention prevents unnecessary distribution request packets from flooding the network.

d. Adding Volumes, Directories and Files

Figure 11C:
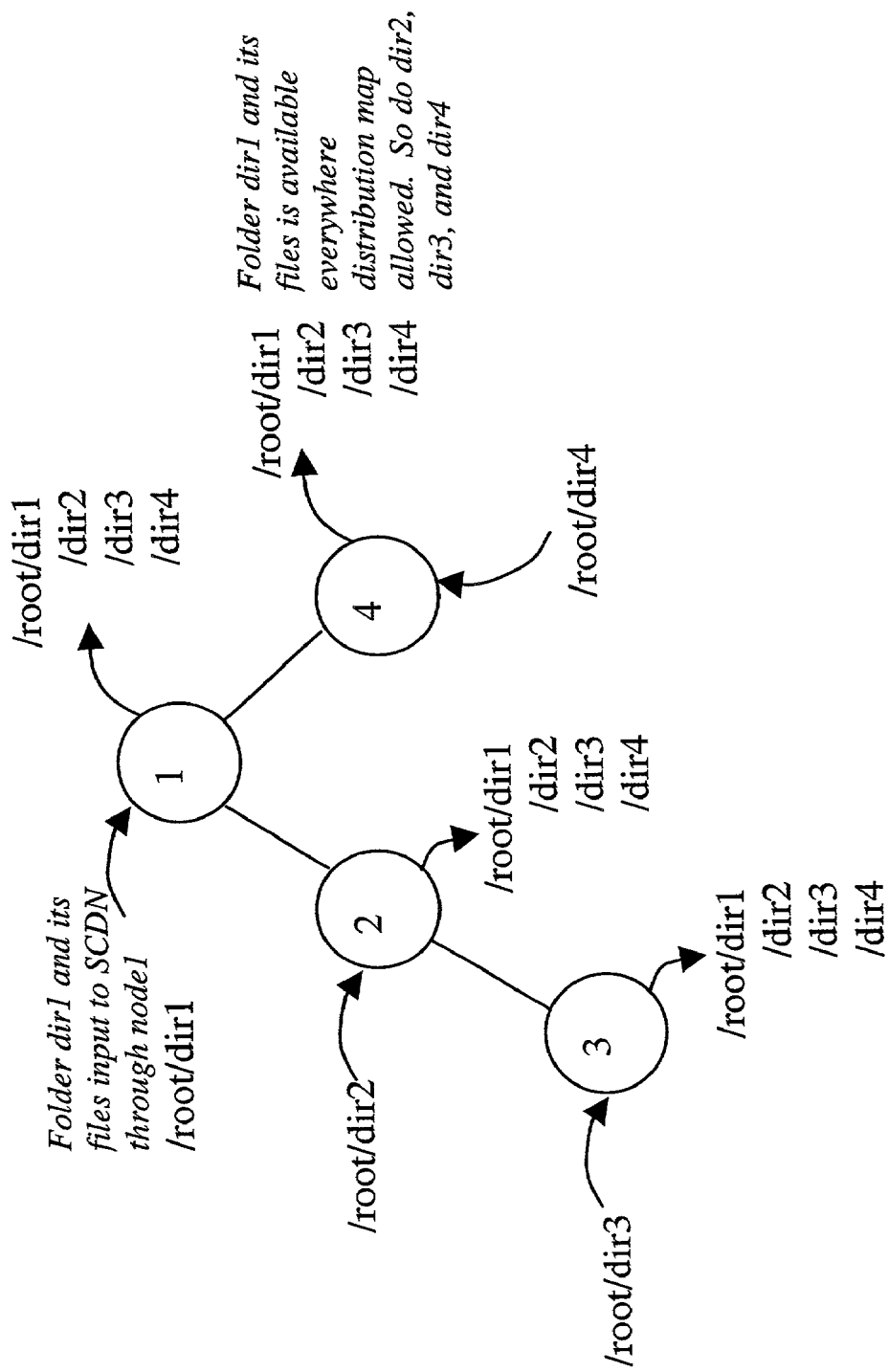
FIG. 11C illustrates how distribution servers work together to distribute and replicate meta information and content dynamically so that each server presents a global file system view that is an aggregated view of the entire network.

New volumes, directories and files may be added at any node. Changes to volumes, directories, and files can be done at any node as well. FIG. 11C shows an example of how the distribution servers at respective nodes 1-4 work together to distribute and replicate meta information and content dynamically so that each server presents a global file system view that is an aggregated view of the entire network. By the distribution, synchronization, and replication, the SCDN nodes aggregate the storage devices in the network to make them function as one.

In the example shown in FIG. 11C, assume nodes 1-4 are all in the same distribution map. A folder named "dir1" and its files are input to SCDN 100 at node 1 as shown by the arrow into node 1. Node 1 stores the "dir1" folder at a path "root". Similarly, other folders named "dir2", "dir3", and "dir4" and their files are input to SCDN 100 at respective nodes 2-4 as shown by the arrows into node 2-4. Nodes 2-4 each store the respective "dir2", "dir3", and "dir4" folders at path "root." Any type of file(s) can be included in the folders.

Virtual file control systems at nodes 1-4 work together as described herein according to the present invention to distribute and replicate meta information and content dynamically so that each virtual file control systems presents a global file system view that is an aggregated view of the entire network. Nodes 1-4 each have the same metadata after replication. This allows each virtual file control system at nodes 1-4 to present the same global file system view of the content of all the nodes 1-4—regardless of what folders are actually stored in a particular node. FIG. 11C further depicts by arrows pointing out of each of the nodes 14 the same global file system view presented by each node VFCS:

"Iroot/dir1
/dir2
/dir3
/dir4."

C. Serving Content

Content serving is provided through a VFCS 470 in each node. Content serving includes the creation of a directory presentation of a global file system and the real time reconstructing and serving of data of the file system object through a file system interface of VFCS. The global file system presentation is created from the meta file system structure and the file system object metadata. The global file system presented by VFCS 470 represents content from the entire SCDN content network. This file system presentation does not map one-to-one into the data in the local storage devices. File system presentation is separate from the actual data. The meta file system structure represents the structure of the entire global directory in SCDN 100 (or simply "SCDN") while the file system object metadata carries the information for constructing a file system object such as the access control list of a volume, the creation and modification dates of a volume or a directory, the popularity of a file, the unique ID of all the file system object, and the information for reconstructing a file from the block files, etc. It is a layer that glues the file system presentation and the actual data that is stored in storage devices. The file metadata allows block files of a file to be stored in multiple distributed storage devices, and it also allows the block files to be tracked, updated, and distributed over a network of nodes.

1. Meta File System Structure and File System Object Metadata

With respect to the entire file system generated from integrating all the nodes of an SCDN 100, VFCS 470 is responsible for two aspects: (a) provides a file system interface for the access of file system objects—volumes, directories, files, and their metadata; and (b) as regard to files, provides an abstraction that associates and assembles (in real time) a group of block files from the local underlying file system to an intact file object that may be introduced to the SCDN from any of the nodes. To implement this, the SCDN has defined a meta file system structure and file system object metadata format for the construction of the global file system presentation by an VFCS 470. VFCS 470 and DS are responsible for maintaining the meta file system structure and the metadata files as new objects are added, existing objects are modified and deleted. And DS is responsible for propagating the changes throughout the entire SCDN. For file objects, part of their metadata contains a local block index array. The block index array of each file is not identical at different nodes. The block index array provides a VFCS 470 the information of how a group of block files may be arranged to reconstruct the original file, it also indicates to a VFCS 470 of whether a block resides in the local node, and if so, the specific storage device where the block locates. The block files in an SCDN node are stored in directories with specific naming scheme.

a. Meta File System Structure

Meta File System Structure 1210, shown in FIG. 12A, represents an example of the file system hierarchy of the global file system according to the present invention. This directory exists in all the nodes in the underlying file system accessible by the SCDN components. VFCS 470 uses the meta file system structure to construct the global file system presentation. At each node, there is a metadata root path 1220—{metapath}, within the {metapath}, there is one or more subdirectories labeled with a SCDN network ID. Each of such directories contains a meta file system structure and file system object metadata that represent a global file system presentation; each SCDN has a global file system.

Each meta file system structure has one or more volumes (containers), each volume has one or more directories, each directory contains subdirectories or files. Since this meta file system structure is not a real file system, it does not contain actual data of the files. Within each volume, there is a volume metadata file labeled by {volume name}.vdat. Within each directory, there is a directory metadata file labeled by {directory name}.ddat.

The files reside in the meta file system structure do not contain real data, instead, these files contain the file metadata.

The meta file system structure of a SCDN may not be identical at each node. The meta file system structure of a node represents the volumes, directories, and files that are replicated to that node. Since the distribution of file system objects are guided by a set of distribution criteria, some file system objects may be replicated to some nodes but not the others. Therefore, a file system object representation does not reside in the meta file system structure of a node if the object is not replicated to that node.

All these file system objects—volumes, directories, and files can be created from any of nodes in the SCDN. These objects can be created through DS through a CMS and then propagate throughout the SCDN or they can be created by a VFCS 470 and propagate throughout the SCDN through DSs. These objects can be modified or deleted via any CMS or VFCS 470 from any node with proper user authority.

b. Volume, Directory, and File Metadata

File system object metadata helps VFCS 470 and DS 410 uniquely identify the objects, locate the origin node, locate the nodes that contain the objects, and locate the data within the storage devices in a node. In one embodiment of the present invention, there are three file system object metadata files namely—volume, directory, and file. The metadata files reside within the a meta file system structure, see FIG. 12A. FIGS. 13A-D shows the content of volume, directory, and file metadata of an embodiment of the present invention. In particular, FIG. 13A shows the content of an example volume metadata file 1300 (also called a volume metadata object). FIG. 13B shows the content of an example directory metadata file 1310 1300 (also called a directory metadata object). FIG. 13C shows the content of an example file metadata 1320 (also called a file meta object). FIG. 13D shows the content of an example block index array 1330 which is part of example file metadata 1320. Note the volume metadata, directory metadata, and the file metadata (exept for the block index array(s)) after replication are the same at each node (for example at each server). The block index array can differ at each node depending upon the particular state of storage at the respective node.

In an SCDN (identified by a unique network ID), file system volumes (containers) are uniquely identified by their volume ID and origin node ID, see volume metadata file 1300 in FIG. 13A. Each volume has an origin node (origin node ID) where it is created, and a content owner (owner ID) who created the volume. A volume also has an Access Control List that contains a list of user permissions. A volume metadata file also contains a distribution map that indicates the nodes where the volume is distributed. An identical volume metadata file for the volume is located at all the nodes where the volume is replicated. Users may update volumes from any VFCS 470 at any node; the new and updated volume metadata will be replicated using FDP throughout the entire network.

Directories in a SCDN are uniquely identified by their directory ID and their origin node, other identifiers that associate with a directory are their volume ID, and network ID, see directory 1310 in FIG. 13B. Same as a volume, a directory has an origin node, distribution map, and its own access control list. A directory may inherit the access control list of its volume. The distribution map indicates the nodes where the directory is distributed. In the nodes where the directory is replicated, a directory of the same name of this directory is created in the meta file system structure, and the directory metadata file is embedded in the directory. The directory metadata files of the same directory at all the nodes where the directory is replicated are identical.

Same as volumes, directories information is replicated using FDP.

Files are uniquely identified by their file ID and their origin node ID, other identifiers associated with a file include their directory ID, volume ID, and network ID, see file 1320 in FIG. 13C. Same as volume and directory, a file has an origin node and distribution map, although the file may be updated at a VFCS 470 of any node. When a file is updated, portions of the content and the file metadata are replicated. The file ID in the metadata allows a file to be uniquely identified across the entire network; the distribution map indicates where the file is replicated; and the block index array (FIG. 13D) which is a part of the file metadata includes information about the layout of the block files so that DS knows how to distribute the blocks for accelerated transport and VFCS 470 knows how to assemble the file in real time. The metadata file of a file exists in all the nodes the file is replicated. Besides the block index array, the other part of the metadata is identical in all the nodes. The content of the block index array is different at different nodes.

FIG. 13D shows an example of the block index array 1330 according to the present invention. In this example, the file has three segments, segment 1332 has 5 data blocks, segment 1334 has 10 blocks, and segment 1336 has 4 data blocks. The sequence of the entire file starts with block #1 of segment 1332 to block #5 of segment 1332, follows by block #1 of segment 1334 all the way to the end of segment 1334, and then follows by segment 1334. This sequence allows a VFCS 470 to satisfy a user request transparently when a specific part of the file is accessed. The beginning of each segments are most significant to the applications of this type of the file. Usually, an application accesses the file by reading the beginning of all the segments simultaneously.

Segments are also known as tracks, allows DS to locate the most significant part of a file to begin distribution in order to eliminate long haul access latency (ie. for accelerated transport). As the beginning blocks of each segment are transferred by DSs, a VFCS 470 may present the file in its entirety through the global file system interface of the VFCS 470. An end user accesses the file using an appropriate application while the DSs are back filling the rest of the block files in all the segments. The number in each block index array cells indicates to a VFCS 470 if the block file is local, and if it is, where to locate the file. In this example, a 0 indicates that the block is not in the local storage, in this case, when a VFCS 470 wants to access the data block, it may signal a DS to download the block. Before a DS could import a non-resident data block, it multicast an FDP search signal to the nodes where the file is replicated (using the distribution map) to locate which nodes may have the particular data block. A-1 in the cell indicates that a DS is in the process of downloading the block. The positive numbers in the cell indicates to VFCS 470 the storage device number where the block data is stored.

Figure 12B:
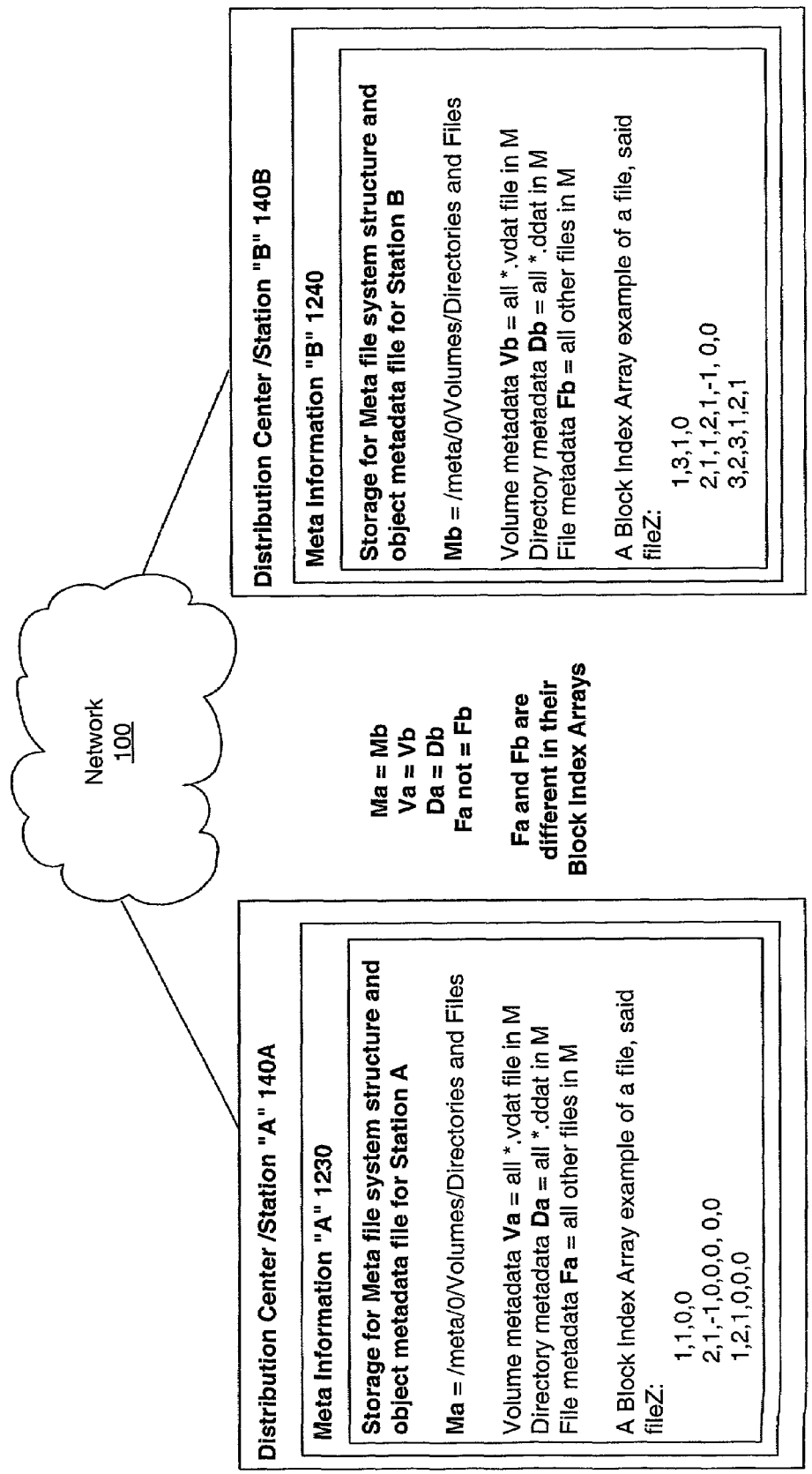

FIG. 12B is an example of the embodiment of the meta file system structure with a file object metadata in two different SCDN distribution centers 140A, 140B (also called nodes) of the present invention. Node 140A includes metadata information 1230. Node 140B includes metadata information 1240 as shown. This example shows how the volume metadata, directory metadata, and the file metadata (except for the block index array(s)) after replication are the same at each node 140A, 140B (Ma=Mb, Va=Vb, Da=Db). The block index array can differ at each node 140A, 140B depending upon the particular state of storage at the respective node (Fa does not equal Fb).

c. Block Files and Node Limiting Path

The following describes the disk layout of the block files. There are some conventions used here to describe the directory paths. FIG. 12C is an illustrative embodiment of the underlying file system block file directory layout within an SCDN node. A block file path name 1250 is shown.

The group of block files that made up a file is stored in storage devices not using the name of the original file, but the file object ID and a block sequence number. These block file are stored in Block Storage Paths defined within one or more storage devices. A Block Storage Path is block file storage root directory that provides information about the block location. The individual blocks may be stored in a way that spreads the I/O load across multiple devices in order to maximize disk performance. To support this, the SCDN node may be configured with multiple block storage roots. When the DS in each node stores blocks, it calls a function for selecting which storage root to store the block in. In one case, this function simply round robins the block storage roots, so as new blocks are written, they are evenly spread across the storage roots. In other cases, this function can optimize storage by, for example, using disk space information and diverting the load of new blocks onto the device with the most free space.

The separate block storage paths are identified by their indexes, which are called storage indexes. When a data block is saved inside one of the storage path, the index of the storage path is registered in the Block Index Array inside the metadata for file object; thus, the storage index in each Block Index Array cell is used to describe the location of a given block. New storage roots may be freely added, but the index order of existing storage roots may not be changed, nor may storage roots be deleted, without running a re-indexing utility to update the Block Index Array metadata with the new storage root indexes.

Storage indexes are in the range 1 . . . n, where n is the number of storage roots configured. Each number maps to a storage root path, a text string, and the storage directory for block files. A storage index value of 0 in the Block Index Array cell indicates that the block is not present. A storage index −1 in the metadata indicates that the block is being downloading, but that the operation has not completed.

In order to support data exchange with other SCDN, the data carries a network ID. An SCDN node stores the network ID in the data and keeps each network's data segregated in separate subdirectories. Data from the "local" SCDN is stored with the local network ID, for this example, the local SCDN ID is 0. Data from external SCDN is stored according to those networks' IDs. Beneath each {storagepath[i]} directory, each SCDN has its own subdirectory. This level of the directory structure is referred to as {storagepath[i−1]}/{network_id}/.

In order to prevent swamping any given disk directory node with more than the underlying file system maximum sub-nodes, and the resulting performance degradation that such proliferation is reputed to cause, a mechanism is used for spreading block files into subdirectories. This mechanism is called Node Limiting Paths, because it creates directory paths that limit the number of nodes in a single directory to the maximum subnodes supported by the underlying file system. In a regular UNIX environment, for example, the maximum subnodes in a directory are about 1000.

Take the example of a large file. Each file may likely to have several segments/tracks, and each segment may have thousands of blocks. One cannot store a file's blocks in the same underlying directory if it has a limit on the number of nodes per directory. Further, a content owner may have thousands of files. It is preferable that the system not store the content owner's entire block files in a single underlying directory. Node Limiting Paths solves this and similar file and directory proliferation problems in a common way.

A file system object ID in an SCDN is a unique 64-bit integer. For a file object the ID is made up by a 32-bit origin node ID and a 32-bit file ID. Such a 64-bit number, when represented as a string, has a maximum length of 20 digits. As mentioned before, a block file is stored using the file object ID instead of the actual file name. In the case of a file which ID is "00000000001234567890", which has 3 segments, and the block size is 256K bytes. The block file named "00000000001234567890.1.0001.block" means that the block file contains the first 256K byte data block of the file which ID is "00000000001234567890" at segment 1. Since this is segment number 1, it also means that the block file contains the first 256K bytes of the original file.

One way to generate a Node Limiting Path for this file object is, take its value as a string, and then split the string into a directory hierarchy with each subdirectory using the next 3 digits. For example: node limiting path="000/000/000/012/345/678/90/1/0/". In this case, the block file "00000000001234567890.1.0001.block" is stored in the directory, "000/000/000/012/345/678/90/1/0//", insides a Block Storage Path.

No matter what random IDs work their way into the system, there should not be more than 1000 nodes in any directory (the subdirectory names range from "000" to "999"), and ensuring so does not involve any disk analysis. It builds the node limited path algorithmically.

Another way to generate a Node Limiting Path is by exploiting the fact that the file object ID is not a totally random number—it is only a unique number for each file that is constructed at creation time. It is constructed as follows:

Unique file ID=(ID of origin node)+(a sequence number from the database)

The sequence number is a number starting from 1 that the database increments each time. The least significant digits of the unique file ID are used to round-robin among the directories.

First, the node limiting path is constructed as "/dir1/dir2/file object ID/", where dir1="Unique File ID % 1000" and dir2="(Unique File ID/1000) % 1000". That is, dir1 is the last 3 digits of the Unique File ID, and dir2 is the 3 digits before the last 3 digits of the Unique File ID.

A node limiting path for an ID "id" is referred to as {node limiting path (id)}. Back to the example in FIG. 12B, where there are two Storage devices or Block Storage Paths namely "/BlockRoot1" and "/BlockRoot2", and the SCDN ID is 0. The file, which ID is "00000000001234567890" is to be stored in the storage, the example shows the first 6 data blocks of the first segment. The Block Index Array cells of the first 6 blocks of the first segment shows that the $1^{st}$ block is stored in Block Storage Path 1 ("/BlockRoot1/") and the $2^{nd}$ block in Block Storage Path 2 ("/BlockRoot2/"), etc.

The block indexing not only allows data blocks of a file to be stored in multiple storage devices to increase I/O bandwidth, it also allows data blocks to be imported or exported in parallel instead of in contiguous sequence. The chunking methods and the metadata together allow the internal of the SCDN to treat a file as dynamic of fluid instead of a rigid body. The block indexing method prevents different DS threads from importing the same block of data at the same time; it also provides fast data access to VFCS 470 during re-assembling process. By removing the conventional requirement to store an entire file in one single storage device, new storage devices can be added to any node of the SCDN at anytime without having to swap files around. Since SCDN may acts as a wide area network global file system, it may contain huge amount of data, the amount of memory in a VFCS 470 server may not be enough to cache the entire presentation of the file system. The Meta File System Structure is therefore introduced to map the object metadata and data blocks into a global file system directory structure, this allows VFCS Vnode to create only partial presentation while relying on the Meta File System Structure for the missing portion of the presentation. When it is needed, the missing portion of the presentation can be moved into the VFCS Vnode in timely fashion.

1. Accessing a File System Object

Once meta file system structure and object metadata files are available, a VFCS 470 can use those information to generate a global file system presentation and then serve the file system request for volume, directory, and file information. Since all the volumes and directories information is lightweight and is saved in the volume and directory metadata files, serving the volume and directory information is straightforward. File objects, however, not only are divided into block files, it is not necessary that all block files for a file object is resided in the local storage. The following section describes an embodiment of the current invention of a method to serve file object and import non-resident portions of the file.

a. Reconstructing a File From Block Files

Figure 14A:
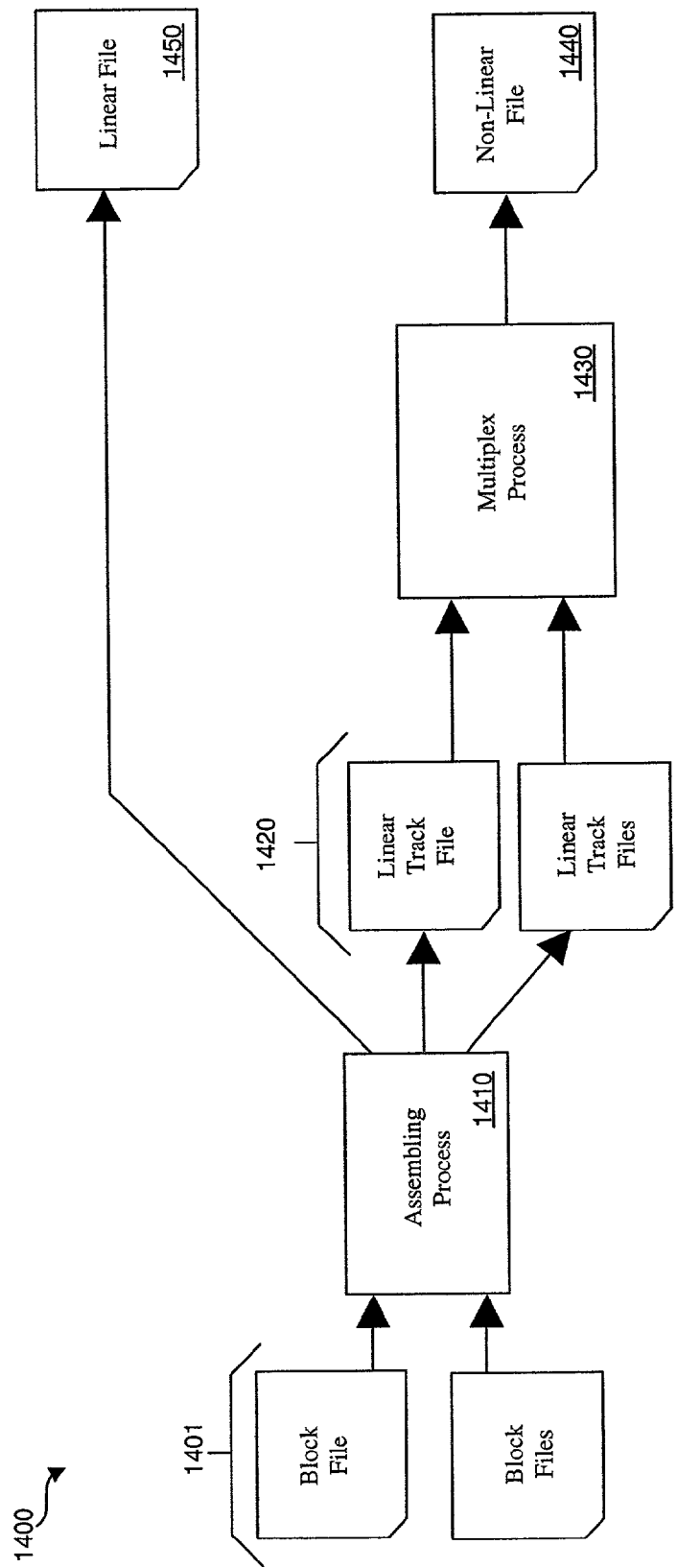
FIG. 14A is a diagram showing the process of reconstructing a file from one or multiple block files in accordance with the present invention.

FIG. 14A is a diagram showing a process 1400 of reconstructing a file from multiple block files 1401 by the VFCS 470. Block files 1400 are input to Assembling Process 1410. The reverse process of blocking as described earlier is called "assembling". The Virtual File Control System (VFCS 470) uses assembling process 1410 to convert multiple block files into linear segment/track files. Assembling process 1410 generates only one linear segment/track file (e.g., Linear File 1450) if the original file is linear However, where the original file is non-linear, assembling process 1410 generates multiple linear segment/track files 1420. A linear segment/track file is generated by a linear combination of the appropriate block files. For example, the video track file of FIG. 10A is regenerated by linearly combining (i.e., summing) block files $V_1$, $V_2$, $V_3$, and $V_4$. Linear track files 1420 may further be combined in Multiplex Process 1430 to generate Non-Linear original File 1440. The multiplexing process simply reassembles the track files to generate the original non-linear file. Files are reassembled on the fly in response to a user's request to access the file. No extra copy of the file is made.

Figure 14B:
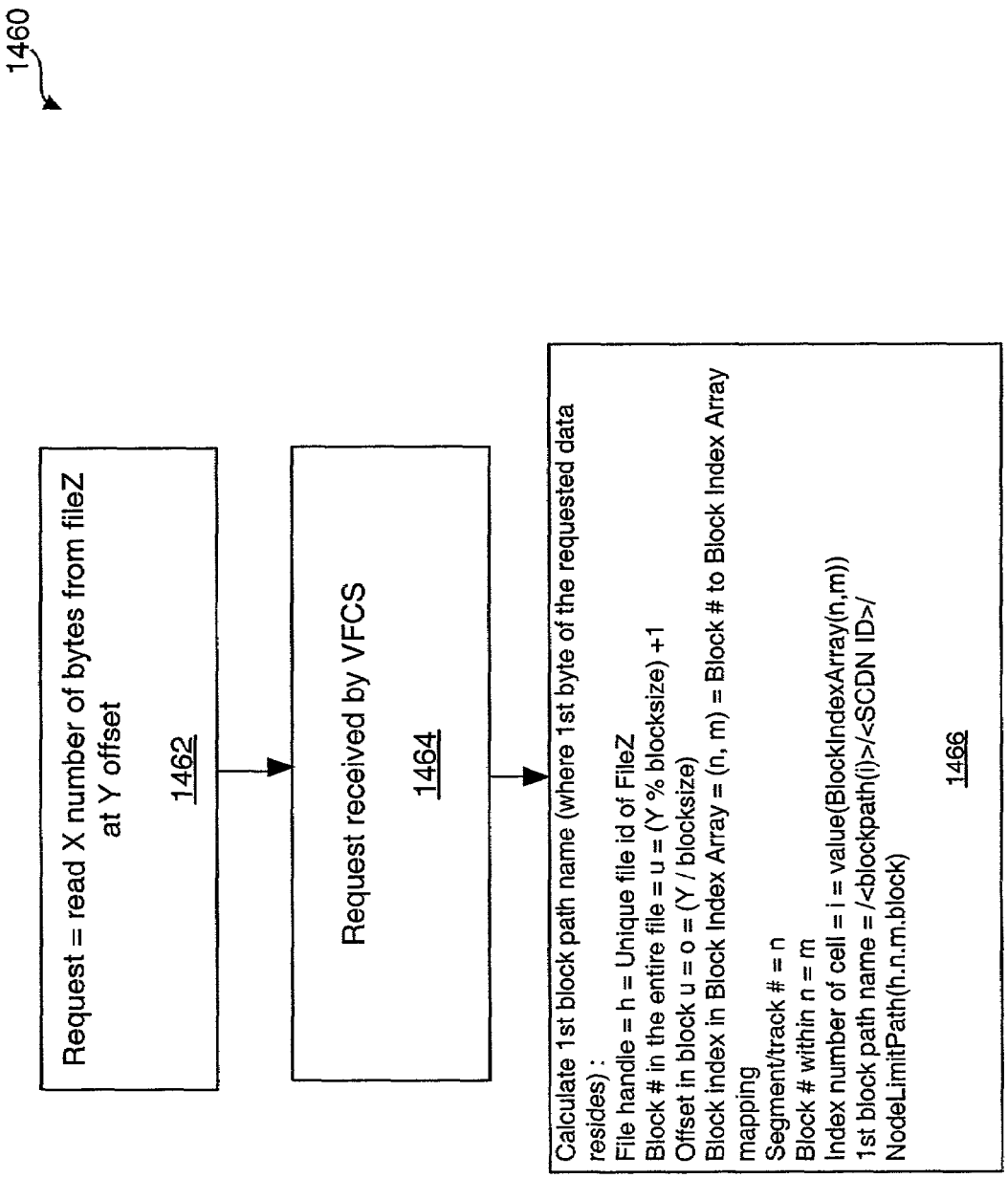
FIG. 14B is a diagram showing the algorithm for locating data in the process of reconstructing a file in real time in accordance with the present invention.

FIG. 14B illustrates an embodiment of present invention in the situation when file objects are chunked in regular fashion (ie. block size of every blocks except the last one is identical), and VFCS 470 is serving random file system requests. FIG. 14B is a flow chart of an algorithm 1460 for locating data in the process of reassembling a file in real-time (steps 1462-1466). For example, a file system request may be processed which is a read request. In step 1462, this request may be: Read X number of bytes from Y offset of file Z (where Z is a file handle, Y is the offest, and X is the numnber of bytes to be read beginning at the offset. VFCS 470 receives the file system request (step 1464). Since VFCS 470 uses the Unique File ID as the handle, the file ID is known. VFCS 470 can locate the first byte of the data in a block B with this approach 1164:

Set Unique File ID=U=file handle Z
Set Block number of the file=B=((Y % block size)+1)
Set Offset within block B=F=(Y/block size)
Set segment that contains block B=M=function that map B to the segment Func(SegmentArray of U, B)
Set Block number of block B within segment M=N
Set Block Index Array Cell for B=C
Set Value of C=Val(C) which is the Block Storage Path index The path name of the block file that contains the beginning of the requested data is then:

/BlockPath(Val(C)/SCDN ID/NodeLimitingPath(U.M.N) .block

With this path name, VFCS 470 opens this block file, seeks pass F number of bytes and reads X number of bytes. If block B does not contain the entire X number of bytes, VFCS 470 may advance to the next block for the remaining data.

b. Accessing Files

An end-user may request access to a file directory via VFCS 470 file system interface or through an application interface, such as a Web-browser, on the end-user's client system. In case where an end-user is served by an application server, the request is forwarded to an appropriate Application Server (i.e., one that is closer to the end-user and with bandwidth to service the request) that will provide the file to the end-user, e.g., a Streaming Server for delivering large video files, or an FTP Server, that is capable of mounting the VFCS 470 as its remote file system in order to have access to content in the SCDN. The application server is in the network and thus may be connected to the nearest node of the SCDN. The SCDN node's storage volumes (i.e., cache memory) may contain some, none, or all of the blocks of the end-user's requested file. If either additional or the full content of the file is needed, the VFCS 470 communicates (via FDP "Prepare") with a local DS to issue a FDP "Search" request to all the DS's neighbors to locate the needed (non-resident) portions of the file. The "search" command is distributed in multicasting fashion.

For example, assume the requested file is 10 Gbytes in length, corresponding to a total of 20 blocks of 500 Mbyte storage (i.e., if each block is 500 Mbyte). Further, assume only 6 such 500 Mbyte blocks reside locally within the SCDN node. Even though only 3 G bytes of the requested file are actually stored in the SCDN node's storage system, the entire file "appears" to exist locally to the end user or the Application Server via the VFCS 470. At the request of the VFCS 470, the non-resident portions of the file are pulled from different distribution servers in the SCDN concurrently in non-continuous fashion and stored locally as the end user consume the data in the file. Typically, data received over the SCDN are stored as blocks in the shared Storage (e.g. local storage devices). The VFCS 470 assembles and multiplexes the stored block files in real time to satisfy the requests from the Application Server or end users.

To locate the non-resident portions of the file, a DS in a cluster of DSs issues a search request that traverses the SCDN tree, starting from its neighbor nodes. The search request may include the distribution criteria of the requested file and a time-to-live counter. A time-to-live counter may, for example, specify that the search request need only traverse two hubs of the SCDN from the requesting node. When a neighbor node receives and evaluates the search request, the node may decrement the counter, for example. A search request terminates when it encounters a leaf node, a "terminating" node or the time-to-live counter is zero (i.e., where the search request includes a counter). Where the missing data is not located and the time-to-live counter reaches zero, i.e., if it is included in the search request, the search request continues by traversing the SCDN nodes in the reverse path of the initial distribution process. A node replies directly to the requesting DS if the requested part of the file exists in that node. Nodes not having any portion of the requested file do not reply. A reply also includes the performance status of the node that sends the reply and an indicator of the portions of the file available. When the requesting DS cluster receives reply packets from any nodes in the SCDN indicating that they contain part or all of the requested file, the DSs in the cluster download the missing content from those nodes that are least congested and stores it locally in the distribution server's shared storage devices. Thus, as the VFCS 470 is providing the data to the end-user, the distribution servers, DSs, are obtaining the remainder of the file from other nodes and there is no break in the communication between the end users and the VFCS 470.

As discussed earlier, a file is broken down into portions (e.g., block files) and distributed throughout the SCDN. Thus, when nodes that contain portions of the file are found through the search request, a cluster of DSs can download portions of that file in parallel from multiple nodes, especially from those nodes that are currently the least congested. The initiating DS cluster decides, based on the performance information in the reply packets, where to download (i.e., "pull") missing content so as to minimize the latency and bandwidth demands on other distribution server nodes. When multiple DS threads or processes downloading different portions of a file simultaneously, the DS threads and processes are coordinated with a sequence server so that no more than one thread or process is downloading the same data block.

Once data blocks are pulled from the appropriate distribution servers, a VFCS 470 or a cluster of VFCS 470 assemble the requested data for a file in real-time from the data blocks for the end-user. The VFCS 470 enables the Application Servers or end users to view the distributed file system that exists in the entire SCDN as a single, large virtual file system.

c. Retrieving Non-Contiguous File Segments

From one perspective, each stored block in the system storage of an SCDN node corresponds to a contiguous section of a file (e.g., a contiguous interval of movie if it is a video file). Since a file is divided into blocks, all these blocks may be stored or re-located independent of one another. Taking a video file as an example, the section that comprise a movie, if viewed one after the other from the first section to the last section, would result in viewing the entire movie. Since the same content portions (i.e., section) are located at several different nodes in the SCDN, non-contiguous section of a file (e.g., non-contiguous portions of a film) can be retrieved independently and in parallel. This has several important side effects. For example, since a DS can obtain needed content portions from several different distribution servers, the reliability and availability of the SCDN are significantly increased. Additionally, the end-user can efficiently access section of a file "out-of-order", e.g., fast-forwarding of a movie can be realized without actually having to download all of the portions of the film that are not actually viewed. Importantly, pruning (freeing the storage used by some blocks for use by other blocks) can be done at the "block level" (versus the entire "file level") based on specific content owner policies, e.g., pruning can be based on usage patterns. Usage of the content can also be rated at the block level.

3. VFCS a. VFCS Implementation Options

Figure 15A:
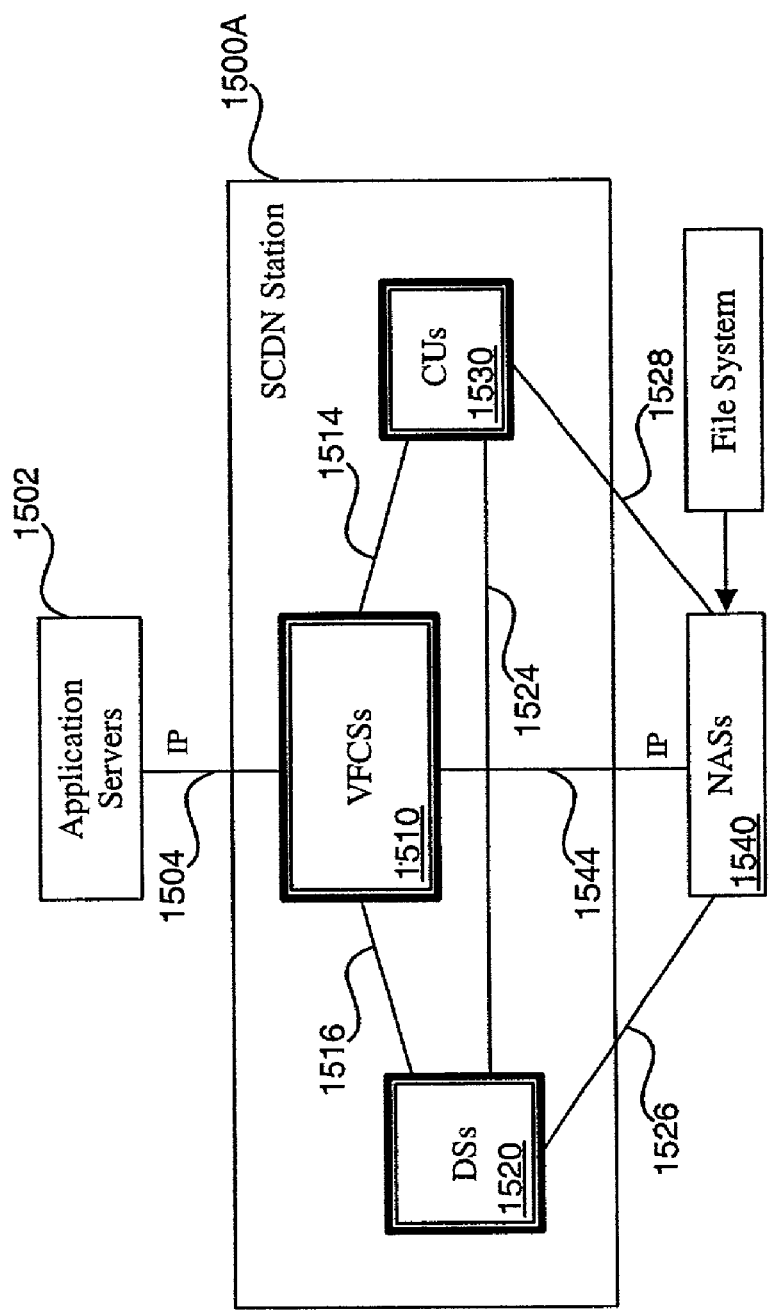
FIGS. 15A-C are three illustrative embodiments of a VFCS in accordance with the present invention.

A VFCS 470 may be implemented in a number of ways. FIG. 15A shows a first optional implementation of an Internet Protocol (IP) front-end and network attached storage (NAS) back-end. Application server(s) 1502 are coupled through an IP link 1504 to a station 1500A. Station 1500A includes a virtual file control system cluster 1510, distribution server cluster 1520, and control unit(s) 1530. Virtual file control system cluster 1510 includes one or more virtual file control systems running on one or more servers.

VFCS cluster 1510 (and each server therein) communicates with front-end application(s) on application server(s) 1502 using TCP/IP or UDP/IP communication over link 1504 and with one or more network-attached storage devices (NASs 1540) at a back-end over link 1544. VFCS cluster 1510 (and each server therein) also communicates with distribution server cluster 1520 using TCP/IP or UDP/IP communication over link 1516 and with control unit(s) 1503 over link 1514. Distribution server cluster 1520 and control unit(s) 1503 communicate with each other using TCP/IP or UDP/IP communication over link 1524. Distribution server cluster 1520 and control unit(s) 1503 also communicate directly with NASs 1540 using TCP/IP or UDP/IP communication over respective links 1526, 1528.

Figure 15B:
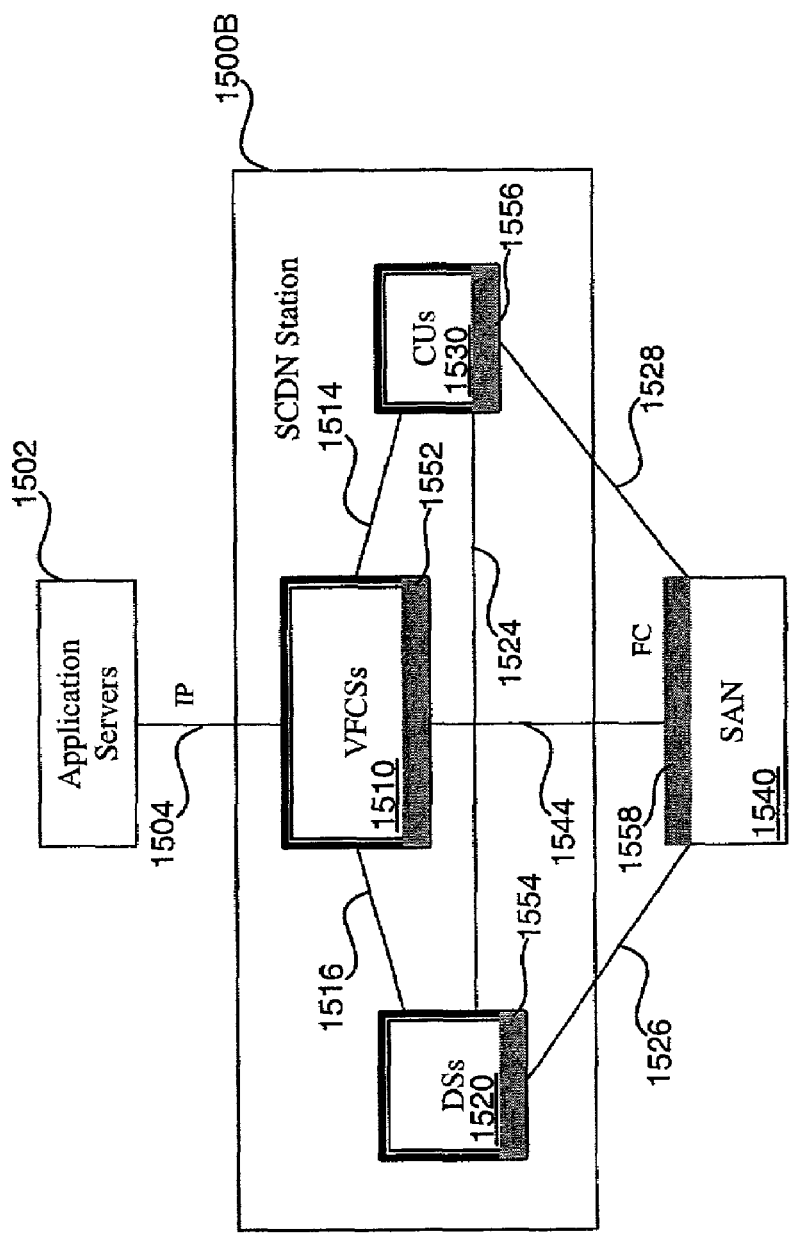

FIG. 15B shows a second optional implementation of a station 1500B having an IP front-end and storage area network (SAN) back-end. The VFCS server communicates with the front-end application using TCP/IP or UDP/IP communication and with a storage-area network at the back-end.

Fibre Channel interconnections (1552, 154, 1556, 1558 indicated by a grey shading) are used to couple virtual file control system cluster 1510, distribution server cluster 1520, control unit(s) 1530, and a storage area network (SAN) or NAS 1545.

Figure 15C:
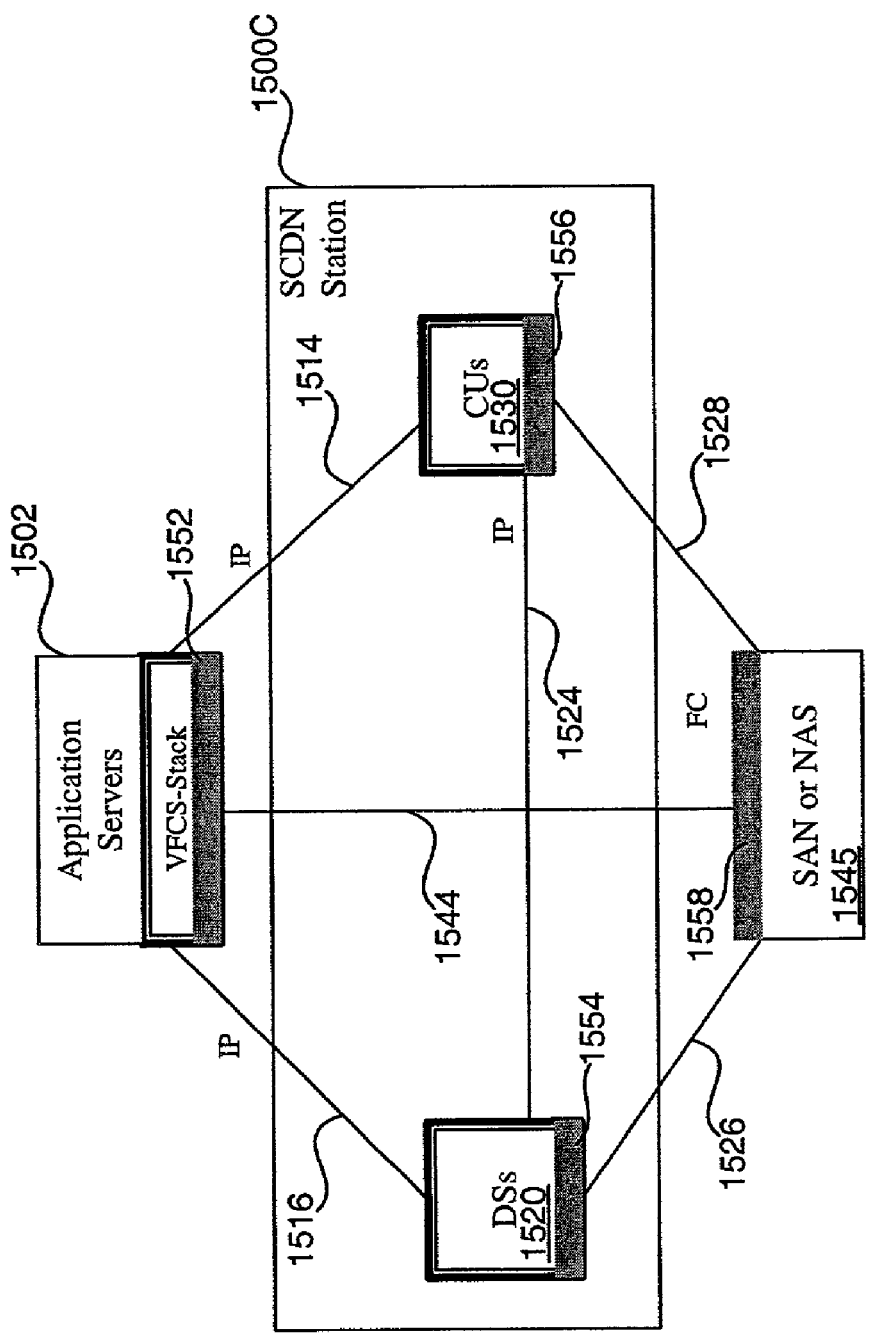

FIG. 15C shows a third optional implementation of a station 1500C having an integrated front-end, SAN or NAS back-end. In this case, VFCS functionality 1570 (e.g., a VFCS stack) is directly integrated into application server(s) 1502. At the back-end, VFCS communicates with either a SAN or a NAS over a high-speed Fibre Channel link 1544.

The description below is focused on the first optional implementation of station 1500A, but those skilled in the art will recognize that the concepts may also be applied to other implementations.

One of the key parameters in a VFCS 470 is the global unique file system object ID. Every file system object regardless of from which node it is created, has global unique identifier. This unique ID not only allows all the file system objects to be tracked in another location of the network, it is exported by the VFCS 470 as a file system object handle. By exporting the same handle for the same file system object from any VFCS 470, a group of VFCS 470 can be clustered to support an end user client transparently, see FIG. 6. When a VFCS failed, the other VFCS can satisfy the end user request since it recognizes the file system object handle as any VFCS does.

Therefore, a VFCS can be clustered to load balance and provides active-active fail-over transparently. In the case when a VFCS cluster is providing NFS UDP support, it is capable of performing in-session fail-over, in the case of CIFS or NFS TCP support, a VFCS cluster is capable of providing per session fail-over. FIG. 6 is one embodiment of employs load balancing across VFCS servers. The VFCS is designed in such a way that requests from an application server can be directed to any VFCS server in a cluster, thereby balancing the load among VFCS servers. For this purpose, the file system object handle that VFCS returns to the application is designed in a special way so that the application can thereafter use the same file system object handle to any VFCS server, and the VFCS server can decode it. The design of the VFCS file system object handle takes into consideration the fact that VFCS has to support two remote file sharing protocols, namely, NFS and CIFS, in a cluster. In order to achieve the above features, the unique file system object handle according a further feature of the invention meets two criteria:

(a) The file system object handle is platform independent so that there does not need to be any adjustments depending on the operating system and file system.

(b) The file system object handle is able to be decoded by any server in the VFCS cluster, and, when decoded, will refer to the same file in the cluster.

The VFCS file system object handle contains three pieces of information: a file system identifier, origin node ID, and file system object (volume, directory, or file) ID. The file system identifier is created at the time the VFCS is loaded into the kernel. The original node ID and file system object ID are stored in a kernel data structure (inode) by using standard file system I/O interfaces. A handle is used by a VFCS server while communicating with applications to uniquely identify a file or directory in the global file system of the SCDN. A VFCS server knows how to decode a file system object handle, which is file-system dependent. In a traditional UNIX file system, a file handle contains a file system ID, an inode number, and an inode generation number. In non-UNIX traditional file system, a file handle may be a pointer to a data structure in the memory of the file system. Since traditional file system does not use a hard coded ID as a file system object handle, two mirrored traditional file systems although contain identical files and directories do not have the same handle number for the same object. Therefore, traditional file system cannot be load balanced.

b. VFCS Initialization Procedure

Figure 16:
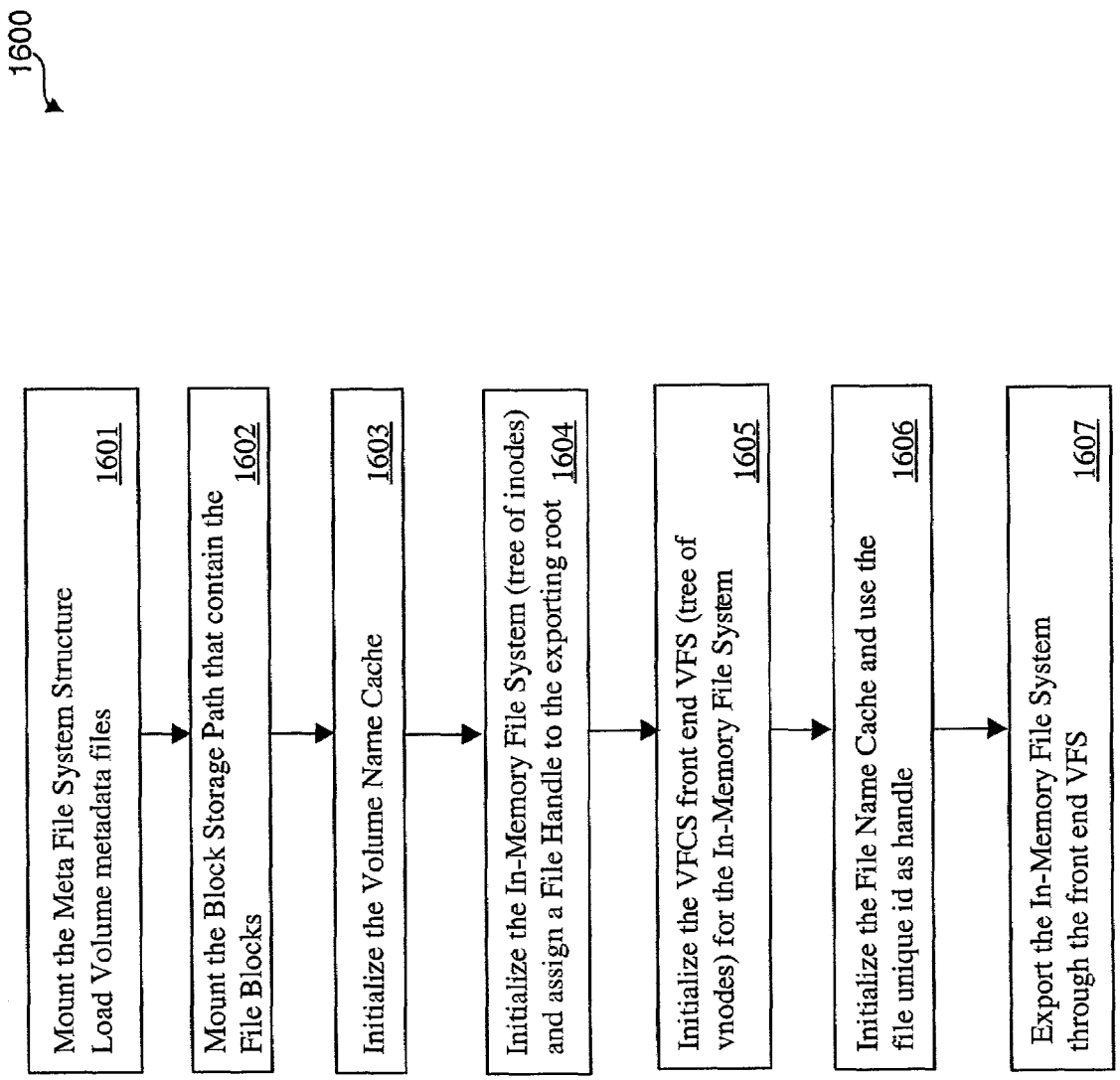
FIG. 16 is a flow diagram of the operations of a VFCS server performed during the VFCS initialization process to create a global file system presentation in accordance with an embodiment of the present invention.

FIG. 16 is a flow diagram of a routine 1600 showing the operations of a VFCS Server (e.g. VFCS 470) performed during the VFCS initialization process in accordance with an embodiment of the present invention (steps 1601-1607). In this illustration, network attached storage (NAS) devices are used for the shared storage system. The meta file system structure and the Block Storage Paths (including volume metadata files) are mounted in operation 1601 in order to provide access to their data. For purposes of this illustration, assume the meta file system structure is mounted on /mp/ metadata/. In order to access the entire set of blocks available in the storage system, all of the storage devices are mounted in operation 1602. For purposes of this explanation, the mount points are /mp/blockfiles, e.g., /mp/blockfiles/v1, /mp/blockfiles/v2, etc.

A VFCS Server initializes the volume name cache by loading the volume metadata file into the cache (e.g., operation 1603). In operation 1604, the VFCS Server begins building the in-memory file system that includes loading the entire meta file system structure and assigns a constant handle to the root of the structure. One embodiment of the invention may use a Unix VNODE tree as the kernel interface to the in-memory file system (tree of inodes in the memory). The in-memory file system is a tree structure of inode that represents the global file system. Thus, the initialization includes the creation of a partial in-memory file system in the form of inode structure, and a VFCS VNODE tree as an kernel interface to the inode tree. The front end VFS VNODE includes a root VFCS VNODE for the exported root directory. The initialization also includes the assignment of a constant handle to the root directory. For purposes of this explanation, the exported directory is /export. The VFCS then, as indicated in operation 1605, continues to build the in-memory file system by creating the volumes and directories, as well as the kernel interface, i.e., the VFCS_VNODES of volumes and VFCS_VNODES of directories. For example, the volumes take the form /export/vol1, /export/vol2, etc. There is one VFCS_VNODE for each volume and each director. The associated volume and directory metadata files are loaded and the associated object unique ID is assigned to be the object (volume or directory) handle. Suppose, for example, Studio X is a volume and its unique ID is "123". When an application accesses the Studio X volume using its name, a handle of 123 is returned to the application.

In operation 1606, VFCS initializes the File Name Cache. For example, the VFCS Server obtains a complete or partial list, depending on memory availability, of file names and the unique ID of some most popular files. VFCS does not create the VNODEs or the associated in-memory inodes for these files until they are accessed. In operation 1607, VFCS exports its in-memory file system. This is an example of "selective and dynamic caching", i.e., the caches that are selected for populating and when they are populated (at initialization time or at run time) are determined for performance reasons. Once initialized, the VFCS in-memory file system contains a root node and the volume nodes in the first two layers of the file system tree. The third and deeper level of the file system tree contains files and directories, and these objects are populated dynamically. If a file or a directory metadata is not in cache when an end user requests the file system object, the VFCS must read the metadata from the storage and create an inode for the in-memory file system and its associated VNODE. Once an inode and VNODE is created, VFCS may check the Block Index Array and send a "prepare" request packet to a local DS to import the non-resident data blocks.

VFCS continues to build the in-memory file system Cache during run time when files are accessed. When an Application Server accesses a specific file, for example, /export/vol1/dir1/file_nameX, the VFCS Server servicing the request looks up filename in the filename cache, creates a VFCS_VNODE and the associated inode in the in-memory file system for the corresponding file, and obtains the list of block files for the file. At the same time, the VFCS Server issues a "prepare" request packet to a DS via the DSC Load Balancer. After the DS downloads the requested file portions, stores the portions as blocks, updates the associated Block Index Array of the file to reflect the arrival of the new data blocks, it signals VFCS or VFCS polls the metadata files and recognizes the blocks are present in the Storage System; the VFCS Server reads, assembles, and multiplexes the data blocks and sends the data to the requesting Application Server. Each VFCS Server performs read-ahead caching or direct packet forwarding (spoofing) to improve performance.

c. VFCS File System Object Access Procedure

Figure 17A:
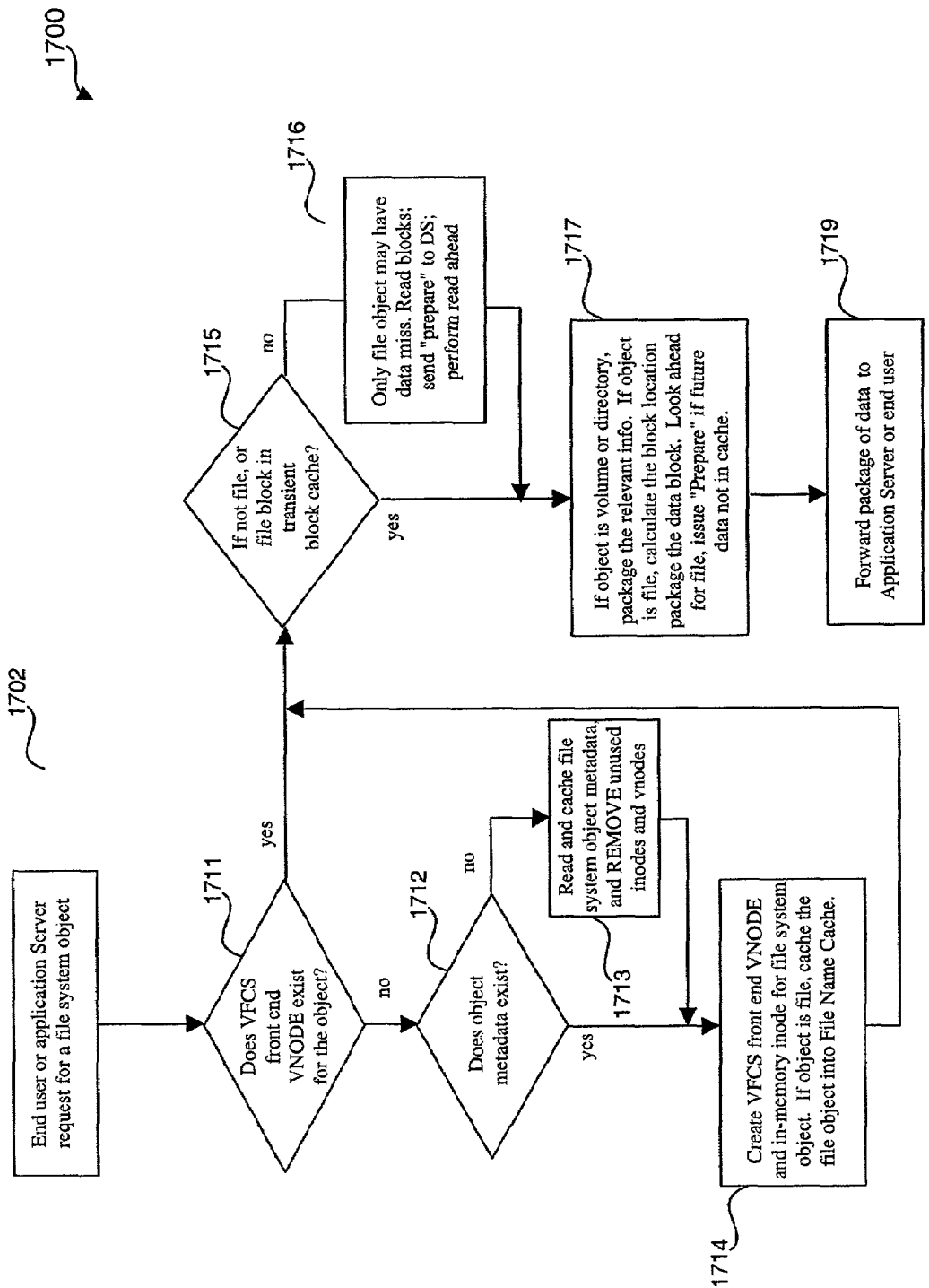
FIG. 17A shows the VFCS server operations performed during run time in accordance with an embodiment of the present invention.

FIG. 17A shows a routine 1700 of the VFCS 470 operations performed during run time (steps 1702-1719). When an Application Server or an end user client requests access to a file system object, VFCS 470 first checks to see if the VFCS_VNODE and its associate inode for the file exist in the VFCS in-memory File System (operation 1711). In other words, in operation 1711, the VFCS Server determines whether a VFCS node (e.g., a front end Vnode) exist for the file system object? If it does, the VFCS server proceeds to step 1715, otherwise, it proceeds to step 1712. For a file object, at step 1712 the VFCS examines its file name cache to determine if an entry for the file exists (i.e., does the Related file object metadata exist in the cache?). If no related file metadata exists, or if the requested object is a volume or a directory, the VFCS Server proceeds to operation 1713 and reads the meta file system structure and the associated metadata files. At the same time, the VFCS server can free up some memory by removing unused or least frequently used inodes (in-memory file system) and front-end vnodes. For a file object, the VFCS caches the related file system object metadata, and saves the information into the File Name Cache and then proceeds to operation 1714. However, if related file metadata already exists in the File Name Cache in step 1712, the VFCS Server proceeds immediately to operation 1714, where it creates the VFCS file system in-memory inode and the front end VNODE for the file. If an object is a file, VFCS caches the file object to File Name cache. After doing this, the VFCS proceeds directly to operation 1715.

In operation 1715, the VFCS File Server checks to see if the requested object is a volume or a directory, if so, control proceeds to 1717. If the requested object is a file, it further checks if there are any blocks for the requested file in the Pre-Fetch (transient) Block Cache. If there are no such blocks, the VFCS Server proceeds to operation 17166 where it reads blocks associated with the requested file from the Station's Storage System, sends a "prepare" request packet to the Station's DSC to repopulate the missing blocks, performs a read ahead, and then proceeds to operation 1717. However, if there are one or more blocks for the requested file in the Pre-Fetched Blocks Cache, the VFCS Server proceeds directly to operation 1717 from 1715. When VFCS performs read from the storage, it applies the algorithm described with respect to step 1466 in FIG. 14B to locate the data blocks.

Further, in operation 1717, the VFCS Server gathers the volume or directory information, or if the requested data is a file, it assembles and multiplexes the data blocks, and in step 1719 forwards the packages to the Application Server or end user client. VFCS may perform read-ahead caching to improve performance. Furthermore, the VFCS Server can perform direct packet forwarding or packet spoofing to ship data directly from back-end storage to front-end application without buffer copying.

The number of pre-fetched blocks a VFCS caches depends on the local memory availability in the VFCS Server. The third and deeper level of directories and file of the in-memory file system may be pruned and the Pre-fetched Blocks Cache may be flushed when memory is running low. Depending on memory availability, a VFCS may cache a complete or partial set of file system directories. With limited memory, it caches the file metadata for only the most frequently accessed files and then updates the cache regularly based on the recent usage information. This is the VFCS "selective and dynamic caching" of the global file system.

For example, to support X number of volumes/directories, Y number of files, and Z number of concurrent users, each with N number of pre-fetched blocks for best possible performance, a VFCS is configured with a memory size using the following equation:

Memory Size in Mbytes=
VFCS OS Memory Requirement+
VFCS Runtime Memory Requirement+
X*(Memory Required for each volume/directory Cache)+
Y*(Memory Required for each File Name Cache)+
(1+X+Y)*(Size of VNODE tree)+Z*N*(Block Size).

Figure 17B:
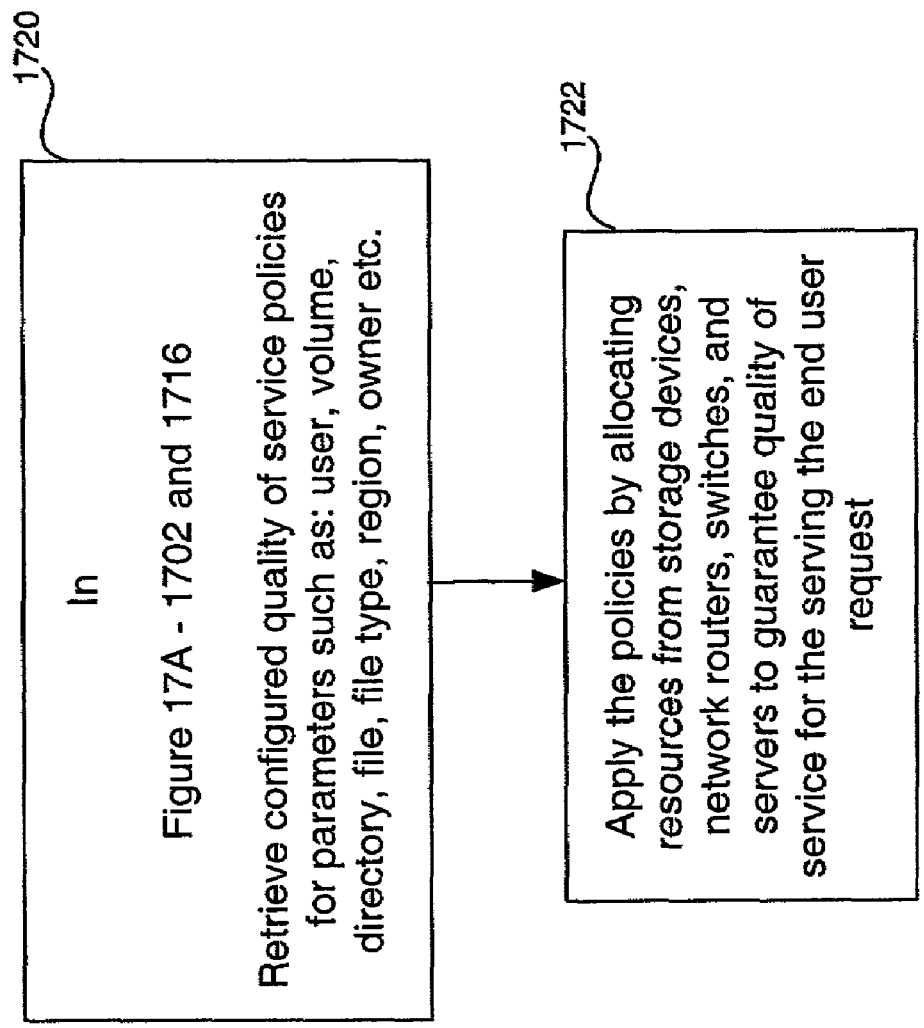
FIG. 17B shows the application of policies for quality of service based on the user and file system object type in accordance with the present Invention.

While serving a request, VFCS can also apply quality of service policies according to a set of configured parameters. FIG. 17B shows a routine 1720 for applying policies about quality of service based on the user and object system type in accordance with an embodiment of the present invention (steps 1720-1722). For instance, routine 1720 can be carried out in steps 1702 and 1706 described above.

Routine 1720 illustrates that while a request is received and served, or when non-resident data blocks is to be imported from other nodes, VFCS may retrieve configured quality of service policies (step 1720). For example, a policy may states that a particular user group be given high priority to network resources and therefore better quality of service. The parameters may include users, file system object, file type, region, content owner, etc. When a policy is identified, a VFCS may reserve network and storage resources from storage devices, network switches, routers, and other servers (step 1722).

d. VFCS Modules

Figure 18:
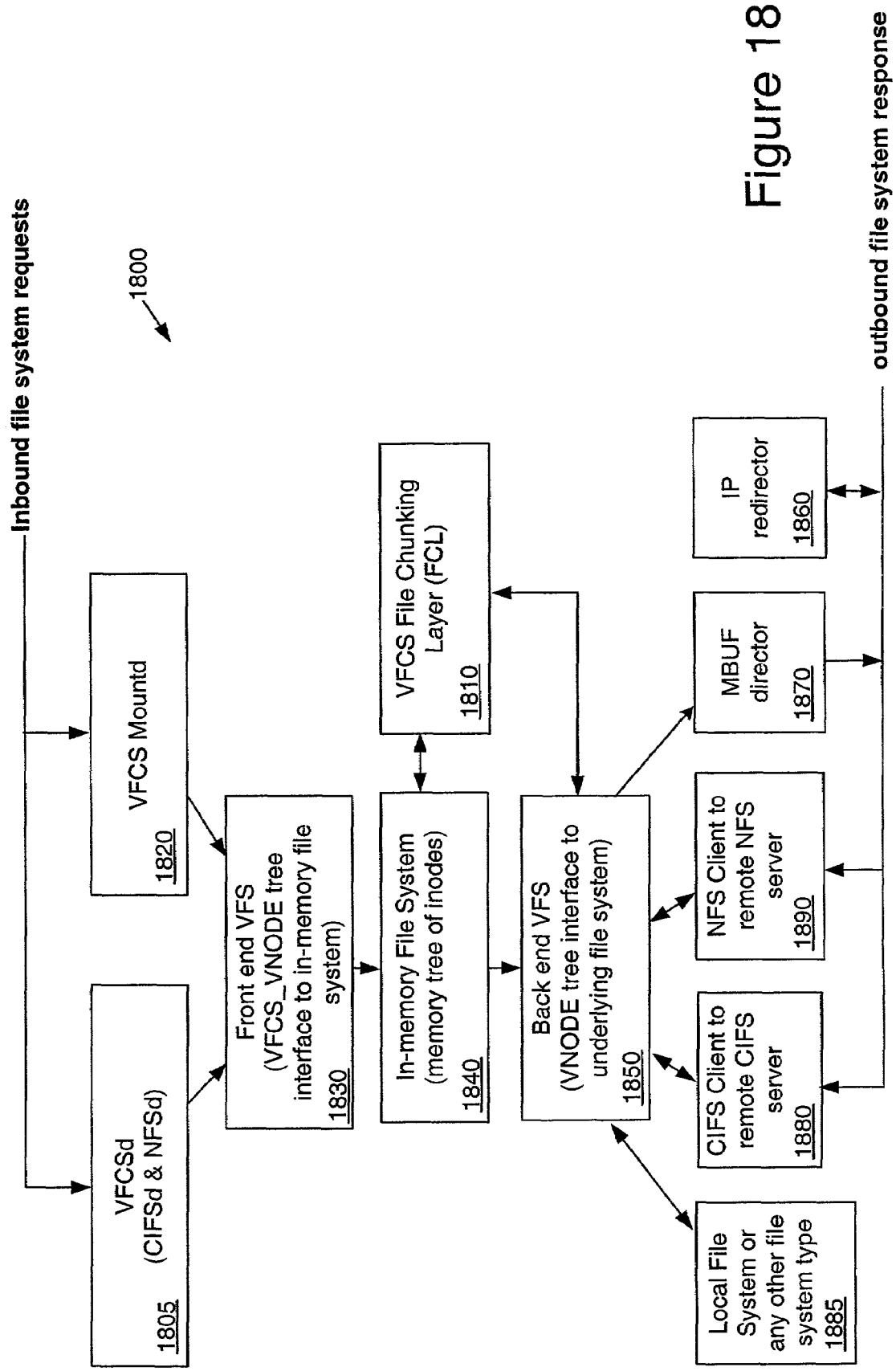
FIG. 18 is an illustration of the VFCS modules in accordance with an embodiment of the present invention.

FIG. 18 shows modules in a VFCS 1800 according to one embodiment of the present invention. In SCDN network 100, files exist in the form of many small block files of configurable size stored in multiple storage devices, and directories and volumes exist in the form of metadata file and meta file system structure in the storage of all the nodes. VFCS 1800 is a special proxy file server or a file system gateway that provides end user clients or application servers a file system interface in both NFS and CIFS protocols. The description below mainly describes the NFS implementations. VFCS 1800 tasks include 1) to present a global file system; 2) to assemble "block files" in real time upon requested by application servers, such that the application servers think that file I/O is performed on a single big file; and 3) to allow modification to file system objects, to manage and initiate the distribution of the updates. VFCS 1800 can be viewed as a file system gateway provides an NFS and CIFS front end to its user clients and uses an underlying file system on its backend. It can be viewed as a file system overlay. The underlying file system may be a local file system, which may be built upon a direct attached storage or a fiber channel storage area network devices, or it may a network attached storage (NAS). In the case when the underlying file system is a NAS, an NFS client is used on the backend to support a VFCS 1800. In which case, VFCS 1800 has to "mount" the underlying file system.

To begin using NFS via VFCS, an application server machine or an end user machine with NFS client must be attached to the global file system of a VFCS over a network to access and modify the file system object through the VFCS. To attach to the VFCS file system, an NFS client needs to obtain the file handle for the root of the exported file system before any file system objects within the file system can be accessed remotely. The "mount" protocol is designed for the NFS client to obtain the initial file handle of the exported root directory to access a network file system. VFCS mountd 1820 implements the "mount" to provide such interface to allow end user clients or application servers to obtain the root handle, this is similar to the "mount" function provided by regular NAS storage devices. VFCS mountd 1820 implements the standard NFS "mount" protocol. It supports all the RPC programs, namely, NULLPROC, RPCMNT_MOUNT, RPCMNT_UMOUNT, RPCMNT_DUMP, and RPCMNT_UMNTALL.

At boot time, the VFCSd 1805 mounts the backend underlying file system, which includes the meta file system structure and the block storage directories. For example: /backend/metapath/, /backend/blockfiles/1/, /backend/blockfiles/2/, etc. These directories contain the entire local content repository. VFCSd 1805 first uses Chunking Layer (FCL) 1810 to load the meta file system structure and volume metadata file for creating an in-memory file system 1840 a tree of inodes, to support its global file system presentation. It may also loads the directory and file metadata depending on memory availability. In the situation where memory is not sufficient, only the volume level is loaded in the memory, the directory and file inodes may be created on demand.

Once the in-memory file system is created, VFCSd 1805 initiates a front end VFS kernel interface 1830, and then builds a VFCS_VNODE tree structure. The VFCS_VNODE tree represents the global file system presentation and is supported by the in-memory file system 1840. The in-memory file system 1840 caches Block Index Array of each file to enable the mapping of the original file presented through the VFCS interface to the block files in the backend file system. The memory of a VFCS may not be sufficient for the entire file system VNODE be created, the VFCS_VNODE may be a sub-tree of the entire global file system, where the each VNODE for a file system object may be created on demand. VFCSd 1805 also loads partial file metadata in its file name cache for the most popular content. When VNODE is created, each VNODE unit is assigned a global unique ID as its handle. The root (exported directory) node is assigned with a "hard coded" handle. The handles for volumes, directories, and files are assigned with their unique ID from their metadata. Since data is physically stored on the backend file system, possibly NAS devices, in-memory file system 1840 is supported by the backend VFS kernel interface module 1850 to simulate a real file system. The backend VFS kernel interface 1850 provides a standard kernel interface to the underlying file system, which may be any type of file system including local file system 1885, or any network file systems such as CIFS or NFS. Remote CIFS and NFS servers can be accessed respectively through CIFS client 1880 and NFS client 1890. The backend file system contains the actual data—block files.

Once the VFCSd 1805 completes its boot process, VFCS mountd 1820 obtains the global "hard" handle to the exported root directory (a root path name) of the in-memory file system. The handle is to be used for subsequent file system I/O operations, which include directory (getattr, readdir, etc.) and file access, creation, and deletion. The main responsibility of VFCS mountd 1820 is to manage its end user clients by authenticating the end user clients and handing over the root handle.

At run time, when a VFCSd 1805 receives a file system request, the request is first authenticated before forwarding to in-memory file system 1840 via the front end VFS 1830. The request may be creating a new file system object, or deleting or modifying or accessing an existing file system object. For the creation of new file system object, an inode is added to the in-memory file system 1840 and an associated front end VFCS_VNODE is also created, the metadata and data blocks are saved into the storage and then replicated to the SCDN via a DS. For the requests that modify a file system object, the corresponding inode and front end VNODE are modified, the associated metadata, the meta file system structure and data blocks in the storage may also be updated, and the new information is replicated through a DS. For the deletion of file system objects, the VNODE, in-memory inode, metadata, and data blocks may be removed, and the command is replicated to the rest of the SCDN via a DS. For accessing a file system object, the VFCSd 1805 tries to locate the associated VFCS_VNODE and returns the appropriate volume or directory information, or for file object returns the data blocks from the storage devices. If the VFCS_VNODE cannot be located, VFCSd 1805 reads the meta file system structure to validate the object, if object is file, the file name cache is searched. Otherwise, the metadata of the associated object is loaded into the memory, and the associated inode and VFCS_VNODE are created and appropriate data is returned. If request is for file object, and if some portions of the file are not local, the backend VFS 1830 issues FDP "prepare" to DS to import the blocks.

The VFCS front end VFS 1830 always listens to notifications from the local DS, DS notifies VFCS 1800 of the arrival of any new file system objects. When an end user accesses a file that is neither in the in-memory file system nor in the name cache, front end VFS 1830 verifies with the meta file system structure in the backend storage before returning a "file not found" error.

For performance enhancement while reading file object, VFCS 1800 either performs read-ahead caching or direct packet forwarding (IP packet spoofing) to ship data directly from back-end storage to front-end application without buffer copying. IP redirector, a component within the IP stack 1860, performs direct packet forwarding. In one aspect of the invention, the system implements a direct packet forwarding (IP spoofing) of read data. IP packet spoofing or direct packet forwarding can only be performed if the backend storage devices are NAS. In the case when backend storage is not NAS, performance of read request is improved by sharing kernel memory buffers with storage device drivers, where a MBUF director 1870 is responsible for shipping mbuf data to the end users.

Figure 19:
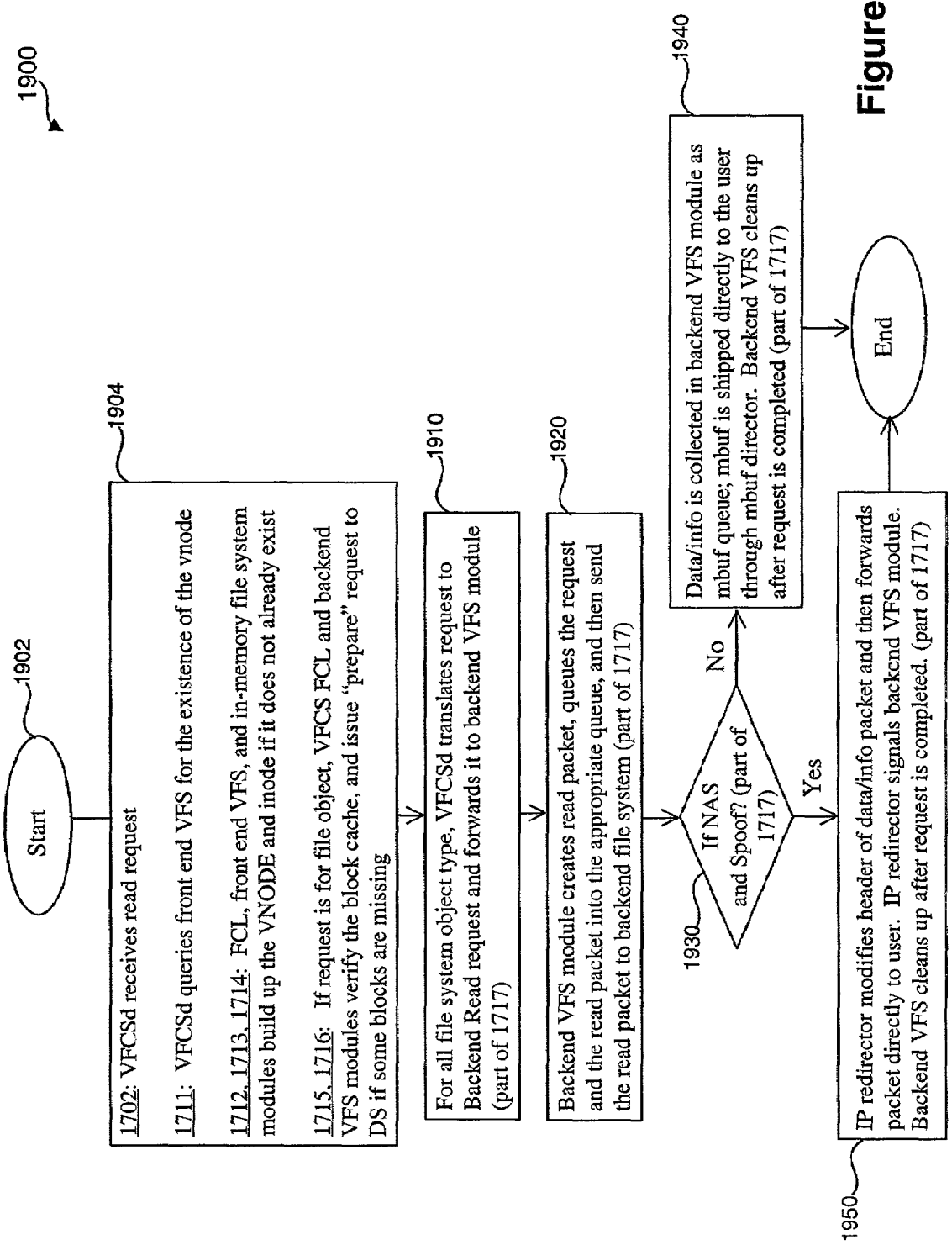
FIG. 19 is a flow diagram of the operations of a VFCS server handling of a read request in accordance with an embodiment of the present invention.

FIG. 19 shows a flow diagram 1900 of one embodiment of the read request process carried out by VFCS 1800 according to the present invention (steps 1904-1950). This flow diagram 1900 also refers to the operations described earlier with respect to FIG. 17A. In step 1904, VFCSd 1805 receives an NFS read request 2600 from an application server. In this module, front end VFS 1830 and in-memory file system 1840 check for the associated vnode and inode and their name cache. If the requested file node is not cached, front end VFS 1830 and in-memory file system 1840 modules create the necessary VNODE and inode in the memory and issue a "prepare" FDP command to the local DS.

Through the in-memory file system module 1840, one or more backend read requests are generated through the corresponding inode that provides information for the data mapping (step 1910). A backend read operation is handled by the backend VFS module. The backend read request is handled by the VFCS backend VFS 1850 and the kernel network I/O Redirector 1860 and 1870 modules. After VFCSd 1805 receives a read request from the application server in step 1904, the read request is finally mapped into block files that reside on back-end storage devices. The VFCS VFS module 1830 generated backend read request is forwarded to the VFCS backend VFS module 1850 (step 1910). In the backend VFS module 1850, the backend request is queued and processed (step 1920). If the backend storage devices are NAS, an NFS read packet based on the given parameters is built and sent to the back-end file server (step 1920). When data arrived, in the case of NAS backend, VFCS 1800 has the option to perform direct packet return on the IP level (step 1930). If direct packet forwarding is to be performed (step 1950), the VFCS IP redirector 1860 performs IP spoofing and forwarding functions by replacing the destination IP and source IP in the packet header in such a way that the application server thinks that the NFS read is replied from VFCSd 1805. VFCS backend VFS module is notified by the IP redirector when data is forwarded. In the case when backend file system is not NAS or when IP spoofing is turned off, the backend VFS module 1850 collects the data in kernel memory buffers with only one buffer copying before forwarding memory-buffer to the user (step 1940). Kernel memory buffers are shipped by MBUF director module 1870. The backend VFS module 1850 cleans up its queue after. requests are carried out (step 1950).

e. VFCS Cluster Load Balancer

The cluster load balancer described herein can be applied on the Distribution Server Cluster 410 of FIG. 4A, Application Server Cluster 420A of FIG. 4A, and VFCS cluster 600 of FIG. 6. By exporting the same handle for the same file system object from any VFCS, a group of VFCSs 470<1 . . . L> can be clustered to support an end user client transparently, see FIG. 6. When a VFCS failed, the other VFCS can satisfy the end user request since it recognizes the file system object handle as any VFCS does. Therefore, a VFCS can be clustered to load balance and provides active-active fail-over transparently. In the case when a VFCS cluster is providing NFS UDP support, it is capable of performing in-session fail-over, in the case of CIFS or NFS TCP support, a VFCS cluster is capable of providing per session fail-over.

Figure 21:
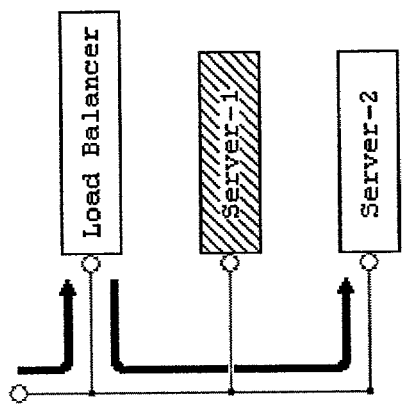
FIG. 21 is a diagram illustrating a server redundancy function provided by an SCDN load balancer in accordance with an embodiment of the current invention.
Figure 20:
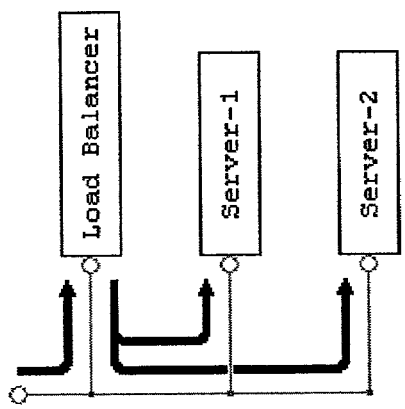
FIG. 20 is a diagram illustrating a server request distribution capability of an SCDN load balancer in accordance with an embodiment of the current invention.

A Load Balancer provides three functions: Server Request Distribution, Server Redundancy, and support for Load Balancer Fail-over. The first function, Server Request Distribution, is the distribution of inbound requests among a set of servers. Each server receives only a partial share of the total requests. FIG. 20 shows a Load Balancer and two servers (Server-1 and Server-2) attached to a network segment. The arrows represent an inbound stream of server requests. If the two servers each receive approximately half of the requests, then the incoming server load is "balanced" between them. The second function, Server Redundancy, is the ability to shield clients from server failures. The Load Balancer detects server failures by performing periodic health checks on each server. When a server has failed, the Load Balancer redistributes requests to the remaining servers. The Load Balancer continues periodic health checks on failed servers to detect when they have recovered. In FIG. 21, Server-1 has failed as indicated by shading, and all requests are now distributed to the single remaining server. The third function is support for Load Balancer Fail-over. The Load Balancer is sufficiently stateless in operation such that, in most cases, when the Load Balancer fails, a secondary Load Balancer can immediately takeover and continue balancing incoming requests without any client disruption.

Figure 22:
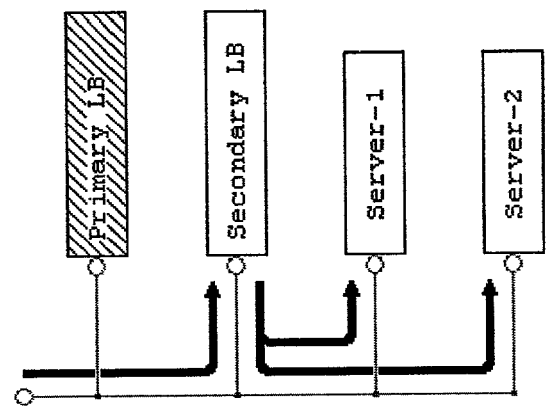
FIG. 22 is a diagram illustrating the instant fail-over capability of an SCDN load balancer as a stateless load balancer in accordance with an embodiment of the current invention.

In FIG. 22, the primary Load Balancer has failed, and the Secondary Load Balancer has taken over. Requests continue to be distributed among the servers.

f. IP Forwarding and Direct Server Return:

Server Request Distribution is supported for the TCP/IP UDP and TCP protocols. UDP is a datagram-oriented protocol. Clients send requests to a server using UDP datagrams, where each datagram contains one request. TCP is a connection-oriented protocol. Clients open a TCP connection to a server and send a series of requests over the connection.

In both cases, the client reaches a server on the network by addressing the UDP datagram or TCP connection to the server's IP network address. The Load Balancer is configured with a special IP address, known as a "virtual" IP address, that clients believe to be a server. Clients address their UDP datagrams or TCP connections to the Load Balancer's virtual IP address. The Load Balancer then forwards these UDP datagrams or TCP connections to one of the actual servers.

Forwarding occurs at the IP packet level. TCP/IP uses the ARP protocol to resolve IP network addresses to physical network hardware addresses. On the last hop, or network segment, of delivery, this resolves to the network hardware address of the destination IP address. Every IP packet contains a destination IP address, and those packets carrying client UDP datagrams or TCP connections will be addressed to the Load Balancer's virtual IP address. When the packet arrives on the local network segment, this IP address resolves to the network hardware address of the Load Balancer.

Figure 23:
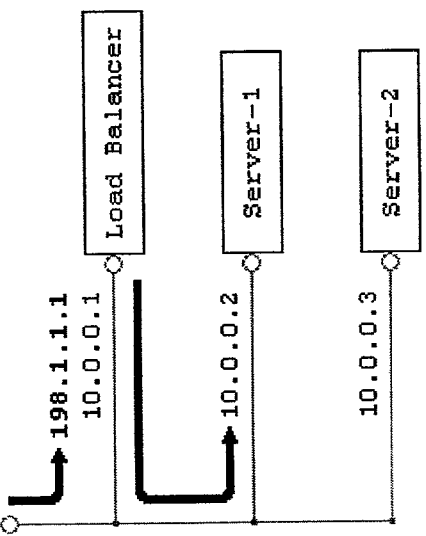
FIG. 23 is a diagram showing an SCDN load balancer redirecting a packet in accordance with an embodiment of the present invention.

To forward a packet to an actual server, the Load Balancer resends the packet, unmodified, on the local network segment. However, instead of using the destination IP address of the packet in the ARP protocol resolution, the Load Balancer uses the actual IP address of the selected server. The ARP protocol will resolve this address to the network hardware address of the server, and the packet will be received by that server, even though it carries a different destination IP address than the address which was used in the ARP resolution. FIG. 23 shows a Load Balancer with two configured IP addresses, 10.0.0.1 and 198.1.1.1, and two servers (Server-1 and Server-2) with IP addresses of 10.0.0.2, and 10.0.0.3. The address 198.1.1.1 is being used as the virtual IP address. Client requests arrive in IP packets that are addressed to 198.1.1.1. The sender of those packets on the local network segment, for example, a router, would resolve those packets to the network hardware address of the Load Balancer. The Load Balancer, in turn, resends the packets on the local network segment, unmodified, and uses an actual server IP address (instead of the destination address of the packet) to resolve to the network hardware address of a server. In the case of FIG. 23, a packet is forwarded to Server-1.

Figure 24:
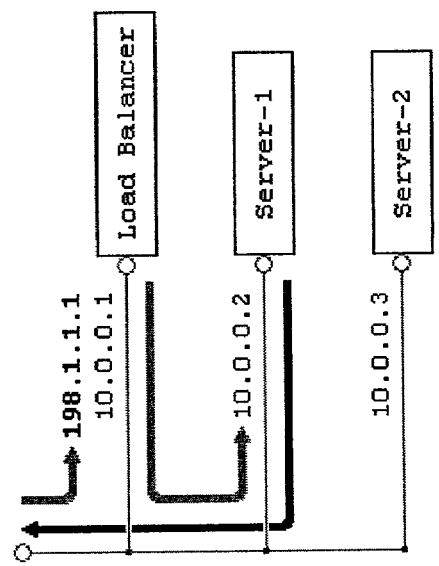
FIG. 24 is an illustrative embodiment of an SCDN load balancer redirecting packets with direct server return in accordance with an embodiment of the present invention.
Figure 25:
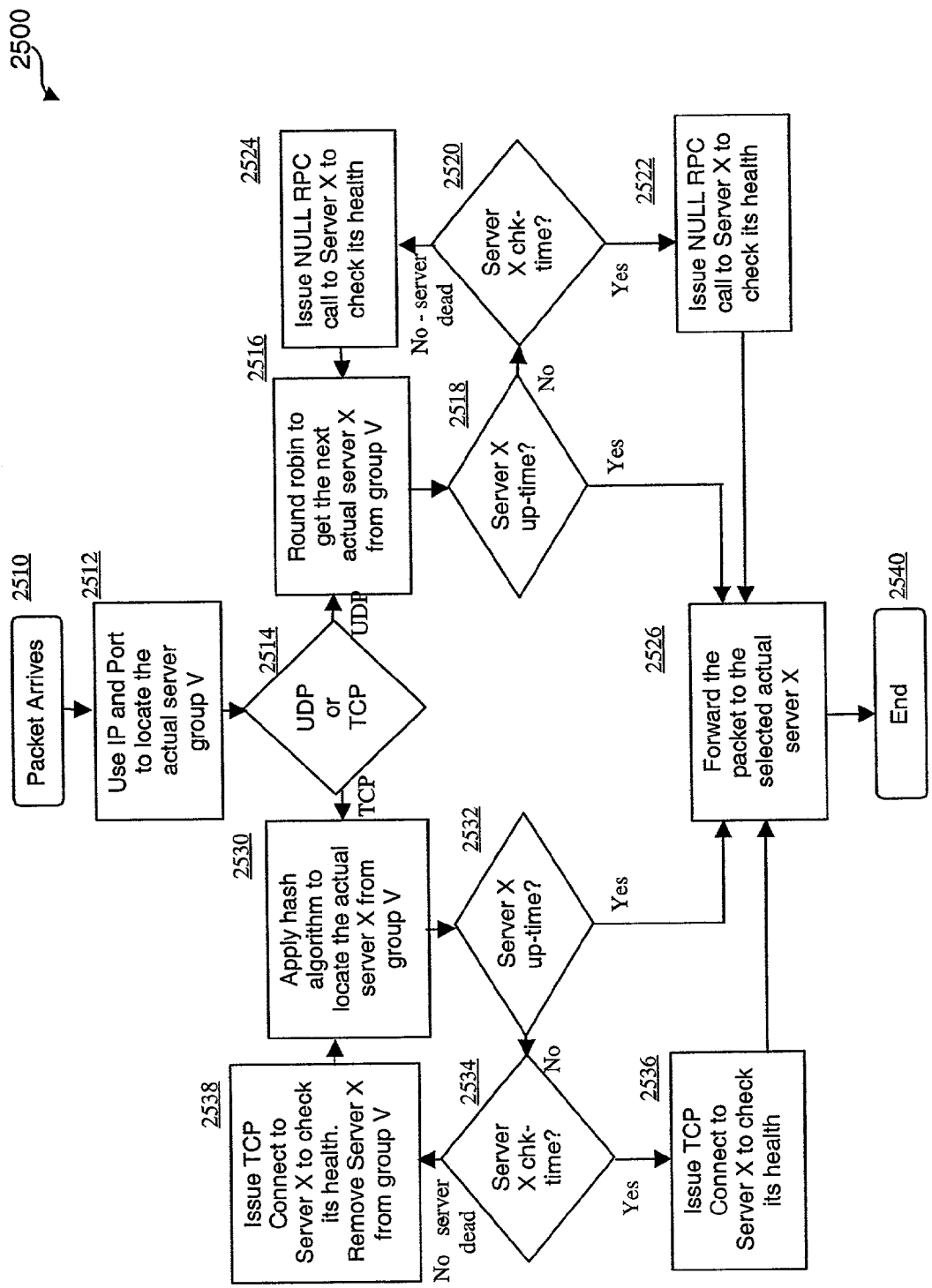
FIG. 25 is a flow diagram of an inbound packet redirection process performed by an SCDN load balancer in accordance with an embodiment of the present invention.

Because the packets are forwarded unmodified, the server receiving the packet can address return packets to the originator of the request simply by swapping the source and destination addresses contained in the request packet. The response destination address will be the client's IP address, and the response source address will be the virtual IP address. The return packets flow directly back to the client, and are not received by the Load Balancer. This is called "Direct Server Return". FIG. 24 shows the path of a request packet to Server-1 from Load Balancer, and the path of a return packet from Server-1 back to the client.

g. Run-Time Operations:

FIG. 25 is a cluster load balancer packet distribution flow diagram 2500 according to an embodiment of the present invention (steps 2510-2540). The cluster load balancer (or simply "Load Balancer") described herein can be applied on the Distribution Server Cluster 410 of FIG. 4A, Application Server Cluster 420A of FIG. 4A, and VFCS cluster 600 of FIG. 6. The Load Balancer is configured as one or more virtual servers. A virtual server is represented by a combination of IP address and UDP or TCP port number. A virtual server can be configured as "match any port" instead of with a specific port number. Each virtual server is configured to have one or more real servers, and each real server is configured with its IP address, and with the network interface to be used to reach the real server. Each virtual server is configured separately for server health checks.

For each IP packet received on a network hardware interface (step 2510), the Load Balancer scans its virtual server configuration for a match on IP address and port number (step 2512). If a match is found, then one of the real servers is selected, either round robin if the protocol is UDP (step 2516), or via the server hash function (or modified hash function) if the protocol is TCP (step 2530). Once the real server is selected, the packet is forwarded on the network interface configured for the real server, and using the IP address configured for the real server for Address Resolution Protocol (ARP) hardware address resolution (step 2526). If there are no real servers available for forwarding, then the packet is rejected, with an ICMP protocol "port unreachable" error packet sent back to the client.

For requests sent over the UDP protocol, each request is carried in a UDP datagram, which in turn is carried in a single IP packet. Because the Load Balancer is designed to work with the NFS file server protocol of the VFCS, each individual request is known to be independent of all other requests. Therefore, IP packets carrying UDP datagrams are distributed in a simple round-robin fashion among the servers (step 2516). For example, if there are three servers, Server-1, Server-2, and Server-3, then Server-1 will receive every third packet.

For requests sent over the TCP protocol, requests are carried in TCP connections. The IP packets carrying TCP connection data cannot be distributed round robin. First, there is no direct correlation between IP packets carrying TCP connection data, and individual requests—a request may be split across multiple packets, and a packet may contain more than one request. Furthermore, a TCP connection cannot be shared between servers by simply forwarding packets. Therefore, all packets for a given TCP connection must be forwarded to the same server.

IP packets carrying TCP connections are distributed based on the source IP address and source TCP port number of each packet. Since these remain constant over the life of a TCP connection, and are present in every IP packet carrying TCP data, all packets of the TCP connection are distributed to the same server.

To select a server to forward the packet to, the source IP address is added to the source TCP port, as an unsigned 32-bit integer, and then divided by the number of servers. The hashing algorithm is: Server Index=(Source IP Address+TCP Port)/Number of server in the group (step 2530). The arithmetic remainder of the division will be a number ranging from zero to one less than the number of servers. This is called the "server hash function". For example, if there are three servers, the result of the server hash function will always be 0, 1, or 2. This result serves as a zero-based index to select a server. For example, 0 selects the first server, 1 selects the second server, and 2 selects the third server. Note that the Load Balancer does not need to keep any TCP connection state, or even any knowledge of currently open connections, as each arriving packet carries the information used to distribute it correctly.

Since the TCP port number is incremented on a typical client for successive TCP connections, multiple connections from the same client will statistically, over time, be distributed evenly across the servers, since the incrementing port number will cause the result of the server hash function to cycle repeatedly. For example, an incrementing port number will result in a cyclical series of results such as 0, 1, 2, 0, 1, 2, 0, 1, 2, etc. Also, since the source IP address is included in the server hash function, connections from multiple clients should statistically arrive at different hash function results, even if they are using the same TCP port number, since their IP address will be different. This scheme attempts to perform a statistically balanced distribution of TCP connections across the servers, and therefore, a statistically balanced distribution of requests.

When a server fails, the Load Balancer distributes new requests to the remaining servers. For UDP packets, this is not a problem, since the distribution is round robin (Transition from 2524 to 2516). The packets are simply distributed round robin among the remaining servers. For TCP, however, the packets cannot simply be forwarded to another server, since that server will have no knowledge of the TCP connection. There is nothing that can be done for those TCP connections once the server has failed. But, if we do not redistribute packets around a failed server to another, running server, then new TCP connection attempts by clients will fail, should they be distributed to the failed server.

To handle this problem, a modified hash function is used when the server hash function, applied to a packet, resolves to a failed server. The modified hash function works like the server hash function, but divides by the number of living servers instead of the number of all servers. The result is an index into the set of living servers. This redirects the packet to an alternate, living server, and as long as the set of living servers remains the same, all packets on the same TCP connection will be directed to the same alternate server. This is shown in 2538 where the dead server is removed from the group before re-applying the hash algorithm in 2530. Note that the modified hash function is applied only after the server hash function has selected a failed server. This will not affect other TCP connections that are currently being directed to living servers.

When the Load Balancer begins applying the modified hash function to an existing TCP connection, the result is that packets once forwarded to a failed server are now forwarded to an alternate server. However, that server has no knowledge of the TCP connection represented in the packets. This is recognized by the server to be a "half-open" TCP connection, a condition that may occur normally on a TCP/IP network, and which the TCP protocol already handles. The alternate server will reset the connection. The client, if is has adequate error recovery, will open a new TCP connection. This new connection, directed by the modified hash function, will be opened to the alternate server. Regardless of how long the original server remains out of service, the client sees only a momentary disruption of service.

When the failed server later recovers, the server hash function will no longer resolve to a failed server, and so the modified hash function will not be resorted to. In this case, any TCP connections opened while under the direction of the modified hash function will now be directed to a different server—the server given by the original server hash function. Once again, that server will interpret these connections as half-open connections, and will reset them. Any connected clients will see a momentary disruption in service. The alternate server, to which these connections were opened under the modified hash, experiences what appears to be inactive clients, and those connections will eventually time-out on that server and will be closed.

h. Server Health Checks:

The Load Balancer supports two methods of server health checks. The first is an NFS protocol NULL RPC over the UDP protocol, step 2524 of FIG. 25. The second is a TCP connection open followed by an immediate close in step 2538 of FIG. 25. If the health check succeeds within a specified length of time, then the server is presumed to be alive and functioning. If it fails, then the server is presumed to have failed.

Three time periods are configured for health checking, and they run independently for each server. The "Up" time period is the length of time for which a health check is not required. During this time, packets are forwarded to the server. This is shown in steps 2518 to 2526 and 2532 to 2526 in FIG. 25.

The "Check" time period is the length of time for which a health check is allowed to complete. Once the Up time has run out, the next packet forwarded to the server triggers a health check attempt, and the Check time is started. During check time, packets continue to be forwarded to the selected server. This is shown in steps 2520, 2522, 2534, 2536, and 2526 in FIG. 25.

The "Dead" time period is the length of time before a re-check of a failed server occurs. If the health check succeeds before the check time runs out, then a new Up time period is started. But, if the health check fails or the Check time runs out, then the Dead time is started. Each start of the Dead time triggers a new health check attempt. Once the Dead time has run out, the next packet that would have been forwarded to this server (via the server modified hash, before invoking the modified hash) triggers an examination of the result of the health check, see 2524-2516 and 2538-2530 of FIG. 25, and either a transition to the Up time, or a restart of the Dead time (with a new health check started). A server in the Up or Check time is presumed to be alive and well. A server in the Dead time is presumed to have failed.

Figure 26:
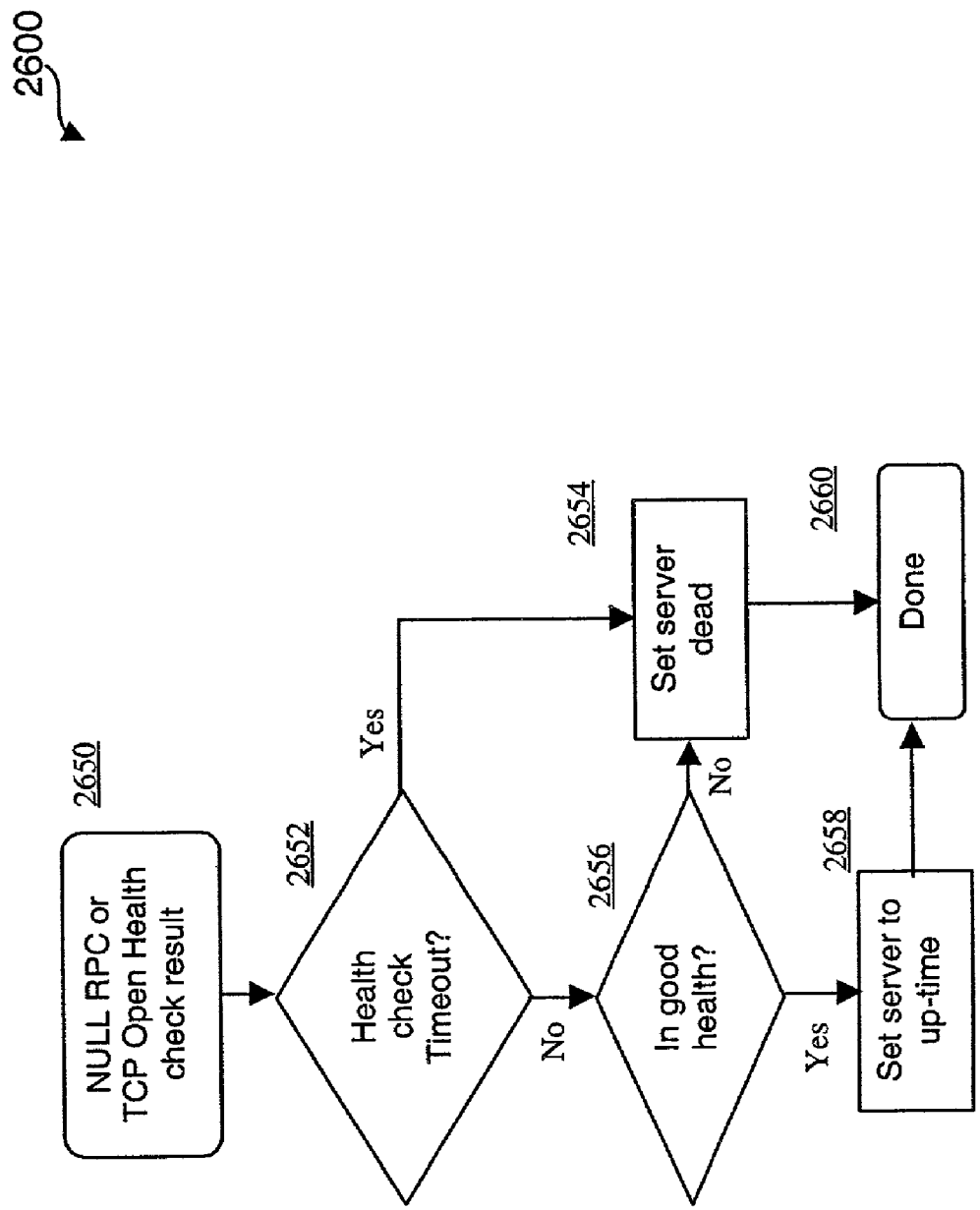
FIG. 26 is a flow diagram of a health check process as performed by an SCDN load balancer in accordance with an embodiment of the present invention.

FIG. 26 shows a flow diagram 2600 of a health check sequence (steps 2652-2660). When a health check fails or the check time runs out, the server dead time begins, 2652, 2656 and 2654 of FIG. 26. Otherwise, the server up time period started, 2658 of FIG. 26, until done (step 2660).

The time periods, and the results of health checks, are only checked when packets arrive and are directed to the server (either round robin, through the server hash function, or through the modified hash function). The packets serve as events to drive the health check sequence forward.

4. The Control Unit Data Repositories and Management Subsystems

Figure 27:
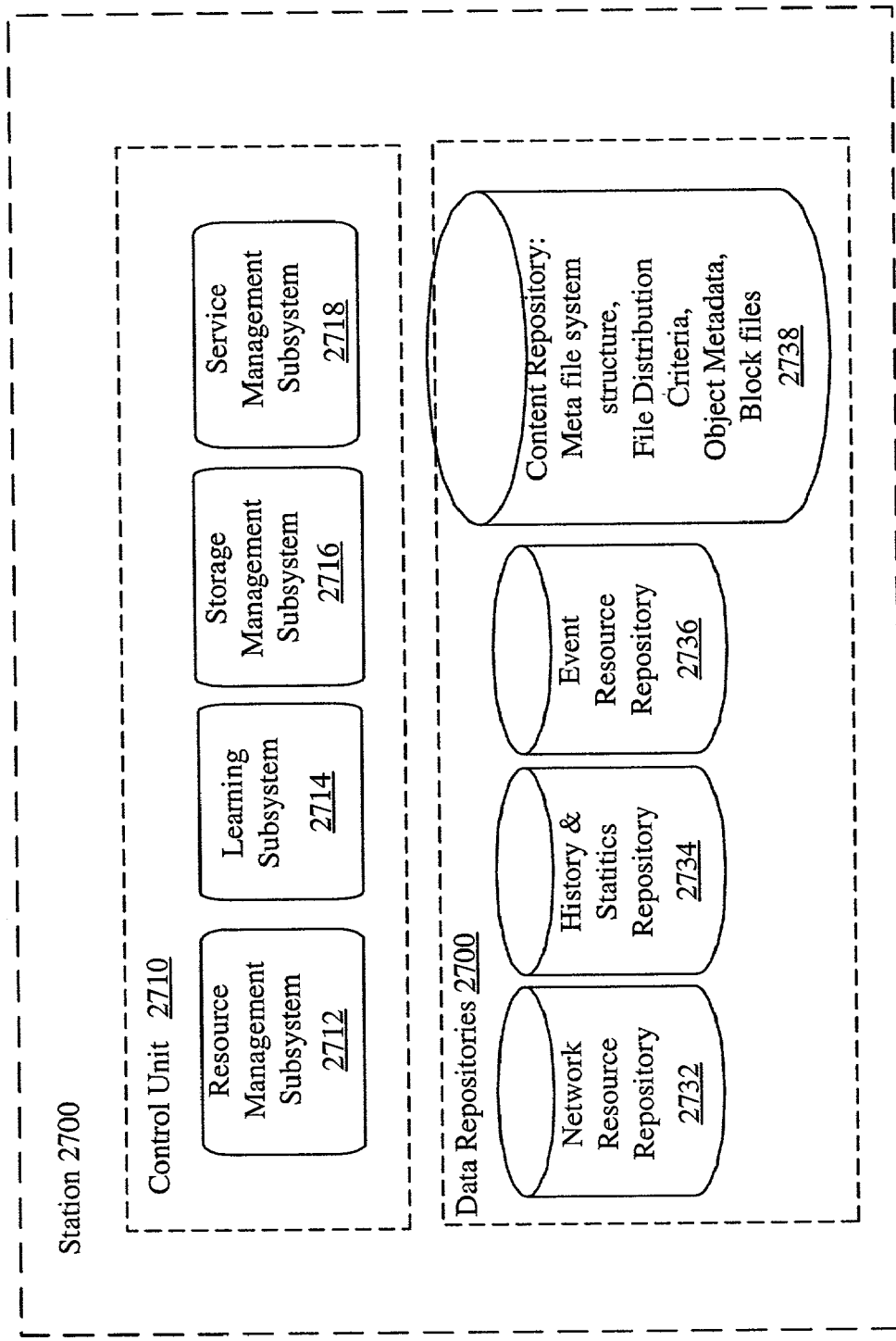
FIG. 27 is an illustration of a station showing an exemplary a control unit and data repositories.

FIG. 27 is an illustration of the control unit and data of a station 2700 in the SCDN 100 in accordance with an embodiment of the present invention.

Station 2700 includes control unit 2710 and data repositories 2730. Control Unit 2710 may be an embedded system that includes four control subsystems, in one embodiment of the invention. FIG. 27 identifies the Control Unit's subsystems and data repositories of a station. Control Unit 2710 includes Resource Management Subsystem 2712, Learning Subsystem 2714, Storage Management Subsystem 2716, and Service Management Subsystem 2718, collectively called control subsystems. Data Repository 2730 within the Station includes Network Resource Repository 2732, History and Statistics Resource Repository 2734, Event Resource Repository 2736, and Content Repository 2738.

The Control Unit's Service Management Subsystem 2718 monitors and manages the Station's DSs and VFCS Servers. The Resource Management Subsystem 2712 supports SCDN network and service configurations and log and usage data roll up activities. Learning Subsystem 2714 supports auto-initialization, incremental content learning, and other adaptive methods for management and control of the station. Storage Management Subsystem 2716 monitors cluster storage usage, supports content rating and pruning, and notifies CMS 170 of the storage usage of each content owner. Service Management Subsystem 2718 monitors and controls services based on threshold settings, issues SNMP (Simple Network Management Protocol) traps, export Enterprise MIB (management information bases), and export history, statistics, and event data. It will be evident to those of ordinary skill in the art that the functions described herein are used for convenience and that other functions may be added, subtracted, or substituted so long as they result in efficient and reliable control and management of the SCDN station.

a. Storage Management Knowledgebase

Figure 30:
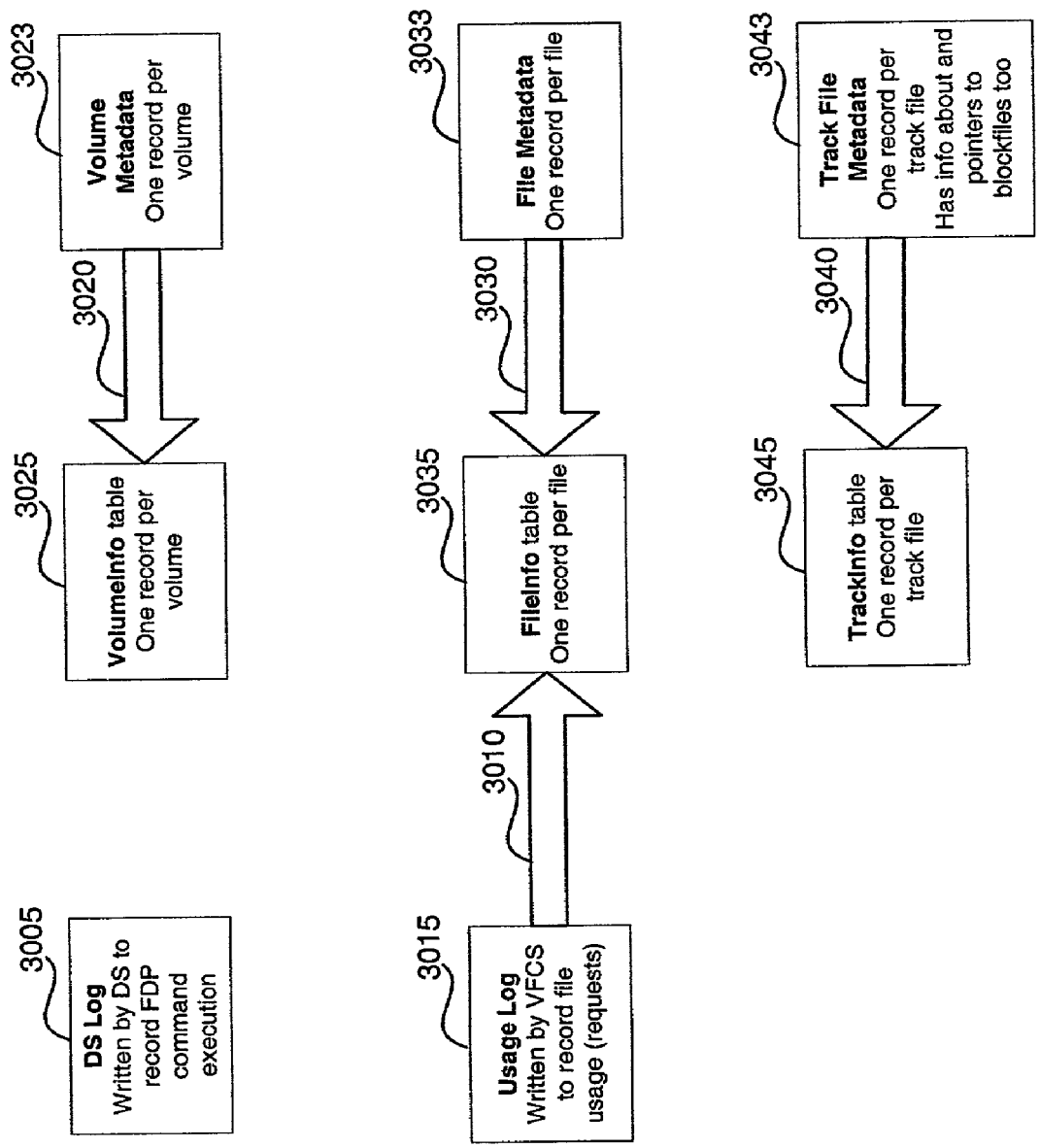
FIG. 30 illustrates the Storage Management knowledge base tables.

Storage Management subsystem 2716 in one embodiment of the invention maintains a knowledge base in a relational database called the SM_DB that resides on the CU. Reference is also made to FIG. 30, illustrates example storage management knowledge base tables (3005, 3015, 3025, 3035, 3045) and volume metadata 3023, file metadata 3033, and track file metadata 3043. There are seven database tables in this database:

The DS Log
The Usage Log
The VolumeInfo table
The FileInfo table
The TrackInfo table
The Storage Alarm Log
The SM Audit Log These tables will be described below:

i. The DS Log

The DS Log table 3005, or Prism_DS_Log, contains records for many of the events or commands handled by the Distribution Server. It is maintained by the Distribution Server subsystem. When DS processes any of these six FDP commands, it logs the completion of the event to the database.

The fields of the Prism_DS_Log table are as follows:

| FIELD | MEANING |
|---|---|
| CommandType | One of: INFO, PUT, REPLICATE, PREPARE, REMOVE, CLEAN |
| InfoCategory | One of: CPUDATE, CPRESERVE, CPDELETE, FILEUPDATE |
| Direction | Inbound or Outbound |
| NetworkId | The unique id of the network where this volume originates |
| VolumeId | The unique id of the volume within the network |
| FileID | The unique id of the file within the network |
| TrackIndex | The index of this track |
| ByteCount | Total number of bytes affected, if applicable |
| Status | OK or error code |
| OriginTime | Time at which packet was originally sent |
| StartTime | Time at which execution of the command began |
| EndTime | Time at which execution of the command was completed | ii. The Usage Log

The VFCS (such as VFCS 470, 600, 1800) is responsible for serving content via a file system interface such as NFS and CIFS. When VFCS receives a request for a block of data, the event is logged to a file. The logging granularity is configurable. When the first byte of a file is accessed, the content's last accessed time/date is updated with the current time. The Usage Log table 3015, or Prism_Usage_Log, contains one record for each "read request" fulfilled by VFCS. A "read request" is defined as any file operation that includes reading of the first byte ("byte 0") of the file. The Usage Log table is maintained by the VFCS subsystem to record file usage (i.e., requests for the file).

The fields in the Usage Log table 3015 are as follows:

| FIELD | MEANING |
|---|---|
| RequestTime | Time at which the "read" request was received by VFCS |
| DataSource | Identify a data source (field may be not used) |
| RequestorIp | Identify an IP address of requestor (field may be not used) |
| NetworkId | The unique id of the network where this volume originates |
| VolumeId | The unique id of the volume within the network |
| FileID | The unique id of the file within the network | iii. The Volume Info Table

The VolumeInfo, FileInfo and TrackInfo tables (3025, 3035, 3045) are similar to the VFCS metadata files for the same objects (Volume metadata file 3023, file metadata file 3033, and track file metadata 3043), but they omit data that is not relevant to storage management tasks and they include other dynamic data that is specialized for storage management tasks.

The VolumeInfo table 3025 contains one record for each volume. The fields in each VolumeInfo record are as follows:

| FIELD | MEANING |
|---|---|
| NetworkId | The unique id of the network where this volume originates |
| VolumeId | The unique id of the volume within the network |
| CurrentUsage | The total size of all block files presently in storage at this station |
| ReservedSpace | The maximum amount of space the volume is authorized to occupy at any one time at this station |
| AssignedStation | The id of the originating station for this volume |
| PruningThreshold | A percentage of reserved space such that if current usage ever falls above this amount, storage manager will in the next pruning cycle prune back enough block files to bring the current usage below this number again. |
| AlarmThreshold | A percentage of reserved space such that if current usage ever falls above this amount, storage manager will send an alarm notification to the CMS application and the owner will not be permitted to inject any more files into the system until current usage has been brought below this number again. |

VolumeInfo table 3025 can include data copied from volume metadata file 3023 as shown by arrow 3020.

iv. The File Info Table

The FileInfo table 3035 contains one record for each file known at this station. FileInfo table 3035 can include data copied usage log 3010 and file metadata 3033 as shown by arrows 3010 and 3030. The fields of each FileInfo record are as follows:

| FIELD | MEANING |
|---|---|
| NetworkId | The unique id of the network where this file originated |
| VolumeId | The unique id (within the network) of the volume who owns this file |
| FileID | The unique id of this file within the network |
| TrackCount | The number of tracks into which this file has been decomposed |
| BlockSize | The size (in bytes) of each block file for this file (the last block of each track may be smaller than this) |
| Duration | The duration or "playing time" of this file, if appropriate |
| Popularity | The estimated or expected demand for this file, on a scale of 0 to 10. |
| ExpirationDate | Date on which this file expires (the exact time of expiration will be 23:59:59 GMT on that date). The file will be removed from each local station during the first pruning cycle on the first day in LOCAL time AFTER the exact time of expiration. |
| FirstUsed | The first time at which this file was requested by a user (within the timespan covered by the Usage Log) |
| LastUsed | The last (most recent) time at which this file was requested (within the timespan). |
| UseCount | The number of times this file has been requested (within the timespan) | v. The TrackInfo table

The TrackInfo table 3045 contains one record for each track of each file known at this station. TrackInfo table 3045 can include data copied from TrackFile metadata 3043 as shown by arrow 3040. The fields of each TrackInfo record are as follows:

| FIELD | MEANING |
|---|---|
| NetworkId | The unique id of the network where this file originated |
| VolumeId | The unique id (within the network) of the volume |
| FileID | The unique id of the file within the network |
| TrackIndex | The index of this track |
| TrackLength | The full size of the track |
| CurrentSize | The total size of all block files currently present in storage |
| MinRetainSize | The minimum size to which this track ought to be pruned |
| BlockSize | The size of each blockfile of this track (except possibly the last block) |
| Truncatable | Boolean, indicating whether any blocks at all can be pruned from this track | vi. The Storage Alarm Log

The Storage Alarm Log table contains one entry for each time that a volume either enters or exits an alarm state. A volume is in an alarm state if their current storage usage exceeds the alarm threshold. The fields of the Storage Alarm Log are as follows:

| FIELD | MEANING |
|---|---|
| NetworkId | The unique id of the network where this file originated |
| VolumeId | The unique id (within the network) of the volume who owns this file |
| UpdateTime | Time at which this record was created |
| CurrentUsage | Number of bytes of storage the volume was using at the time of the update |
| ReservedSpace | Number of bytes of storage the volume has reserved |
| AlarmState | Whether or not the volume is IN or NOT IN an alarm state (true or false) | vii. The Storage Management Audit Log

The storage management audit log includes the following record fields:
 Overall local network storage
 Total storage size
 Overall local network storage usage and availability
 Storage usage=Sum of all volume storage usage
 Availability=Sum of all storage volume size−Sum of all volumes storage usage.

5. Optimized Storage Management a. The Role of Storage Management

When content is published, the whole or a subset of the entire file is distributed to the storage devices all over the network. When a content file is requested by a user through VFCS, non-resident blocks of data for the requested file are imported into the local storage devices from other DSs. The importing of data blocks will eventually fill up the local storage, requiring that some lesser-used content be deleted to make room for the newly imported blocks. Therefore, the storage usage at each Distribution Center must carefully be monitored and managed so that storage usage is optimized.

The deletion of less popular content to make room for more popular content is called "pruning". It is the responsibility of the Storage Management Subsystem 2716, also referred to as the Storage Manager, to carry out pruning as needed. To manage storage devices, the storage availability, user demand, and the data importing activities must all be monitored so that accurate prediction of the most likely to be accessed data can be done and local storage devices can be adjusted to store only the most popular content.

Storage Manager 2716 also tracks overall storage usage of each volume. It reports to Content Management Server (CMS 170) a volume's storage usage. It also alerts a CMS when a volume's storage usage is over the reserved quota.

To make storage management decisions, Storage Manager 2716 keeps track of 1) overall storage availability, 2) volume storage reservation and information, 3) storage activities for a volume storage space, 4) storage activities in the station, 5) content usage, 6) network situations, and 7) the attributes of the content. It decides when it has to remove some content to make room for the new or more popular one. It also decides on what and how many blocks of data to remove. Several different intelligent algorithms can be used to select content blocks for pruning according to embodiments of the invention.

If a volume or volumes are found to be over their storage threshold value, the content within the volumes is examined and ranked by "prunability". A content is considered prunable if it is truncatable, has not already been pruned down to its minimum allowable size, and is not currently being used (see below). Those contents that are prunable are ranked (prioritized) for pruning so as to optimize a chosen cost function. For example, depending on the volume's network cost structure, the ranking may be done with the goal of minimizing the total number of bytes of network traffic for the volume. Alternatively, the ranking may seek to minimize just the peak bandwidth usage for the volume, or to minimize a cost function that is a mathematical combination of these and other factors such as computational overhead or network-wide load distribution.

Ranking involves analyzing the information in the knowledge base, namely, the current state and the usage history of the content. Using all this available information, the different contents are sorted according to their likely impact on the chosen cost function. For example, if the cost function is just the total network traffic (in bytes), then one content is considered more prunable than another if it is less likely to be requested again (it is less frequently used). A Least Frequently Used algorithm can be used for this cost function. The indexes of the sorted results are saved in either a database or a file so that multiple Storage Managers have shared access to the results of their calculations.

Storage Manager 2716 uses any of a number of algorithms that examine the usage data and determine which content will optimize the chosen cost function. The architecture allows for new algorithms to be added. In addition to a Least Frequently Used algorithm (LFU), Storage Manager 2716 currently supports Least Recently Used (LRU), Least Frequently Used Capped (IFUCapped), Least Recently Used K-times (LRU-2, LRU-3, . . . ), Uniform Decay (UD), and a random selection algorithm. LRU tries to optimize the same cost function as LFU (total network traffic), but it sacrifices some of that goal in exchange for better computational efficiency. LRU-K is a computational compromise between LFU and LRU. LFUCapped is a count-limited version of LFU that seeks to be more sensitive to changes in a content's popularity over time. UD has the goal of reducing variability in network usage, so the resulting network traffic may have higher total volume but is more evenly distributed over time.

Storage Manager 2716 switches between algorithms if it determines that certain network conditions or usage patterns indicate a temporary preference for one algorithm over another. Storage Manager 2716 can switch between algorithms automatically and/or manually in response to an administrator or user selection.

The degree of pruning, that is, how much to prune? can also be controlled. Storage Manager 2716 creates a sorted list of contents that are ranked by prunability. Visiting each content object in turn, starting with the most prunable, it deletes some number of data blocks from each content. It stops this process when enough bytes have been pruned to bring the volume's total usage down to an acceptable level—under the pruning threshold. The number of data blocks it deletes from a particular content is calculated based on the chosen cost function and algorithm.

Most algorithms prune a variable number of block files from each prunable content file. A Uniform Decay algorithm can be used, however, which prunes just a little bit from each prunable content file, so that the total amount of bytes that needs to be pruned is taken as evenly as possible from all prunable contents. As a result of this, over time each of a volume's contents tends to have an amount deleted from it that is inversely proportional to its frequency of being used. The less frequently a content is used, the more of its bytes are not kept locally. It can be shown mathematically that this arrangement results in smaller variability (statistical variance) in the network traffic in certain applications. The ability to prune partial contents allows Storage Manager 2716 to perform this particular optimization.

How to Prune?

When Storage Manager 2716 decides to prune a content file, the file is examined closely to determine the correct range of blocks that should be removed. One model of pruning is to remove the blocks only from the end (temporally) of the file. Another model is to remove blocks starting from the number (n+1) block, where blocks 1 to n are the required minimum retained blocks.

Once the removal range is determined, Storage Manager 2716 issues a FDP REMOVE command to the DS. Storage Manager 2716 does not update its knowledge base until the blocks are actually removed by the DS and the DS has logged the removal in the DS log.

In Use Protection

If it is determined that a content is in use, Storage Manager 2716 will not attempt to delete any of the, i.e., the file will not be examined by a pruning algorithm.

In one example, a content is considered in use when the following condition is met:

Current Time<Viewing Start Time+max(content duration*inUseFactor, content duration+minInUseBuffer).

In some situations Storage Manager 2716 may determine that content is prunable and during the process the content may become in-use. To prevent the content from being deleted, a safety measure has been put in place whereby the DS will verify that the content is not in use before carrying out the deletion. These safety measures can include content volume storage safety thresholds such as an alarm threshold and a pruning threshold. Each threshold is a percentage of the volume's reserved storage size; the percentage amount is configurable.

The operation of the Storage Management subsystem 2716 is described further below.

b. Overview of Storage Management Cycle

Figure 28:
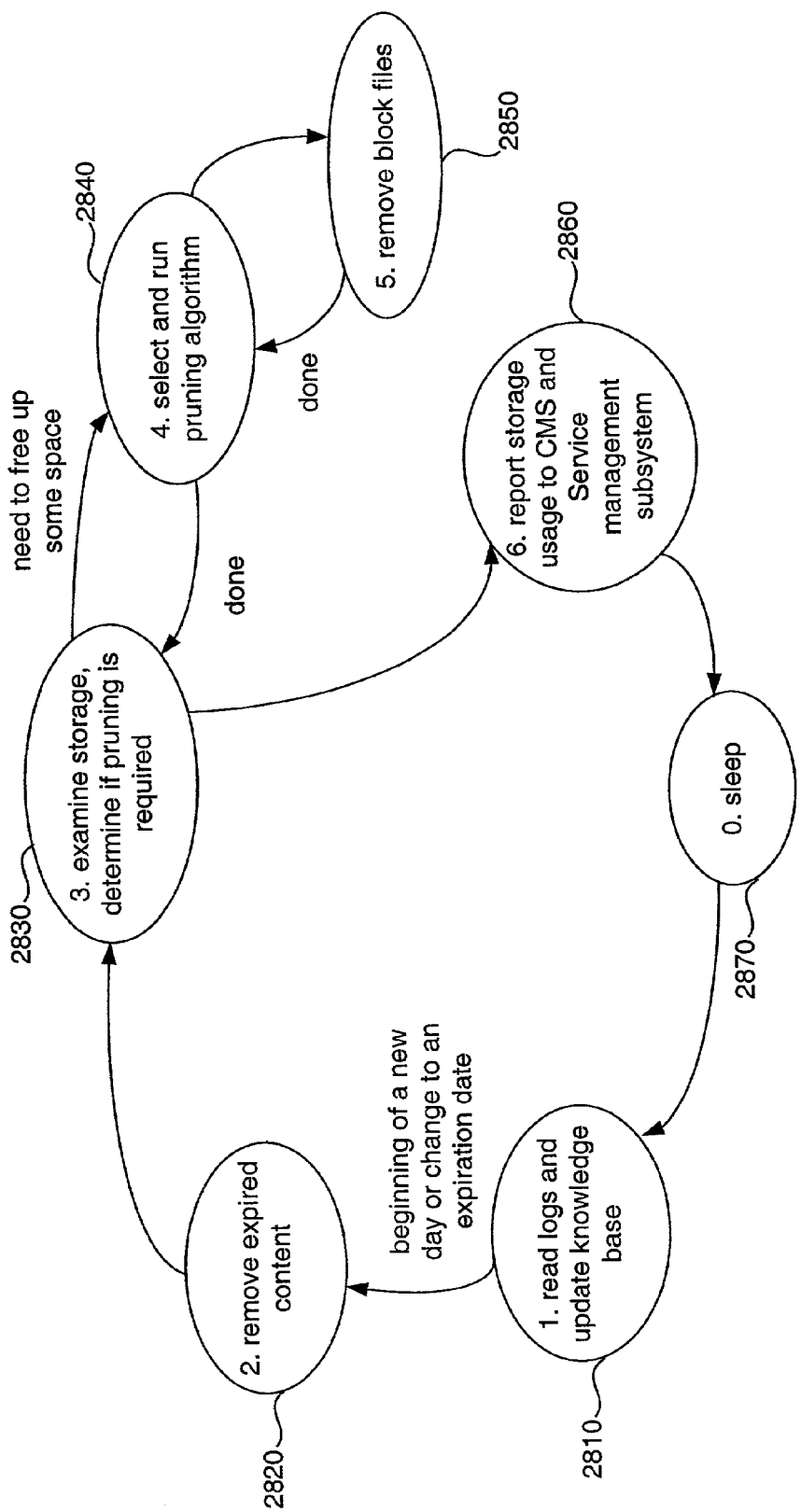
FIG. 28 is a state diagram showing the storage management steps performed by one embodiment of the present invention.

Storage Management subsystem 2716 runs continuously in an infinite loop. Each time around this loop is called a Cycle or Pruning Cycle. FIG. 28 shows one embodiment of the state diagram of a Storage Management Cycle of current invention (steps 2810-2870). Storage Manager 2716 periodically processes the DS and VFCS activity logs to update its knowledge base and take necessary action to manage the local storage. The maximum time interval between cycles is configurable. The processing done in each step of a Pruning Cycle is briefly described as follows:

- Step 0: (2870 of FIG. 28) Sleep for a period of time long enough that enough activity may have occurred to make another pruning cycle worthwhile, but short enough that it is unlikely any volume would have reached 100% capacity.
- Step 1: (2810 of FIG. 28) Scan the DS Log for events that cause information about or parameters associated with volumes, file or track files to change. For each "touched" object, refresh the storage management knowledge base with current data obtained from the VFCS metadata.
- Step 2: (2820 of FIG. 28) Once a day, or whenever file expiration dates have been modified, check for and delete files that expired before today's date.
- Step 3: (2830 of FIG. 28) Compute the current storage usage of each volume as a percent of that volume's space reservation. Send an alarm to CMS for any volume which usage percent has reached the alarm threshold. Make a list of volumes which usage percent has risen above the pruning threshold.
- Step 4: (2840 of FIG. 28) For each volume which storage usage is above pruning threshold, decide which blocks of which files should be deleted to bring the storage usage back safely below pruning threshold.
- Step 5: (2850 of FIG. 28) Issue FDP REMOVE commands to the DS to remove the selected blocks. The DS will queue and later execute these commands independently of the Storage Manager.
- Step 6: (2860 of FIG. 28) Report volume usage statistics to CMS.

The Storage Management Cycle shown in FIG. 28 may be implemented in multiple machines as multiple processes running in parallel while sharing the same knowledge base.

Each of the steps (or states) of the storage management cycle shown in FIG. 28 is described further with respect to additional implementations of the present invention. FIGS. 29A-29E show additional sub-steps for carrying out steps 1-6 (i.e., steps 2810-2860).

c. Determine Sleep Interval between Pruning Cycles

This describes Step 2 in FIG. 28 (step 2800) according to an embodiment of the present invention. Before beginning each new Pruning Cycle, an algorithm is applied to decide whether to begin the cycle immediately or to "sleep" (wait) for a period of time before beginning. If any content volume had exceeded pruning threshold in the previous cycle (meaning that some content had to be pruned to bring that volume's current usage down below threshold), then the next cycle is begun immediately. If no volume required pruning in the previous cycle, then it will sleep for a while before beginning the next cycle. The length of time that it sleeps is based on how long it has been since the last pruning was required. The longer it has been since the last time that pruning was required, the longer it will sleep, up to a certain maximum sleep interval. The maximum sleep interval is a configurable parameter. It will be obvious to one skilled in the art given this description that a more sophisticated algorithm can be applied here to estimate a safe interval of time to sleep that would minimize the risk that a volume might fill up 100% of their storage reservation while Storage Manager 2716 was sleeping.

d. Update the Knowledge Base

This describes Step 1 (2810) of FIG. 28 as implemented in one embodiment of the invention. The information it updates includes content volume storage usage, content usage, volume list and information, content file list and information, current bandwidth cost, cost of transfer of each content file, actual content popularity, optimal retain size of each content, and content prune-ability. The sub-steps in this state are diagrammed in FIG. 29A and are described as follows:

(2911) Read the DS log for all INFO commands: the types of INFO commands gathered are CPUpdate (new or revised metadata about a volume), ResUpdate (new or revised storage reservation for a volume), CPDelete (deletion of a volume), and FileUpdate (new or revised metadata about a file).

(2912) For each volume affected by an info command, update that volume's entry in the VolumeInfo table by reading the metadata for the volume from the VFCS. For each affected file, update the entry in the FileInfo table for that file by reading the current VFCS metadata for that file.

(2913) Read the DS log for all events that might affect the current size of files. Such events are PUT, REPLICATE, PREPARE, REMOVE and CLEAN, each affecting either a whole file or one track within a file.

(2914) For each affected track file or file, update the corresponding entry in the Trackinfo or Fileinfo table, respectively, by reading the current metadata from VFCS.

e. Remove Expired Content

This describes Step 2 (2820) of FIG. 28. The sub-steps are diagrammed in FIG. 29B and are described as follows:

(2921 & 2922) Determine if it is time to check for expired file. This will be the case if no check for expired file has yet been done on this calendar day (2921) or if some file info has been updated since the last check was made (2922). If neither of these conditions holds, do not continue with these steps.

(2923) Obtain from the FileInfo table a list of all files whose expiration date was before the current date. (The "expiration date" is intended to be the last day that the file is valid, so the file is not deleted until after its expiration date has passed.)

(2924) For each expired file, issue an FDP REMOVE command to DS to remove the file.

f. Determine Whether Pruning is Necessary

This describes step 3 (2830) of FIG. 28. Examine storage availability and content volume reservation to determine if pruning is necessary in this cycle. The sub-steps are diagrammed in FIG. 29C and are described as follows:

(2931) Recalculate the current usage field in the VolumeInfo table for each volume based on the sum of all currentsize values for all track files associated with all files belonging to that volume.

(2932) Query the VolumeInfo table for a list of all volumes which current usage is above their alarm threshold. The alarmthreshold for each volume is a certain percentage of that volume's reserved storage, for example 90%.

(2933) For each volume whose usage exceeds the alarm threshold, set an alarm record in the StorageAlarmLog table. (A separate process will pick up this entry and forward it to the CMS at the volume's assigned station).

(2934) Query the VolumeInfo table for a list of all volume which current usage is above their pruningthreshold. The pruning threshold for each volume is a certain percentage of that volume's reserved storage at the station, for example 80%.

g. Update Content Usage History

This is the first portion of step 4 (2840) of FIG. 28. Whenever it is determined that one or more volumes needs pruning, a single pass is made through the Usage Log table to delete entries that are older than a certain time period. This helps to ensure that the Usage Log does not grow too large. Generally, usage data is only tracked for the most recent 30 days, but the length of time it is tracked is a configurable parameter.

h. Prioritize Content for Pruning

This describes the remainder of step 4 (2840) of FIG. 28. The sub-steps are diagrammed in FIG. 29D and are described as follows. These steps are repeated for each volume from the list generated in step 2934 of FIG. 29C, that is, for each volume which storage usage is above threshold:

(2941) Update the usage summary information in the FileInfo table for all the files belonging to this volume, based on the data in the Usage Log table. The FirstUsed, LastUsed and UsageCount fields in the FileInfo table are updated for every file belonging to this volume.

(2942) Select file ranking criteria and file protection criteria. The file ranking criteria will be one of LRU, LFU, UD, LRU-k or other criteria discussed above. The protection criteria apply to either files or portions of files. The first time this step is executed, files that are in-use and files that are only very recently introduced, will be protected from being pruned, i.e. they will not be put in the candidate list. Also an initial portion of each track of each file in the candidate list will be protected, so that users will be able to access files with zero latency even if the rest of each track is pruned. In subsequent rounds, the protection criteria will be relaxed so that more files will be candidates and more bytes of each candidate file will be considered for pruning: first the latency protections will be dropped, then recency protection, and finally the in-use protection will be dropped.

(2943) Use the data in the FileInfo table to create a ranked list of candidate files that are available for pruning. The ranking is based on the criteria set in 2942.

(2944) If the candidate list is empty, return to step 2942 and relax the protection criteria so that more files will be included in a new candidate list. Otherwise proceed to 2945.

(2945) Take the leading file from the candidate list from step 2943, set a deletion goal for the file (a target number of bytes we will try to prune from it) and try to delete blocks from it totaling that many bytes (step 5 (2850) of FIG. 28, described below). The deletion goal depends on the number of bytes still needed to bring the volume's usage below threshold as well as on the ranking and protection criteria set in set 2942. Algorithms can set the deletion goal as high as possible (100% of the file), so that as much as possible will be pruned from one candidate file before the next file from the candidate list is pruned. The Uniform Decay algorithm, however, tries to prune some bytes from every candidate file in such a way that the amount pruned from each file is inversely proportional to the frequency of use of the file.

(2946) If the cumulative number of bytes successfully deleted from all candidate files visited so far is enough to bring the volume's usage below pruning threshold, pruning is done (2947). Otherwise control returns to step 2944 to examine the next candidate file for pruning.

i. Remove Block Files

Figure 29A:
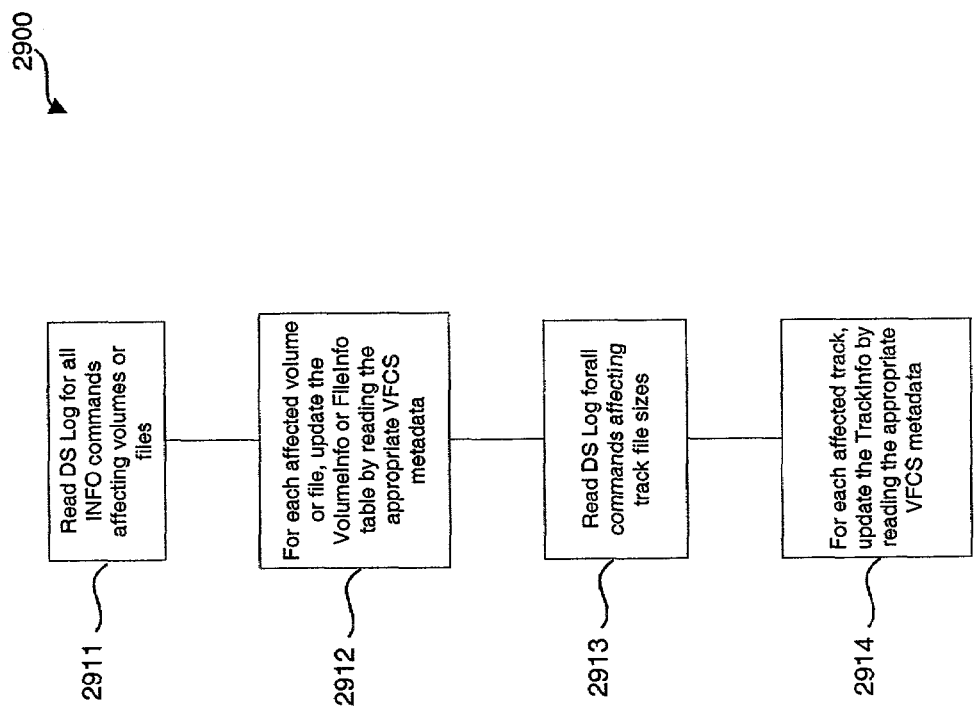
FIGS. 29A-E break the operations of FIG. 28 down into smaller subtasks.
Figure 29B:
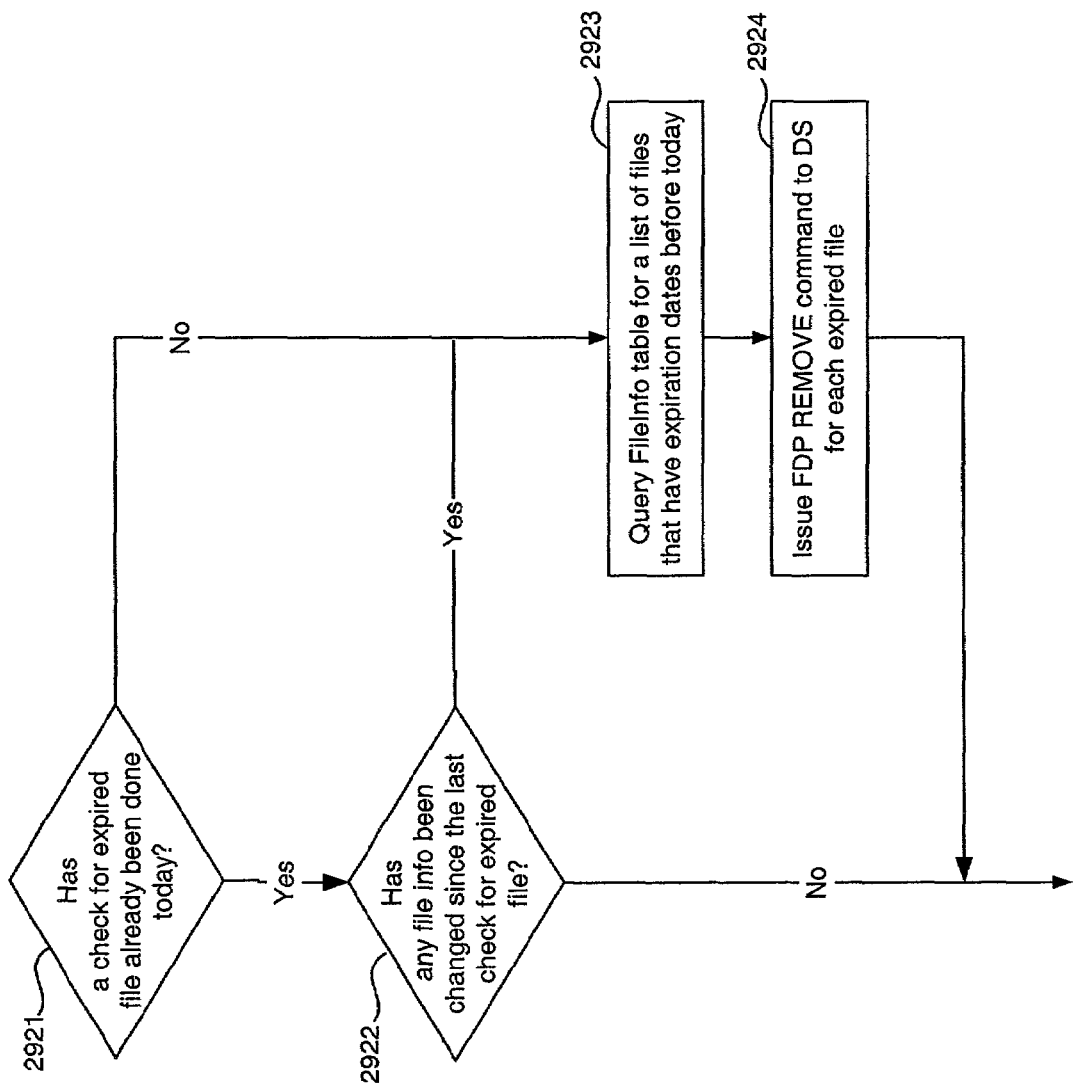
Figure 29C:
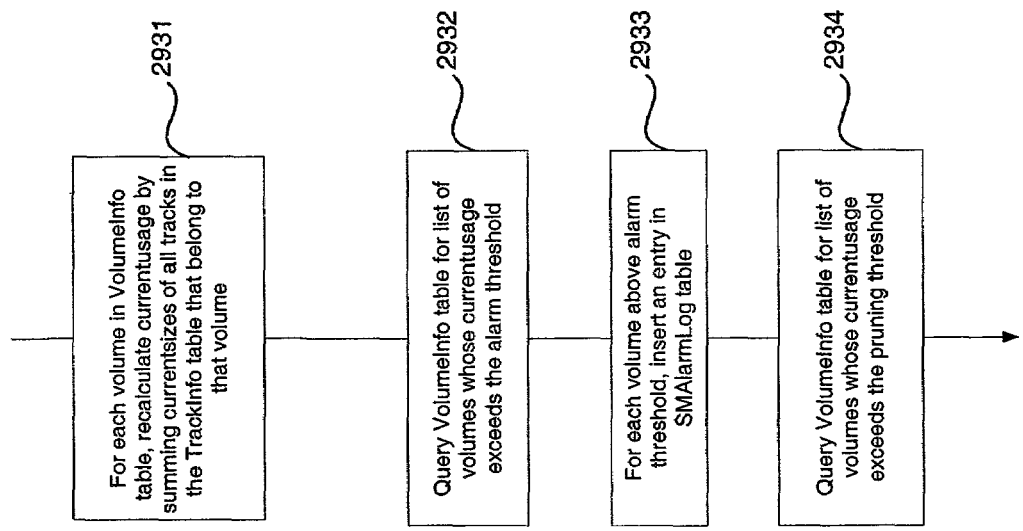
Figure 29D:
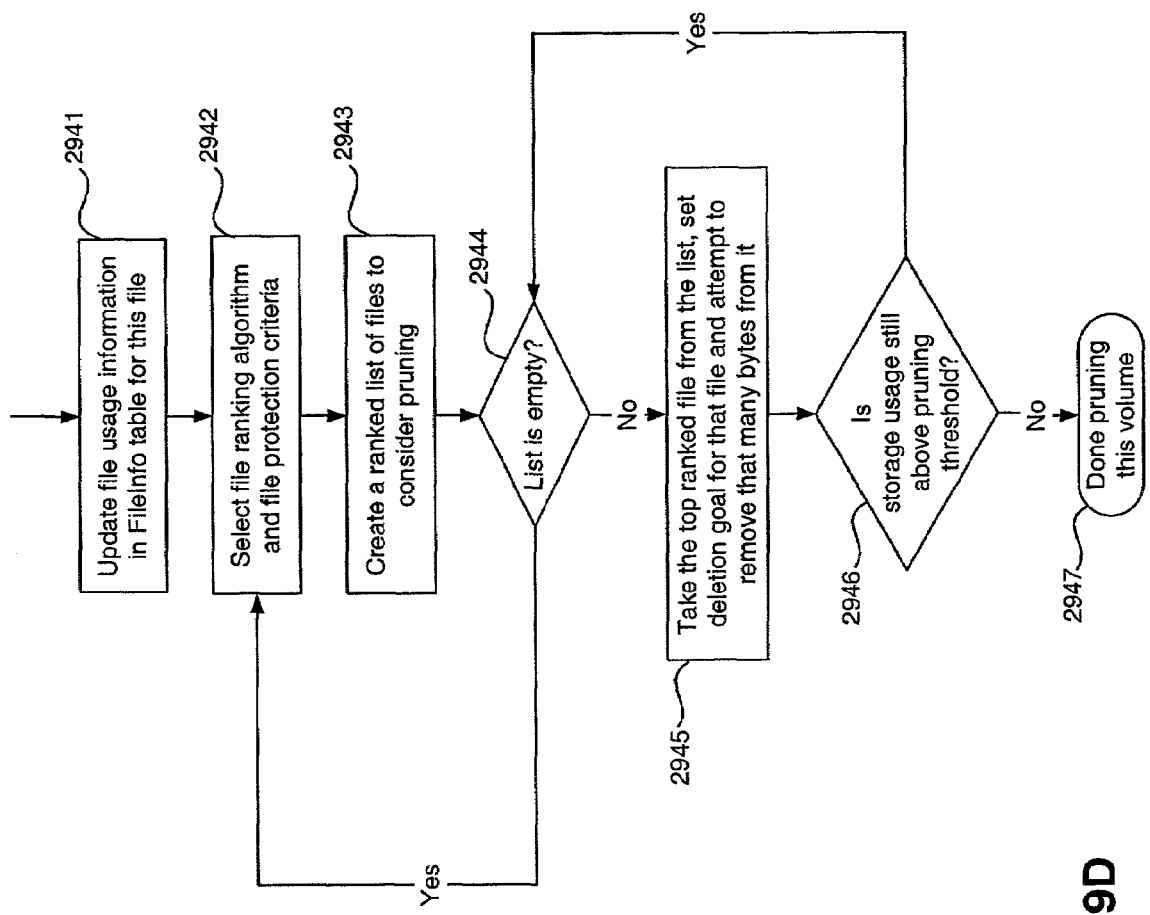

This describes step 5 (2850) of FIG. 28, invoked from 2945 of FIG. 29D, whereby we are trying to delete block files totaling a certain number of bytes from a certain file. If the file has multiple tracks, block files might be deleted from several tracks. The simplest strategy, used in one implementation of the invention, is to visit each track in turn and proceed to select blocks until either no more blocks can be deleted from that track or the total size of all blocks selected so far is enough to reach the deletion goal. After selecting which blocks to prune from a track, storage manager issues FDP "Remove" command to DS to carry out the actual removal of the selected blocks.

Figure 29E:
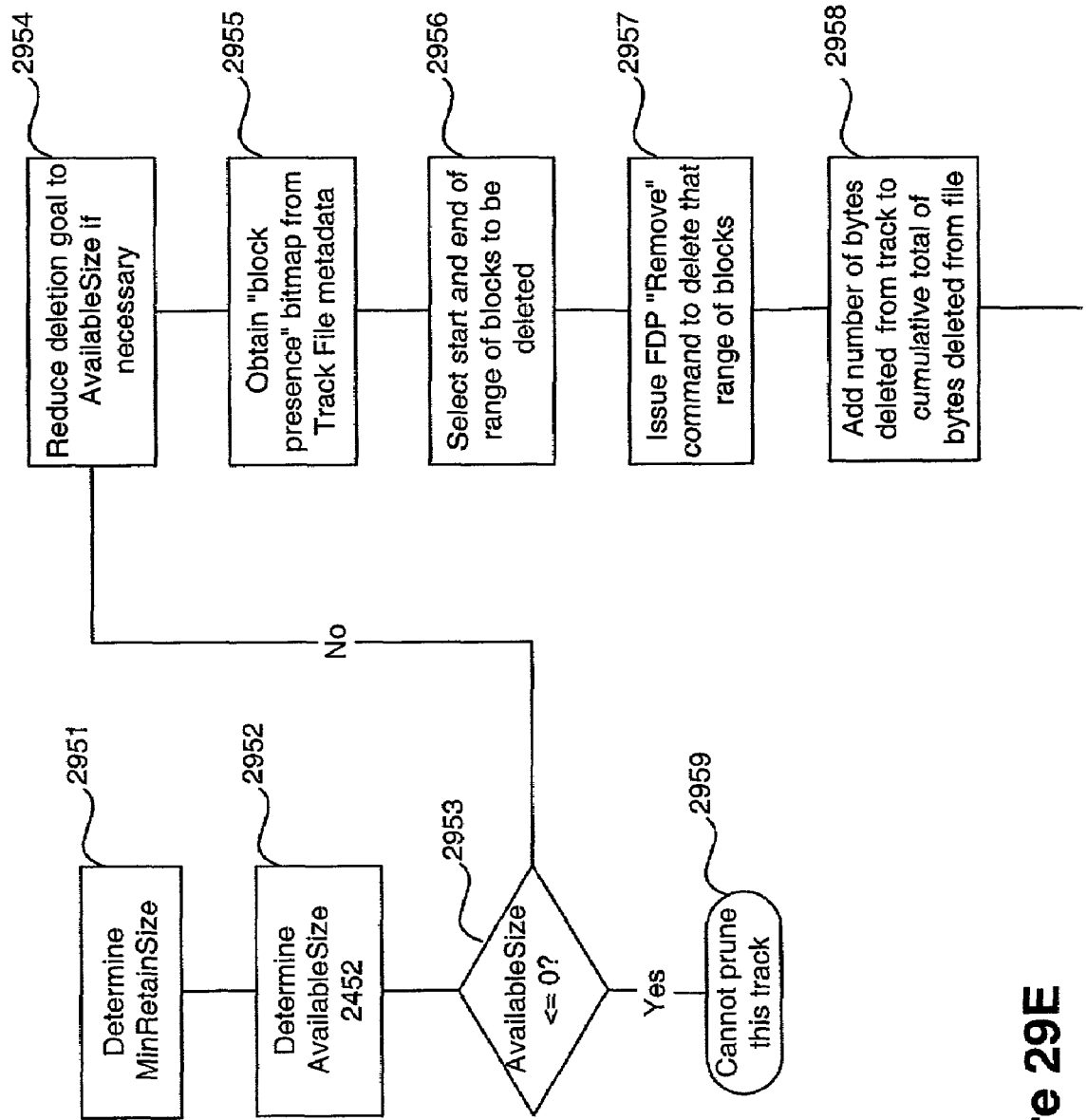

The steps to decide how many and which blocks to prune from a given track file are diagrammed in FIG. 29E and are described as follows:

(2951) Determine the minimum allowable size (called MinRetainSize) for the track based on the file type and on the protection criteria set in 2942 of FIG. 29D. The MinRetainSize will be 0 in all cases except when latency protection is in effect and the file is a media file or other file type. In that case, if the file is NOT marked truncatable in the TrackInfo table, the MinRetainSize is the entire track (the file cannot be pruned at all). Otherwise MinRetainSize is the maximum of:
i) a certain fixed number of bytes,
ii) a certain fixed percentage of the track,
iii) enough bytes to support streaming the first S seconds of the file, where S is a fixed number of seconds (the total duration D of the file is known from the Fileinfo table, so the fraction S/D of the track should suffice for S seconds).

These fixed numbers in i), ii) and iii) are all configurable parameters. In another embodiment of the invention, S could be dynamically adjusted based on measured and predicted network latency between this station and other stations. After it is calculated, MinRetainSize needs to be rounded up to be a whole number of blocks. This is conveniently computed using the following integer operations: MinRetainSize= ((MinRetainSize+BlockSize−1)/BlockSize)*BlockSize.

Calculate the track's AvailableSize as CurrentSize−MinRetainSize. This is the maximum number of bytes we can hope to delete from this track. The value of CurrentSize is available in the Trackinfo table or can be obtained from the Track File metadata.

If AvailableSize<=0, no pruning can be done on this track.

Adjust the deletion goal for this track downward, if necessary, so that it is no bigger than AvailableSize.

Obtain from the track file metadata a "bitmap" telling which block files of this track are currently present in storage. This bitmap is an array of "0"s and "1"s, indexed from 0 to N−1 where N is the number of blocks in the track, with a value of "0" indicating that the block is not currently present in storage and "1" indicating that it is currently present in storage. For example: 1111111111100111011101011101111111110000 0000000

Using the above bitmap, determine starting and ending block indexes iStart and iend so that iStart has enough "1"s (blocks that are present) BEFORE it to contain MinRetainSize bytes that will NOT be deleted, and there are enough "1"s BETWEEN iStart and iEnd, inclusive, to meet the deletion goal. This will be possible because the deletion goal is (or has been adjusted to be) no greater than AvailableSize. One concrete method to select iStart and iEnd, implemented in one embodiment of the invention, is first to set iEnd equal to the index of the last "1" in the bitmap, then sweep iStart backwards starting from iEnd until enough "1"s have been counted to reach the deletion goal. This method causes track files always to be pruned "from the end". Other embodiments of the invention could proceed differently by, for example, first setting iStart to the minimum index that still has MinRetainSize bytes before it, and then sweeping iEnd forward until enough "1"s have been counted to reach the deletion goal.

Issue an FDP REMOVE command to the DS, asking it to remove all blocks from iStart to iEnd inclusive from this track of this file. (Some of these blocks may already not be present, but these redundant deletion requests are harmless).

Add the number of bytes actually deleted from the track to the cumulative total of all bytes that have been deleted from this file.

j. Report Volume Storage Usage to Their CMS.

This describes Step 6 (2860) of FIG. 28. The CMS address of a volume is stored in the Volume Table in the content repository. When a content volume's storage usage exceeds the alarm threshold and Storage Manager is unable to remove any of the content block belongs to the volume, the Storage Manager notifies the CMS of the volume and the network operator. Upon receiving notification, CMS prevents the content owner from uploading more content without adding more reserved storage to the volume. When the volume storage usage falls below the alarm threshold, the Storage Manager notifies CMS to release the upload restriction.

During the entire management cycle, storage manager also report errors, warnings, and overall storage usage statistics to Service Management Subsystem.

Storage Manager makes sure that the overall storage is big enough for the total content volume reserved storage. This is enforced with the cooperation of CMS and the Learning agent at a station. Storage Manager periodically informs CMS about the storage usage of each volume. It also sends an alert to CMS when a volume usage is behind the safety threshold. CMS may prevent the content owner of the volume from adding new content to the network. Learning agent may pause its content learning when a volume exceeds its quota.

6. Computing Environment

Figure 31:
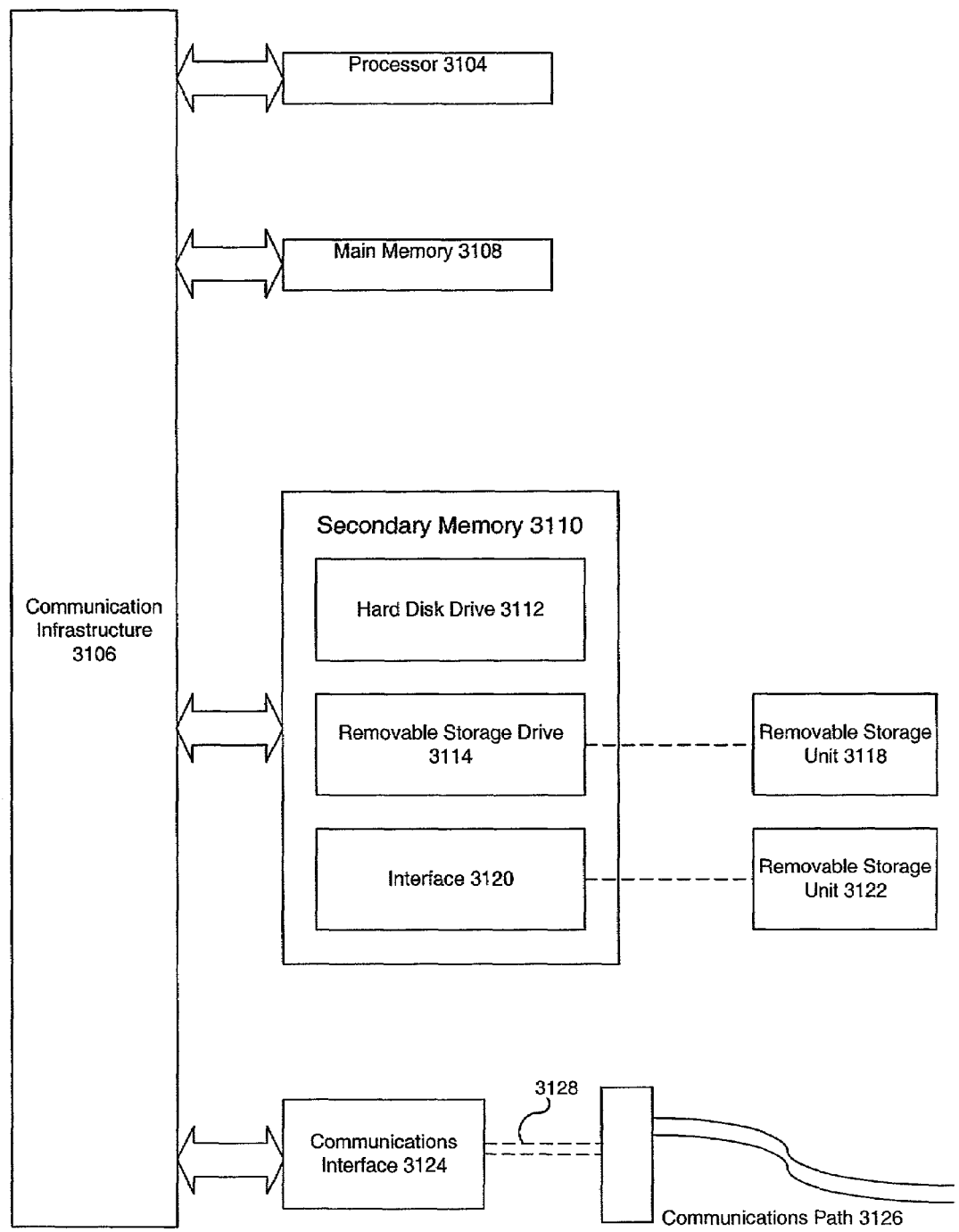
FIG. 31 is an example computer system and computer program product in which the present invention is implemented primarily in software.

The present invention may be implemented in software, hardware or a combination thereof and may be implemented using one or more computer systems or other processing systems. An example of a computer system that could be used to implement, for example, a content management server 170, a content provider client 130, a distribution server in a cluster DSC 410, a control unit 450, an application server, a VFCS 470, 1800 or any of the other computing platforms (also referred to herein as "machines" or "servers") is computer system 3100, shown in FIG. 31. The computer system 3100 includes one or more processors, such as processor 3104. The processor 3104 is connected to a communication infrastructure 3106 (e.g., a bus or network). Various embodiments can be described in terms of this exemplary computer system. However, after reading this description, it will become apparent to a person skilled in the relevant art how to implement the invention using other computer systems and/or computer architectures.

Computer system 3100 also includes a main memory 3108, preferably random access memory (RAM), and may also include a secondary memory 3110. The secondary memory 3110 may include, for example, a hard disk drive 3112 and/or a removable storage drive 3114, representing a floppy disk drive, a magnetic tape drive, an optical disk drive, etc. The removable storage drive 3114 reads from and/or writes to a removable storage unit 3118 in a well known manner. Removable storage unit 3118 represents a floppy disk, magnetic tape, optical disk, etc. As will be appreciated, the removable storage unit 3118 includes a computer usable storage medium having stored therein computer software and/or data.

Secondary memory 3110 can also include other similar means for allowing computer programs or input data to be loaded into computer system 3100. Such means may include, for example, a removable storage unit 3122 and an interface 3120. Examples of such may include a program cartridge and cartridge interface (such as that found in video game devices), a removable memory chip (such as an EPROM, or PROM) and associated socket, and other removable storage units 3122 and interfaces 3120 which allow software and data to be transferred from the removable storage unit 3122 to computer system 3100.

Computer system 3100 may also include a communications interface 3124. Communications interface 3124 allows software and data to be transferred between computer system 3100 and external devices. Examples of communications interface 3124 may include a modem, a network interface (such as an Ethernet card), a communications port, a PCMCIA slot and card, etc. Software and data transferred via communications interface 3124 are in the form of signals 3128 which may be electronic, electromagnetic, optical or other signals capable of being received by communications interface 3124. These signals 3128 are provided to communications interface 3124 via a communications path (i.e., channel) 3126. This channel 3126 carries signals 3128 into and out of computer system 3100, and may be implemented using wire or cable, fiber optics, a phone line, a cellular phone link, an RF link and other communications channels.

In an embodiment of the invention, signals 3128 can convey content or various signals produced by processes running on computer system 3100 to fetch/send block files and manage assembly of a payload.

In this document, the terms "computer program medium" and "computer usable medium" are used to generally refer to media such as removable storage drive 3114, a hard disk installed in hard disk drive 3112, and signals 3128. These computer program products are means for providing software to computer system 3100. The present invention includes such computer program products.

Computer programs (also called computer control logic) are stored in main memory 3108 and/or secondary memory 3110. Computer programs may also be received via communications interface 3124. Such computer programs, when executed, enable the computer system 3100 to perform the features of the present invention as discussed herein. In particular, the computer programs, when executed, enable the processor 3104 to perform the features of the present invention. Accordingly, such computer programs represent controllers of the computer system 3100.

D. Conclusion

The advantages of the invention include the ability to store, distribute, manage, and synchronize file system objects from any of a network of nodes without delaying the presentation of the object to the user, but also while requiring only a minimal amount of storage space. The invention allows quality of service policies to be set and enforced through a generic file system interface. The invention integrates storage devices and file systems within a local or wide area network and make the devices function as one with one integrated file system view. A file system server of this invention is capable of performing "selective and dynamic caching" to serve end users a huge library of content with limited storage and network resources. The file servers are clustered enabled that can be supported by a stateless load balancer.

The previous description of the embodiments is provided to enable any person skilled in the art to make or use the present invention. While the invention has been particularly shown and described with reference to embodiments thereof, it will be understood by those skilled in the art that various changes in form and details may be made therein without departing from the spirit and scope of the invention as defined by the following claims.

What is claimed is:

1. A method comprising:

creating a new file system object;

decomposing the new file system object into a plurality of segments;

generating a virtual storage capacity by storing individual segments of the plurality of segments on a plurality of servers in a network, wherein each server in the network stores a segment and is configured to have a virtual appearance that all of the segments are stored locally at the server;

generating object metadata, wherein the object metadata is used to reconstruct the new file system object from the plurality of segments; and distributing the object metadata according to a set of distribution criteria that includes one or more of using specified regions in a network and size of the new file system object, wherein the distributing continues until the object metadata reaches a plurality of nodes in the network.

2. The method of claim 1, further comprising:

updating an existing file system object; and parsing the existing file system object to update existing object metadata corresponding to the existing file system object.

3. The method of claim 1, wherein the set of distribution criteria further comprises distributing using specific nodes from the plurality of nodes in the network.

4. The method of claim 1, wherein the object metadata comprises one or more of the following:
  attributes of the file system object;
  information on how the file system object is to be segmented; and
  locations of the plurality of segments of the file system object.

5. The method of claim 1, further comprising:
  requesting access to the file system object;
  searching for the plurality of segments that make up the file system object;
  retrieving the plurality of segments; and
  reconstructing the file system object from the plurality of segments.

6. The method of claim 5, further comprising:
  checking a table for file system objects with an expired expiration time;
  deleting the file system objects with an expired expiration time;
  determining if pruning is required based on overall storage availability and volume storage reservation information;
  deleting the file system objects based on usage statistics; and
  updating deleted object metadata associated with the deleted file system objects.

7. A machine-readable storage medium having stored thereon data representing sets of instructions which, when executed by a machine, cause the machine to:
  create a new file system object;
  decompose the new file system object into a plurality of segments;
  generate a virtual storage capacity by storing individual segments of the plurality of segments on a plurality of servers in a network, wherein each server in the network stores a segment and is configured to have a virtual appearance that all of the segments are stored locally at the server;
  generate object metadata, wherein the object metadata is used to reconstruct the new file system object from the plurality of segments; and
  distribute the object metadata according to a set of distribution criteria that includes using specified regions in a network or size of the new file system object, wherein the distributing continues until the object metadata reaches a plurality of nodes in the network.

8. The machine-readable medium of claim 7, further cause the machine to:
  request access to the file system object;
  search for the plurality of segments that make up the file system object;
  retrieve the plurality of segments; and
  reconstruct the file system object from the plurality of segments.

9. The machine-readable medium of claim 8, further cause the machine to:
  check a table for file system objects with an expired expiration time;
  delete the file system objects with an expired expiration time;
  determine if pruning is required based on overall storage availability and volume storage reservation information;
  delete the file system objects based on usage statistics; and
  update deleted object metadata associated with the deleted file system objects.

10. A system comprising:
  a distribution center; and
  a content management server (CMS) coupled with the distribution center, the CMS to
    create a new file system object,
    decompose the new file system object into a plurality of segments,
    generate a virtual storage capacity by storing individual segments of the plurality of segments on a plurality of servers in a network,
    wherein each server in the network stores a segment and is configured to have a virtual appearance that all of the segments are stored locally at the server,
    generate object metadata, wherein the object metadata is used to reconstruct the new file system object from the plurality of segments, and
    distribute the object metadata according to a set of distribution rules that include using specified regions in a network or size of the new file system object, wherein the CMS continues to distribute until the object metadata reaches a plurality of nodes in the network.

11. The system of claim 10, wherein the CMS is further to update an existing file system object; and
  parse the existing file system object to update existing object metadata corresponding to the existing file system object.

12. The system of claim 10, wherein the distribution center comprises an application server cluster, wherein the application server cluster includes:
  a plurality of application servers;
  a load balancing system, wherein the load balancing system distributes traffic among the plurality of application servers; and
  a virtual file cluster server (VFCS) coupled with the plurality of application servers via the load balancing system, wherein the VFCS is to
  request access to the file system object,
  search for the plurality of segments that make up the file system object,
  retrieve the plurality of segments, and
  reconstruct the file system object from the plurality of segments.

13. The system of claim 12, wherein the distribution center further comprises a control unit coupled with the application server cluster, wherein the control unit includes:
  a service management system;
  a resource management system; and
  a storage management system, wherein the storage management system is to
    check a table for file system objects with expired expiration times,
    delete the file system objects with expired expiration times,
    determine if pruning is required based on overall storage availability and volume storage reservation information,
    delete the file system objects based on usage statistics, and
    update deleted object metadata associated with the deleted file system objects.

* * * * *